US012791958B2

(12) United States Patent
Obukuro et al.

(10) Patent No.: US 12,791,958 B2
(45) Date of Patent: Nov. 10, 2026

(54) IMAGE FORMING APPARATUS

(71) Applicant: CANON KABUSHIKI KAISHA, Tokyo (JP)

(72) Inventors: Yuuji Obukuro, Saitama (JP); Kazuhiro Hosohara, Kanagawa (JP); Kohei Koguchi, Tokyo (JP); Yukio Kubo, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/191,276

(22) Filed: Apr. 28, 2025

(65) Prior Publication Data

US 2025/0334898 A1 Oct. 30, 2025

(30) Foreign Application Priority Data

Apr. 30, 2024 (JP) ................................ 2024-073678

(51) Int. Cl.

*G03G 15/01* (2006.01)
*G03G 15/22* (2006.01)
*H04N 1/00* (2006.01)

(52) U.S. Cl.

CPC ....... *G03G 15/0173* (2013.01); *G03G 15/228* (2013.01); *H04N 1/00546* (2013.01); *H04N 2201/0094* (2013.01)

(58) Field of Classification Search

CPC ....... G03G 2215/0177; G03G 15/0173; G03G 21/1647; G03G 21/1676; G03G 15/0121; G03G 15/0875

See application file for complete search history.

(56) References Cited

U.S. PATENT DOCUMENTS

2008/0012961 A1* 1/2008 Masubuchi ........ G03G 15/0894 348/E3.017
2010/0226663 A1* 9/2010 Takashima ......... G03G 15/0896 399/119
2011/0142488 A1* 6/2011 Yamashita ......... G03G 21/1633 399/119

FOREIGN PATENT DOCUMENTS

JP 2007033865 A 2/2007
JP 2007183305 A 7/2007
JP 2008096852 A 4/2008
JP 2013167686 A 8/2013

(Continued)

*Primary Examiner* — Jessica L Eley

(74) *Attorney, Agent, or Firm* — Canon U.S.A., Inc. IP Division

(57) ABSTRACT

An image forming apparatus to which a cartridge is removably attachable includes a storage unit that stores developer supplied from the cartridge, a developing member that forms a developer image by developing an electrostatic latent image on a photosensitive member using the developer stored in the storage unit, a frame that accommodates the cartridge, a moving device that moves a cartridge in a displacement direction from an attachment position toward a displaced position; a controller that controls the moving device, and a reading unit that moves between a closed position at which the reading unit covers the frame and an open position at which the reading unit is opened to expose the frame. When the cartridge is at the displaced position and when the reading unit is at the closed position, a cartridge downstream end is located downstream of a reading-unit downstream end in the displacement direction.

5 Claims, 24 Drawing Sheets

(56) References Cited

FOREIGN PATENT DOCUMENTS

JP 2014149516 A 8/2014

* cited by examiner

IMAGE FORMING APPARATUS

BACKGROUND

Technical Field

The present disclosure relates to an image forming apparatus that forms an image on a recording material.

Description of the Related Art

Japanese Patent Laid-Open No. 2007-183305 and Japanese Patent Laid-Open No. 2008-096852 describe an image forming apparatus including developing rollers and toner cartridges removably attachable to a main body of the image forming apparatus.

SUMMARY

The present disclosure provides a new type of image forming apparatus developed from the related art.

An embodiment of the present disclosure is as follows.

An image forming apparatus to which a cartridge that stores developer is removably attachable includes a storage unit that stores the developer supplied from the cartridge; a photosensitive member on which an electrostatic latent image is formed; a developing member that forms a developer image by developing the electrostatic latent image on the photosensitive member using the developer stored in the storage unit; a frame that accommodates the cartridge; a moving device that moves the cartridge in a displacement direction from an attachment position at which the cartridge is inside the frame toward a displaced position at which the cartridge is outside the frame; a controller that controls the moving device; and a reading unit that reads an image formed on a recording material and that rotates to move between a closed position at which the reading unit covers the frame and an open position at which the reading unit is opened to expose the frame. The cartridge includes a cartridge downstream end that is a downstream end of the cartridge in the displacement direction. The reading unit includes a reading-unit downstream end that is a downstream end of the reading unit in the displacement direction when the reading unit is at the closed position. When the cartridge is at the displaced position and when the reading unit is at the closed position, the cartridge downstream end is located downstream of the reading-unit downstream end in the displacement direction.

Further features of the present disclosure will become apparent from the following description of exemplary embodiments with reference to the attached drawings.

DESCRIPTION OF THE EMBODIMENTS

Embodiments of the present disclosure will now be described with reference to the drawings.

First Embodiment

An image forming apparatus 1 according to a first embodiment will be described with reference to FIG. 1 to FIGS. 12A and 12B.

In the following description and drawings, a vertical direction of the image forming apparatus 1 installed on a horizontal surface is defined as a Z direction. A direction that crosses the Z direction and extends along a rotational axis 90C of a rotary body 90 described below (rotational axis direction of a rotary) is defined as a Y direction. A direction that crosses both the Z direction and the Y direction is defined as an X direction. The X direction and the Y direction may be horizontal directions. The X direction, the Y direction, and the Z direction may be orthogonal to each other. As necessary, the sides toward which arrows X, Y, and Z point in each figure are expressed as +X, +Y, and +Z sides, respectively, and the sides opposite thereto are expressed −X, −Y, and −Z sides.

Overall Structure of Image Forming Apparatus

The overall structure of the image forming apparatus 1 will now be described. The image forming apparatus 1 is a laser beam printer that forms an image on a sheet S by electrophotography. More specifically, the image forming apparatus 1 is a color laser beam printer including four developing units 50$y$, 50$m$, 50$c$, and 50$k$. The sheet S, which serves as a recording material (recording medium), may be various types of sheets of different sizes and materials including paper, such as plain paper and cardboard, plastic films, cloth, surface-treated sheets such as coated paper, and irregular-shaped sheets, such as envelopes and index tabs.

Figure 1:
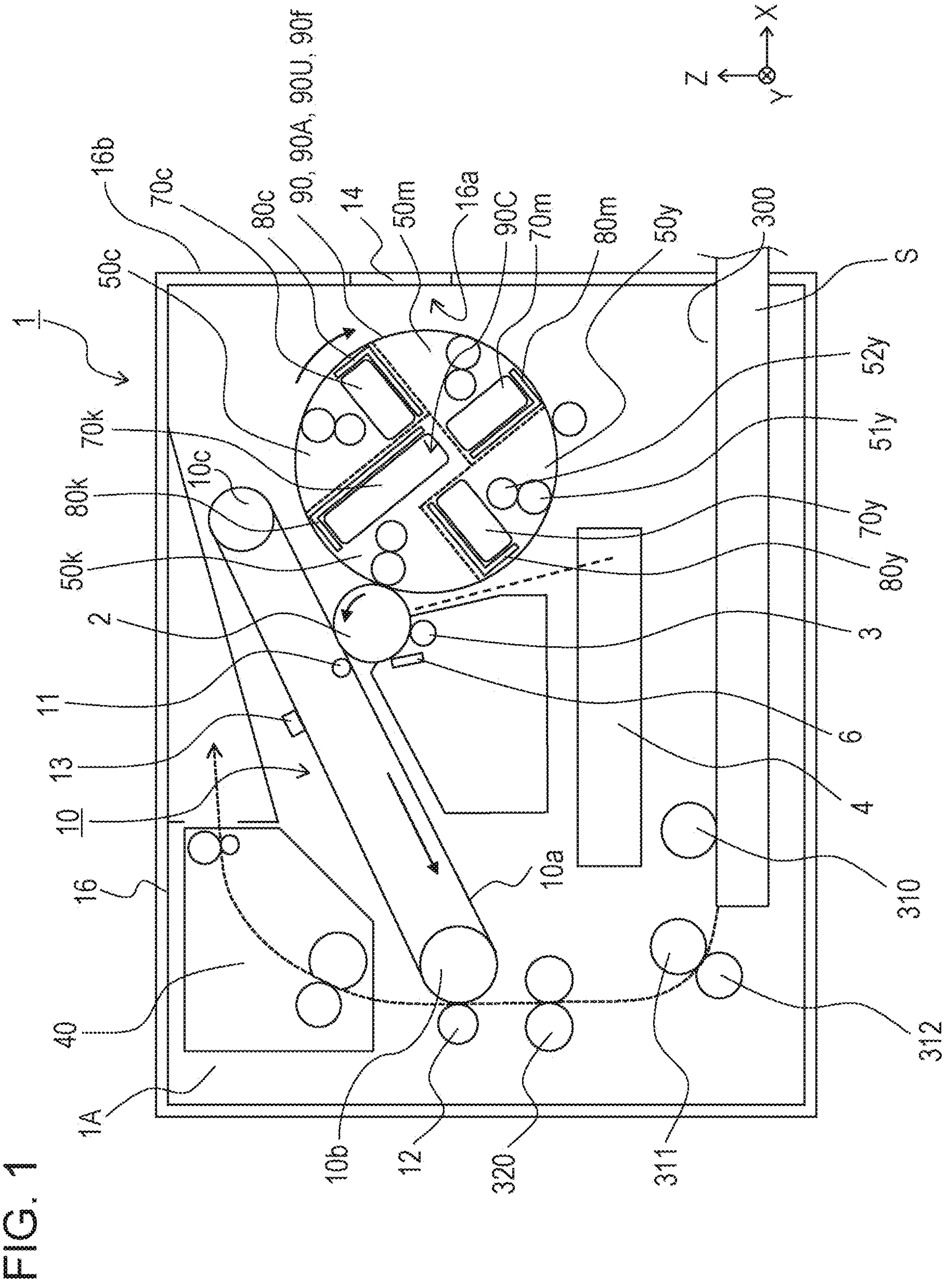
FIG. 1 is a schematic diagram of an image forming apparatus according to the first embodiment.
Figure 2:
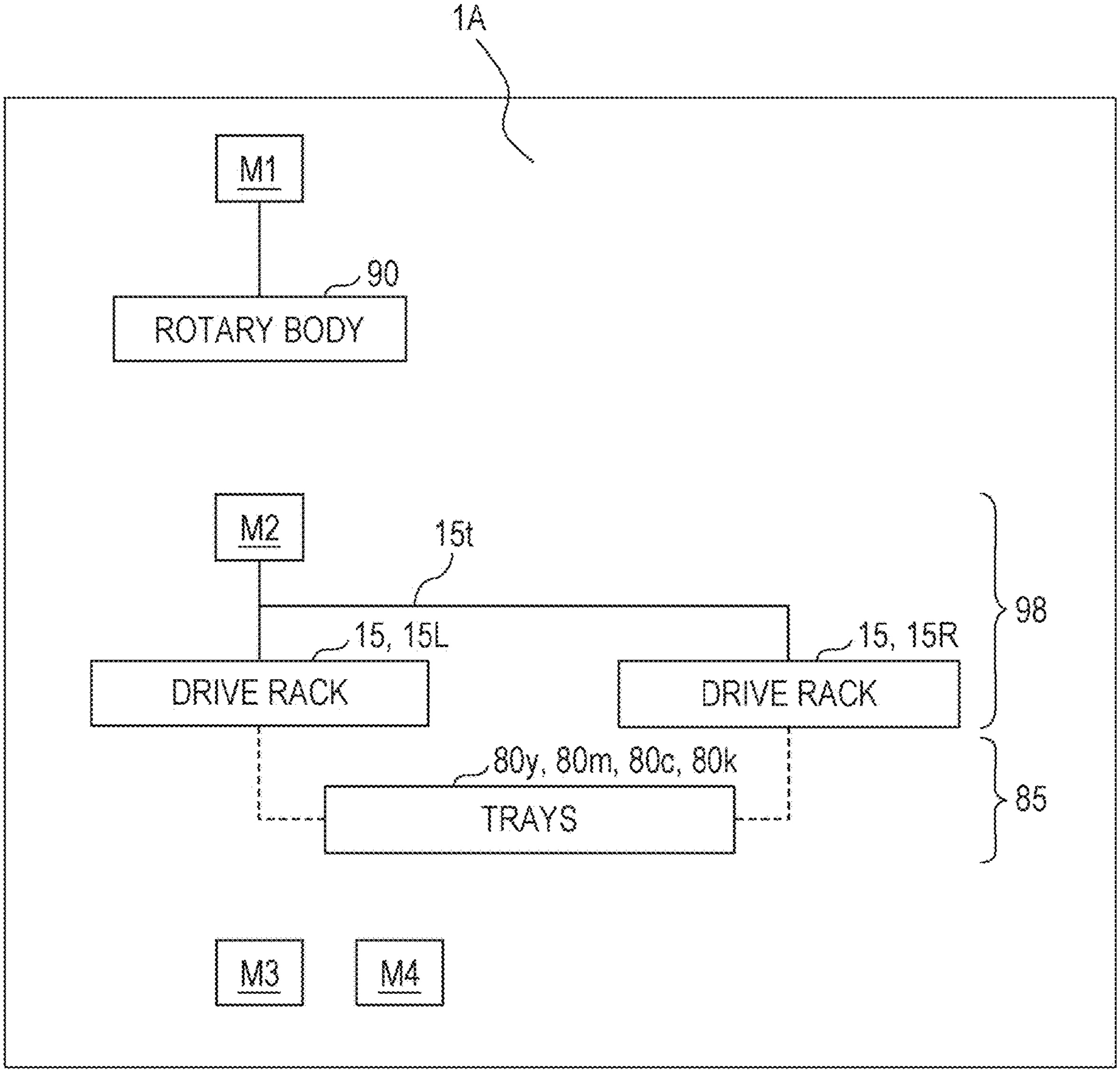
FIG. 2 is a block diagram of the image forming apparatus according to the first embodiment.
Figure 3:
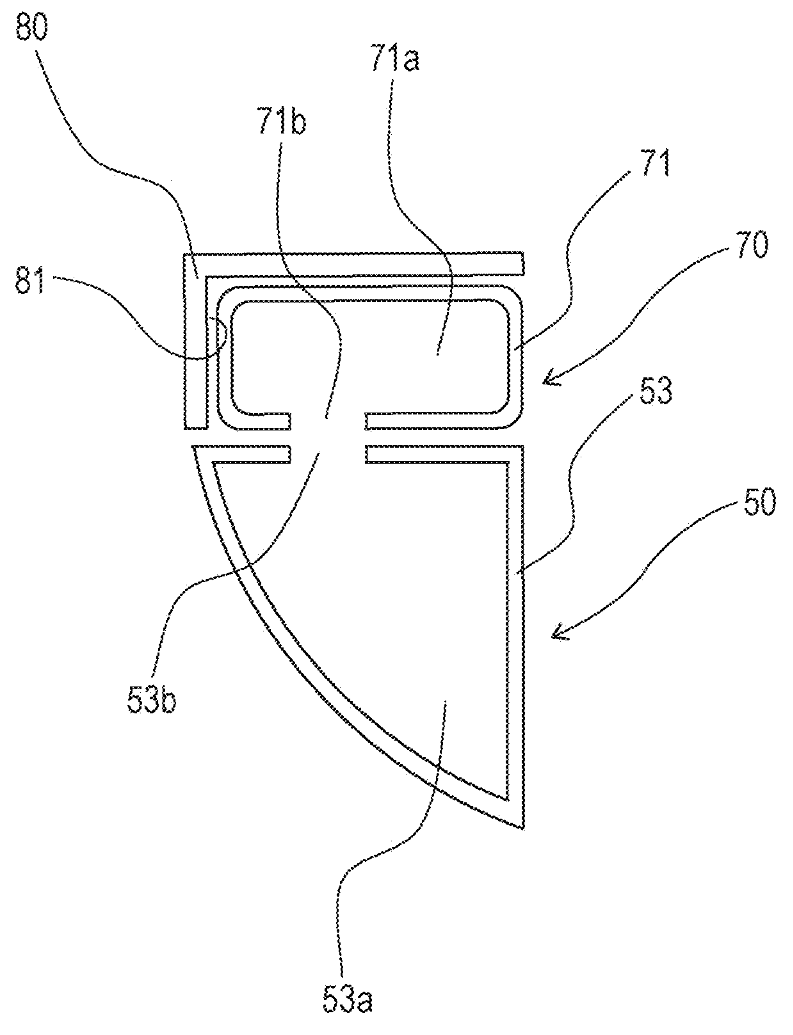
FIG. 3 is a schematic diagram illustrating a developing unit, a toner cartridge, and a tray according to the first embodiment.

The schematic structure of the image forming apparatus 1 and an image forming operation will be described with reference to FIGS. 1, 2, and 3. FIG. 1 is a schematic diagram illustrating a cross-section of the image forming apparatus 1. FIG. 2 illustrates a drive source of the image forming apparatus 1. FIG. 3 is a conceptual diagram illustrating the structure for supplying toner from a toner cartridge 70 to a developing unit 50.

As illustrated in FIG. 1, the image forming apparatus 1 includes an image forming apparatus body (hereinafter referred to as an apparatus body) 1A and toner cartridges 70$y$, 70$m$, 70$c$, and 70$k$ removably attachable to the apparatus body 1A. The apparatus body 1A of the present embodiment is a section of the image forming apparatus 1 excluding the toner cartridges 70$y$, 70$m$, 70$c$, and 70$k$.

The apparatus body 1A of the image forming apparatus 1 includes a drum-shaped (cylindrical) electrophotographic photosensitive member (hereinafter referred to as a photosensitive drum) 2 serving as an image carrier that carries an electrostatic latent image. A charging roller 3, a scanner 4 serving as an exposure device, and a cleaning unit 6 are arranged around the photosensitive drum 2.

The charging roller 3 is an example of a charger or a charging unit for uniformly charging the photosensitive drum 2. The scanner 4 is an example of an exposure member or an exposure unit that irradiates the photosensitive drum 2 with laser light corresponding to image information. The charged photosensitive drum 2 is irradiated with the laser light so that an electrostatic latent image is formed on a surface of the photosensitive drum 2. The cleaning unit 6 is an example of a cleaner or a cleaning unit for removing toner that remains on the surface of the photosensitive drum 2.

The apparatus body 1A further includes a sheet storage unit 300, a pick-up roller 310, a feed roller 311, a separation roller 312, a pair of transport rollers 320, a second transfer roller 12, a fixing device 40, and an intermediate transfer unit 10. The pick-up roller 310 is an example of a feeder or a feeding unit that feeds sheets S. The feed roller 311 and the separation roller 312 are an example of a separation transport unit that transports the sheets S one at a time while separating the sheets S from each other using friction. The second transfer roller 12 is an example of a transfer member or a transfer unit that transfers an image from an intermediate transfer belt 10$a$ to each sheet S.

The intermediate transfer unit 10 includes the intermediate transfer belt 10$a$, a belt driving roller 10$b$, a tension roller 10$c$, a cleaning device 13, and a first transfer roller 11. The intermediate transfer belt 10$a$ is an example of an intermediate transfer body that carries an image transferred thereto from the photosensitive drum 2 (first transfer) and that transports the image so that the image is transferred to the sheet S (second transfer). The intermediate transfer belt 10$a$ is wrapped around the belt driving roller 10$b$ and the tension roller 10$c$. The belt driving roller 10$b$ is a driving member that is rotationally driven by a drive source to move the intermediate transfer belt 10$a$.

The apparatus body 1A further includes a rotary body (rotary, rotating body, developing device) 90 including developing units 50$y$, 50$m$, 50$c$, and 50$k$. As described below, in the present embodiment, trays (support members) 80$y$, 80$m$, 80$c$, and 80$k$ are attached to the rotary body 90. The toner cartridges 70$y$, 70$m$, 70$c$, and 70$k$ are removably attached to the trays 80$y$, 80$m$, 80$c$, and 80$k$, respectively.

In the following description, a plurality of members having similar functions may be distinguished from each other by ordinal numbers. For example, one of the toner cartridges 70$y$, 70$m$, 70$c$, and 70$k$ may be referred to as a first toner cartridge, one of the remaining three as a second toner cartridge, one of the remaining two as a third toner cartridge, and the last one as a fourth toner cartridge. Similarly, one of the trays 80$y$, 80$m$, 80$c$, and 80$k$ may be referred to as a first tray, one of the remaining three as a second tray, one of the remaining two as a third tray, and the last one as a fourth tray. In other words, one of the trays 80$y$ to 80$k$ is an example of a first support member, another one of the trays 80$y$ to 80$k$ is an example of a second support member, still another one of the trays 80$y$ to 80$k$ is an example of a third support member, and the last one of the trays 80$y$ to 80$k$ is an example of a fourth support member. These ordinal numbers are used for convenience of description, and are interchangeable in principle.

Each of the developing units (first to fourth developing units) 50$y$, 50$m$, 50$c$, and 50$k$ is an example of a developing part or a developing member that develops (visualizes) an electrostatic latent image formed on the photosensitive drum 2 into a toner image using toner of a color corresponding to the electrostatic latent image. The developing units 50$y$, 50$m$, 50$c$, and 50$k$ develop electrostatic latent images formed on the photosensitive drum 2 using yellow toner, magenta toner, cyan toner, and black toner, respectively. The developing units 50$y$, 50$m$, 50$c$, and 50$k$ may be arranged in an order different from that illustrated in FIG. 1.

The developing unit 50$y$ includes a developing roller 51$y$, a supply roller 52$y$, and a developing blade. The developing roller 51$y$ is a developer carrier that rotates while carrying toner serving as a developer and that supplies the toner to the photosensitive drum 2. The supply roller 52$y$ is a supply member that is in contact with the developing roller 51$y$ and supplies the toner to the developing roller 51. The developing blade is a regulation member that regulates the thickness of a toner layer carried by the developing roller 51$y$. The other developing units 50$m$, 50$c$, and 50$k$ include developing rollers 51$m$, 51$c$, and 51$k$, supply rollers 52$m$, 52$c$, and 52$k$, and developing blades having similar structures.

The toner cartridges 70$y$, 70$m$, 70$c$, and 70$k$ corresponding to the developing units 50$y$, 50$m$, 50$c$, and 50$k$, respectively, are attached to the rotary body 90. The toner cartridges 70$y$, 70$m$, 70$c$, and 70$k$ store yellow toner, magenta toner, cyan toner, and black toner, respectively, as toners to be supplied to the developing units 50$y$, 50$m$, 50$c$, and 50$k$. One of the toners of the four colors may be referred to as first toner, one of the toners of the remaining three colors as second toner, one of the toners of the remaining two colors as third toner, and the toner of the last color as fourth toner. For example, the black toner may be regarded as an example of the first toner, and the magenta toner may be regarded as an example of the second toner. These ordinal numbers are used for convenience of description, and are interchangeable in principle.

The rotary body 90 includes a rotary frame 90$f$ that supports the developing units 50$y$, 50$m$, 50$c$, and 50$k$. The developing units 50$y$, 50$m$, 50$c$, and 50$k$ are supported by the rotary frame 90$f$, which is a rotatable support.

The trays 80$y$, 80$m$, 80$c$, and 80$k$ are attached to the rotary body 90. A unit composed of the rotary body 90 and the trays 80$y$, 80$m$, 80$c$, and 80$k$ may be referred to as a rotary unit 90U. In other words, the rotary unit 90U includes the rotary body 90 and the trays 80$y$, 80$m$, 80$c$, and 80$k$.

The toner cartridges 70y to 70k are removably held by the trays 80y to 80k. As described below, the trays 80y to 80k are supported such that the trays 80y to 80k are slidable to the outside of the rotary body 90. A unit composed of the rotary unit 90U and the toner cartridges 70y, 70m, 70c, and 70k may be referred to as a rotary assembly 90A. In other words, the rotary assembly 90A includes the rotary unit 90U and the toner cartridges 70y, 70m, 70c, and 70k.

As described below, the rotary body 90 is rotatable around the rotational axis (rotation center) 90C. The rotational axis 90C coincides with a rotational axis of the rotary frame 90f, the rotary unit 90U, and the rotary assembly 90A. In addition, the rotational axis 90C is substantially parallel to a rotational axis (rotation center) of the photosensitive drum 2.

The rotary body 90 is capable of rotating around the rotational axis 90C to a developing position in which one of the developing rollers 51y, 51m, 51c, and 51k faces the photosensitive drum 2. The position in which the developing roller 51y faces the photosensitive drum 2 is referred to as a yellow developing position. The position in which the developing roller 51m faces the photosensitive drum 2 is referred to as a magenta developing position. The position in which the developing roller 51c faces the photosensitive drum 2 is referred to as a cyan developing position. The position in which the developing roller 51k faces the photosensitive drum 2 is referred to as a black developing position. Thus, the rotary body 90 is capable of rotating around the rotational axis 90C to change the positions of the developing rollers 51y, 51m, 51c, and 51k relative to the photosensitive drum 2. The black developing position is an example of a first developing position in which the first developing roller (developing roller 51k) faces the photosensitive drum 2. The other developing positions are examples of a second developing position in which a second developing roller (developing rollers 51y to 51c) faces the photosensitive drum 2. The yellow, magenta, cyan, and black developing positions may be referred to as first to fourth developing positions. These ordinal numbers are used for convenience of description, and are interchangeable in principle.

As illustrated in FIG. 2, the apparatus body 1A includes motors M1, M2, M3, and M4 as drive sources. As described below, the motor M1 supplies driving force for rotating the rotary body 90 around the rotational axis 90C. In other words, the motor M1 rotates the rotary assembly 90A and the rotary unit 90U around the rotational axis 90C.

The apparatus body 1A also includes a driving device 98 including the motor M2 and a transmission device. The transmission device includes drive racks 15L and 15R described below, which serve as drive gears, and a transmission unit 15t. The driving force of the motor M2 is transmitted to the drive racks 15L and 15R by the transmission unit 15t. In other words, the motor M2 is configured to drive the drive racks 15L and 15R, and moves the trays 80y, 80m, 80c, and 80k relative to the rotary body 90 by using the drive racks 15L and 15R.

The motor M3 drives members other than the members driven by the motors M1 and M2. For example, the motor M3 drives the photosensitive drum 2, the developing units 50y, 50m, 50c, and 50k, the pick-up roller 310, the feed roller 311, the pair of transport rollers 320, the second transfer roller 12, the belt driving roller 10b, and the fixing device 40.

The motor M4 supplies driving force for driving a reading unit 401.

The members driven by the motors M1, M2, M3, and M4 may be changed as appropriate.

The functions of any two, three, or all four of the motors M1, M2, M3, and M4 may be provided by a single motor. Also, a drive source other than the motors M1, M2, M3, and M4 may be additionally provided.

The indices y, m, c, and k of the reference signs of the developing units 50y, 50m, 50c, and 50k, the toner cartridges 70y, 70m, 70c, and 70k, the trays 80y, 80m, 80c, and 80k, and other components represent the toner colors. The developing units 50y, 50m, 50c, and 50k have the same basic structure and function. The toner cartridges 70y, 70m, 70c, and 70k have the same basic structure and function. The trays 80y, 80m, 80c, and 80k have the same basic structure and function. Therefore, when these components do not need to be distinguished from each other, the indices y, m, c, and k are omitted, and each component is described as any one of the four units, four cartridges, or four trays.

As illustrated in FIG. 3, each toner cartridge 70 includes a toner frame 71. The toner frame 71 has a toner storage unit 71a that stores toner and a discharge opening 71b that communicates with the toner storage unit 71a.

Each developing unit 50 includes a developing frame (storage frame) 53. The developing frame 53 has a developing-device storage unit 53a and a receiving opening 53b that communicates with the developing-device storage unit (toner supply chamber) 53a. Although the developing unit 50 includes the developing roller 51 and the supply roller 52 as described above, these members are not illustrated in FIG. 3.

The developing roller 51k included in the developing unit 50k is an example of a first developing roller. The developing roller 51m included in the developing unit 50m is an example of a second developing roller. A developing frame 53k (FIG. 4A) of the developing unit 50k including the developing-device storage unit 53a is an example of a first storage frame including a first storage unit. A developing frame 53m (FIG. 4A) of the developing unit 50m including the developing-device storage unit 53a is an example of a second storage frame including a second storage unit. The rotary body 90 is an example of a rotatable rotary including the first developing roller, the second developing roller, the first storage frame including the first storage unit, and the second storage frame including the second storage unit. In the present embodiment, the rotary body 90 includes first to fourth developing rollers and first to fourth storage frames.

As described below, each toner cartridge 70 is movable relative to the corresponding developing frame 53 between an attachment position and a displaced position that is displaced from the attachment position. When the toner cartridge 70 is at the attachment position relative to the developing frame 53, the discharge opening 71b faces the receiving opening 53b. In other words, the toner storage unit 71a of the toner cartridge 70 and the developing-device storage unit 53a of the developing unit 50 communicate with each other through the discharge opening 71b and the receiving opening 53b. When the toner is supplied from the toner cartridge 70 to the developing unit 50, at least a portion of the receiving opening 53b is positioned below at least a portion of the discharge opening 71b.

The toner stored in the toner storage unit 71a is discharged through the discharge opening 71b, and the toner discharged through the discharge opening 71b is received by the developing-device storage unit 53a through the receiving opening 53b. Thus, the developing-device storage unit 53a serves as a storage unit that stores the toner supplied from the toner cartridge 70. The toner stored in the storage unit 53a is supplied to the developing roller 51 by the supply roller 52. The toner stored in the toner storage unit 71*a* is supplied to the developing roller 51 along the above-described path.

The toner cartridge 70 may include a sealing member (not illustrated) that covers the discharge opening 71*b* (first sealing member). The developing unit 50 may include a sealing member (not illustrated) that covers the receiving opening 53*b* (second sealing member).

When the toner cartridge 70 is not attached to the developing unit 50, the discharge opening 71*b* and the receiving opening 53*b* may be covered with the respective sealing members to prevent the toner from flowing out through the discharge opening 71*b* and the receiving opening 53*b*.

Image Forming Operation

The image forming operation according to the present embodiment will now be described. First, the photosensitive drum 2 is rotated in the direction shown by the arrow in FIG. 1 (counterclockwise) in synchronization with the intermediate transfer belt 10*a*. Then, the surface of the photosensitive drum 2 is uniformly charged by the charging roller 3.

When a color image is to be formed on a sheet S, as described below, the rotary body 90 rotates in the direction shown by the arrow in FIG. 1 (clockwise) while supporting the developing units 50*y*, 50*m*, 50*c*, and 50*k*. The developing rollers 51*y*, 51*m*, 51*c*, and 51*k* are moved to a developing position one at a time, and an electrophotographic process is repeatedly performed.

First, the scanner 4 emits laser light based on image data corresponding to a yellow image to form an electrostatic latent image corresponding to the yellow image on the surface of the photosensitive drum 2. While the electrostatic latent image is being formed, the motor M1 rotates the rotary body 90 until the rotary body 90 reaches the yellow developing position. When the rotary body 90 is in the yellow developing position, the developing roller 51*y* is at the developing position and develops the electrostatic latent image formed on the photosensitive drum 2 with yellow toner. Thus, each developing roller 51 serves as a developing member that forms a developer image by developing the electrostatic latent image on the photosensitive drum 2 (photosensitive member) using the developer stored in the developing-device storage unit 53*a*.

In the present embodiment, each of the developing rollers 51*y*, 51*m*, 51*c*, and 51*k* is an elastic roller including a metal shaft covered with rubber. Each of the developing rollers 51*y*, 51*m*, 51*c*, and 51*k* develops the electrostatic latent image while being in contact with the photosensitive drum 2 at the developing position. In other words, the image forming apparatus 1 according to the present embodiment uses a contact developing method. Alternatively, however, each of the developing rollers 51*y*, 51*m*, 51*c*, and 51*k* may develop the electrostatic latent image while being spaced from the photosensitive drum 2 at the developing position. In other words, the image forming apparatus 1 may use a noncontact developing method.

After the yellow toner image is developed, the first transfer roller 11 disposed inside the intermediate transfer belt 10*a* transfers the yellow toner image on the photosensitive drum 2 to the intermediate transfer belt 10*a* in a first transfer process.

After that, the rotary body 90 is rotated to successively move the developing rollers 51*m*, 51*c*, and 51*k* to the developing position, so that toner images of respective colors are formed. More specifically, after the yellow toner image is formed on the intermediate transfer belt 10*a*, the rotary body 90 rotates to the magenta developing position, and a magenta toner image is formed on the intermediate transfer belt 10*a*. After the magenta toner image is formed on the intermediate transfer belt 10*a*, the rotary body 90 moves to the cyan developing position, and a cyan toner image is formed on the intermediate transfer belt 10*a*. After the cyan toner image is formed on the intermediate transfer belt 10*a*, the rotary body 90 rotates to the black developing position, and a black toner image is formed on the intermediate transfer belt 10*a*. After the black toner image is formed on the intermediate transfer belt 10*a*, the rotary body 90 rotates around the rotational axis 90C in the direction shown by the arrow in FIG. 1 (clockwise) and returns to the yellow developing position. An image of any color may be formed on the intermediate transfer belt 10*a* first. For example, a black toner image may be formed first.

The first transfer process is repeated so that the toner images of the four colors are superposed on the intermediate transfer belt 10*a*. Thus, a color image is formed on the intermediate transfer belt 10*a*. The second transfer roller 12 and the cleaning device 13 do not come into contact with the intermediate transfer belt 10*a* until the color image is formed on the intermediate transfer belt 10*a*.

The sheet S is supplied from the sheet storage unit 300 disposed at the bottom of the apparatus body 1A by the pick-up roller 310. The sheet S is separated from the other sheets S and fed to the pair of transport rollers 320 by the feed roller 311 and the separation roller 312. The sheet S fed to the pair of transport rollers 320 is transported to a transfer section (second transfer section), which is a nip portion between the intermediate transfer belt 10*a* and the second transfer roller 12. The color image on the intermediate transfer belt 10*a* is transferred to a surface of the transported sheet S (second transfer).

The sheet S to which the color image has been transferred is transported to the fixing device 40. The fixing device 40 applies heat and pressure to the sheet S to fix the image to the sheet S. Thus, the fixing device 40 serves as a fixing unit that fixes the developer transferred to the recording material. The sheet S that has passed through the fixing device 40 is output to the outside of the image forming apparatus 1 as a product.

When a monochrome image is to be formed on a sheet S, the rotary body 90 is rotated to the black developing position. In this state, the photosensitive drum 2 is subjected to charging and exposure so that an electrostatic latent image is formed on the surface of the photosensitive drum 2, and then the developing roller 51*k* positioned at the developing position develops the electrostatic latent image using black toner. The black toner image is transferred to the intermediate transfer belt 10*a* in a first transfer process, and then to the sheet S in a second transfer process. Subsequent processes are the same as those in the case in which a color image is formed.

Structure of Rotary

The structure of the rotary body 90 will be described with reference to FIGS. 1, 4A, 4B, and 5.

Figure 4A:
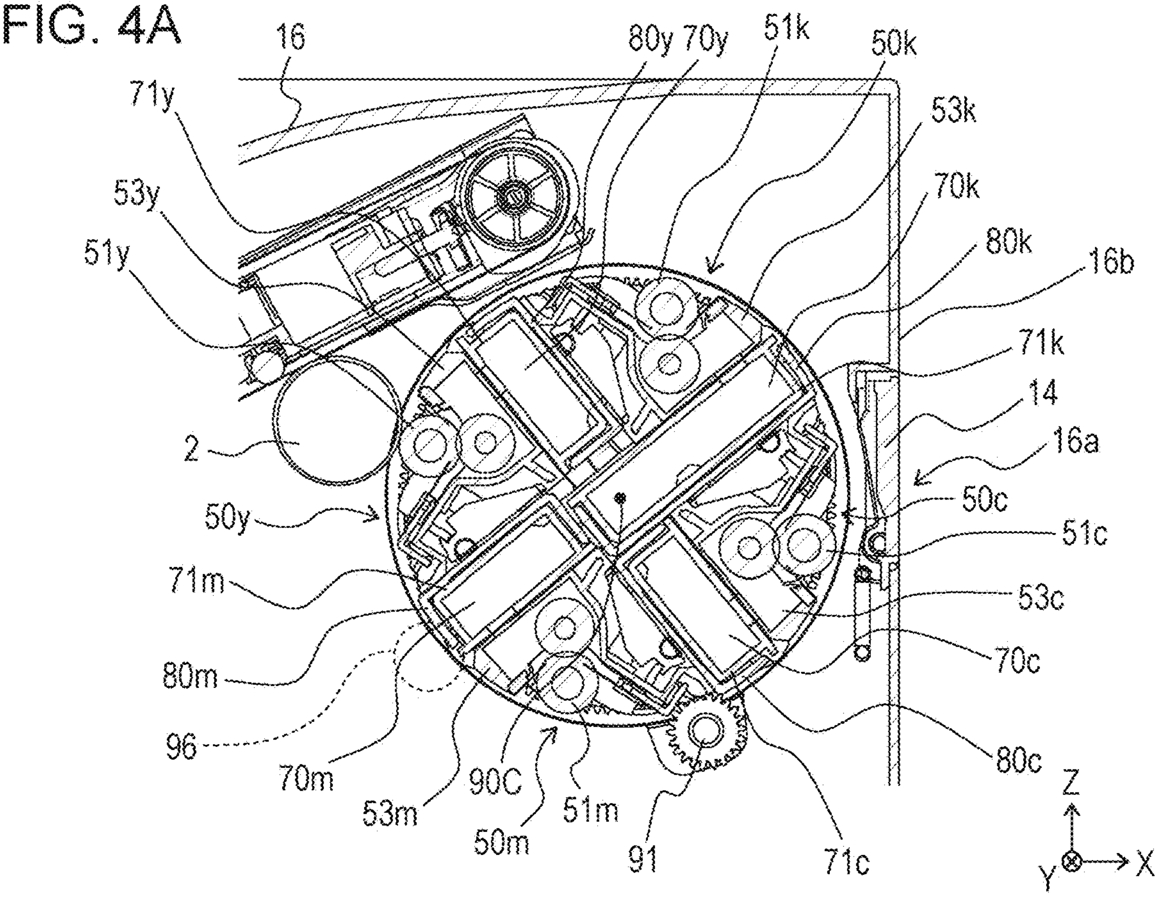
FIGS. 4A and 4B are sectional views of the image forming apparatus according to the first embodiment.
Figure 4B:
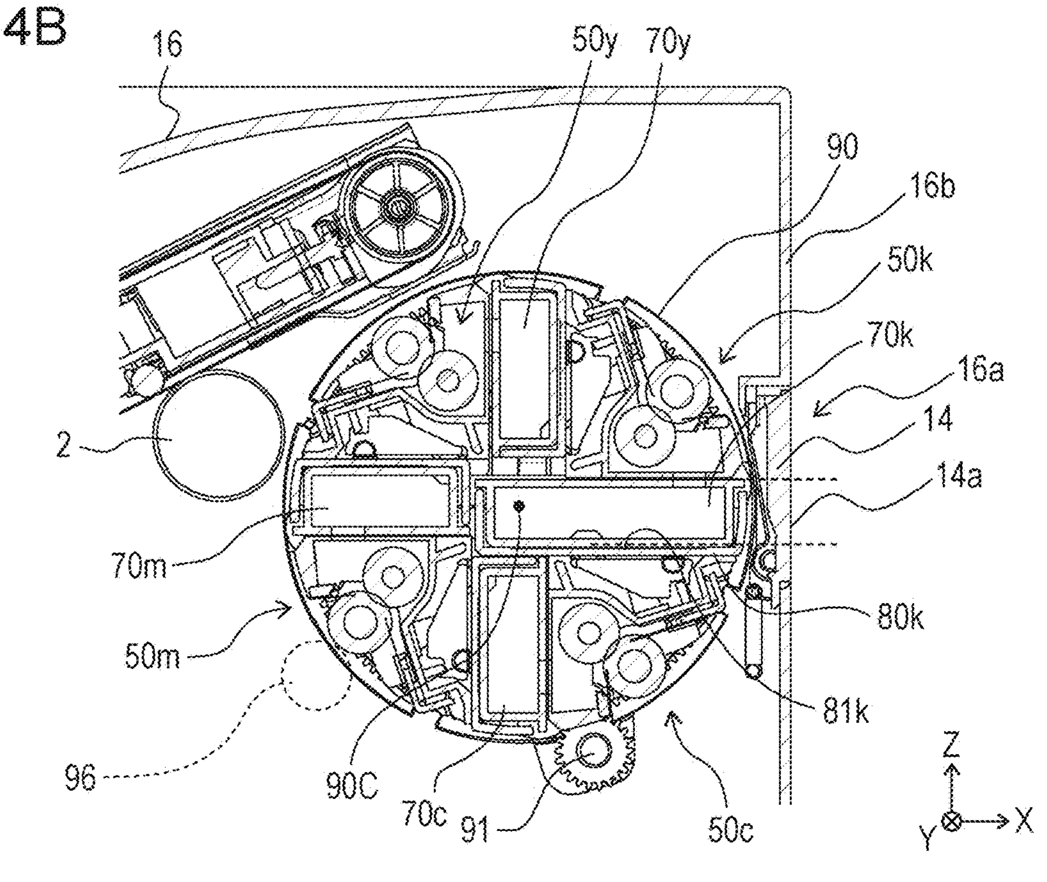
Figure 5:
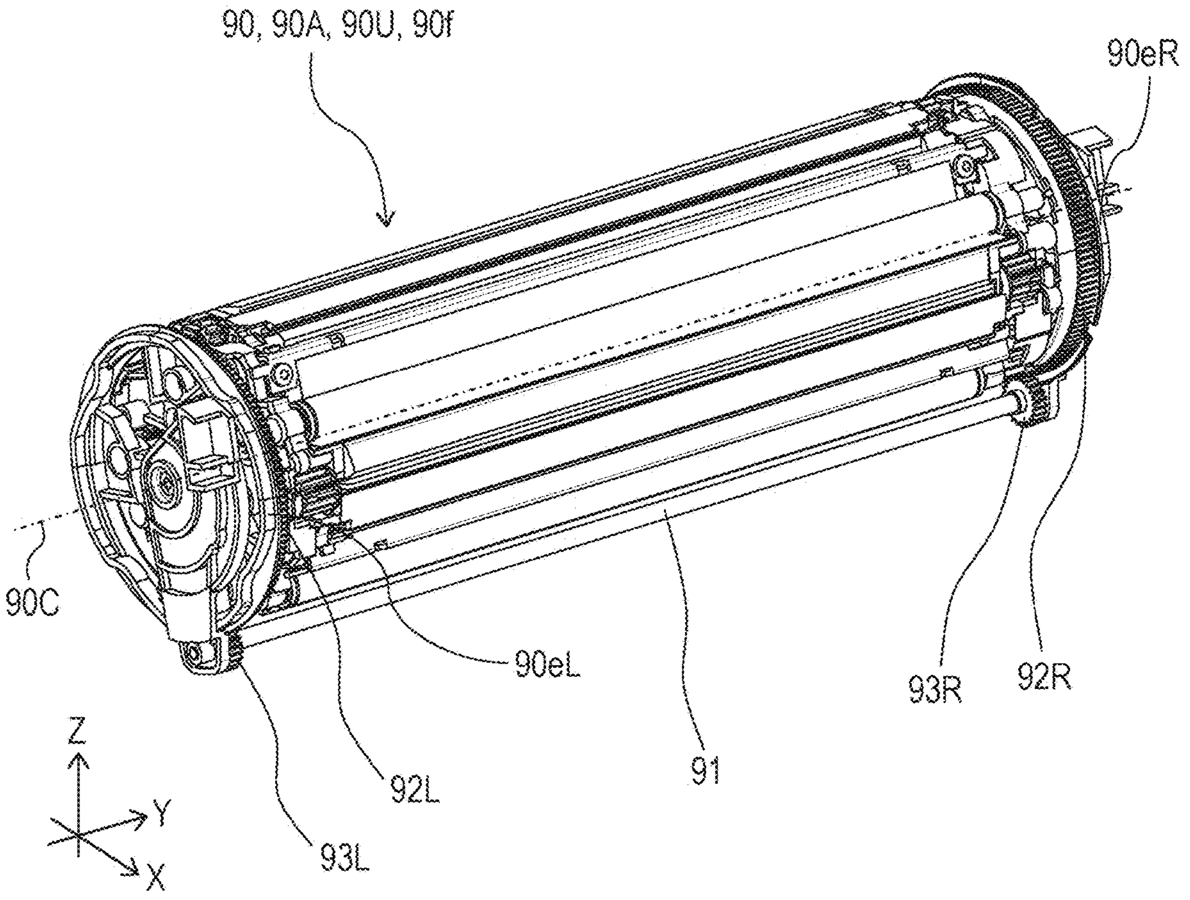
FIG. 5 is a perspective view of a rotary body according to the first embodiment.

FIGS. 4A and 4B are sectional views of the rotary body 90 of the image forming apparatus 1 and a region surrounding the rotary body 90. FIGS. 4A and 4B are sectional views of the apparatus taken along an imaginary plane perpendicular to the rotational axis 90C of the rotary body 90. FIG. 5 is a perspective view of the rotary body 90.

As described above, the toner cartridges 70*y* to 70*k* are removably attachable to the rotary body 90. When the toners in the toner cartridges 70*y* to 70*k* run out, the toner cartridges 70*y* to 70*k* may be replaced so that toners can be supplied to the image forming apparatus 1.

As illustrated in FIG. 1, the apparatus body 1A includes a frame 16 that accommodates the rotary body 90.

The frame 16 is a main frame of the image forming apparatus 1 according to the present embodiment. The frame 16 is a housing (framework) of the apparatus body 1A constituted by frame members and outer members, and is substantially rectangular-parallelepiped-shaped in the present embodiment. The frame 16 accommodates the photosensitive drum 2, the fixing device 40, and the rotary body 90. The frame 16 also accommodates the toner cartridges 70.

The frame 16 has an opening 16*a*. More specifically, the frame 16 has a side surface 16*b* that extends in a direction crossing a horizontal direction. The side surface 16*b* defines at least a portion of a +X-side outer surface of the apparatus body 1A. The opening 16*a* is formed in the side surface 16*b*. The side surface 16*b* is a side surface disposed downstream of an outlet in the apparatus body 1A in a direction in which the sheet S having an image formed thereon is output through the outlet. The user can access the sheet storage unit 300 to supply the sheets S or collect the sheets S output through the outlet from the side adjacent to the side surface 16*b* of the image forming apparatus 1. Therefore, the side surface 16*b* may be regarded as the front surface of the apparatus body 1A.

The toner cartridges 70*y*, 70*m*, 70*c*, and 70*k* are removably attachable to the rotary body 90 through the opening 16*a*. The toner cartridge 70*k* may be regarded as an example of a first toner cartridge that stores the toner to be supplied to the first developing roller (developing roller 51*k*) and that is removably attachable to a rotary (rotary body 90) through the opening 16*a* in the frame 16 of the apparatus body 1A. The toner cartridge 70*m* may be regarded as an example of a second toner cartridge that stores the toner to be supplied to the second developing roller (developing roller 51*m*) and that is removably attachable to the rotary (rotary body 90) through the opening 16*a* in the frame 16 of the apparatus body 1A.

In the present embodiment, the toner cartridges 70*y*, 70*m*, 70*c*, and 70*k* are supported by the trays 80*y* to 80*k* when attached to and removed from the rotary body 90 through the opening 16*a*.

In other words, the user can use the trays 80*y* to 80*k* to attach and remove the toner cartridges 70*y* to 70*k* to/from the rotary body 90.

The opening 16*a* is formed in the side surface 16*b* of the frame 16. In the present embodiment, the side surface 16*b* is substantially parallel to the rotational axis 90C of the rotary body 90. Therefore, when one of the toner cartridges 70 is to be replaced, the toner cartridge 70 to be placed is moved through the opening 16*a* in a direction that crosses (or is orthogonal to) the rotational axis 90C.

The image forming apparatus 1 includes a door 14 that covers the opening 16*a* in the frame 16. The door 14 is an opening-closing member movable between a closed position (see also FIG. 6A) at which the door 14 covers the opening 16*a* and an open position (see also FIGS. 6B and 6C) at which the door 14 is opened to expose the opening 16*a*.

As described above, in the present embodiment, the trays 80 are used to removably attach the toner cartridges 70 to the rotary body 90. Therefore, the toner cartridges 70 can be reliably attached to and removed from the rotary body 90.

More specifically, the user can replace the toner cartridges 70 by attaching and removing the toner cartridges 70 to/from the trays 80, which are movable relative to the rotary body 90 (that is, relative to the apparatus body 1A). If the user directly inserts and extracts a toner cartridge into/from the apparatus body to replace the toner cartridge, the user needs to insert the toner cartridge to a predetermined attachment position in the apparatus body. In the present embodiment, each tray 80 is movable while supporting the corresponding toner cartridge 70 to move the toner cartridge 70 to the attachment position. Therefore, the user can replace the toner cartridge 70 simply by placing the toner cartridge 70 on the tray 80. Thus, the operation is facilitated.

Each toner cartridge 70 has an elongated shape such that the longitudinal direction thereof is the Y direction, which is parallel to the rotational axis 90C of the rotary body 90. In other words, the dimension of the toner cartridge 70 in the longitudinal direction is greater than the height and width of the toner cartridge 70 in a cross-section orthogonal to the longitudinal direction. In the case where the toner cartridge 70 has such an elongated shape, when the opening 16*a* is formed in the side surface 16*b* of the frame 16 that is substantially parallel to the longitudinal direction (Y direction) of the toner cartridge 70, the toner cartridge 70 is only required to move a short distance to pass through the opening 16*a*. The toner cartridge 70 can be more easily replaced than when, for example, the toner cartridge 70 is inserted or extracted through an opening formed in a side surface on one side (+Y side or −Y side) of the frame 16 in the longitudinal direction of the toner cartridge 70.

The rotary body 90 is capable of rotating around the rotational axis 90C to replacement positions at which respective ones of the toner cartridges 70*y* to 70*k* are removable from the rotary body 90. The position in which the toner cartridge 70*y* is removable is referred to as a yellow replacement position. The position in which the toner cartridge 70*m* is removable is referred to as a magenta replacement position. The position in which the toner cartridge 70*c* is removable is referred to as a cyan replacement position.

The position in which the toner cartridge 70*k* is removable is referred to as a black replacement position. The black replacement position is an example of a first replacement position in which the first toner cartridge is removable from the rotary body 90. The yellow, magenta, and cyan replacement positions are examples of a second replacement position in which the second toner cartridge is removable from the rotary body 90. The yellow, magenta, cyan, and black replacement positions may be referred to as first to fourth replacement positions. These ordinal numbers are used for convenience of description, and are interchangeable in principle.

The rotary body 90 is capable of rotating clockwise around the rotational axis 90C in FIG. 1 to successively move to the yellow, magenta, cyan, and black replacement positions. In the present embodiment, the rotary body 90 rotates clockwise around the rotational axis 90C in FIG. 1 to alternately reach a developing position and a replacement position. For example, in FIG. 1, the rotary body 90 is in the black developing position. When the rotary body 90 rotates clockwise from this state, the rotary body 90 successively reaches the cyan replacement position, the yellow developing position, the black replacement position, the magenta developing position, the yellow replacement position, the cyan developing position, and the magenta replacement position in that order. When the rotary body 90 rotates clockwise from the magenta replacement position, the rotary body 90 returns to the black developing position. Thus, the rotary body 90 is capable of rotating clockwise by one revolution (360°) or more.

FIG. 4A is a sectional view of the rotary body 90 in a developing position (more specifically, the yellow developing position). FIG. 4B is a sectional view of the rotary body 90 in a replacement position (more specifically, the black replacement position).

As illustrated in FIGS. 4A and 4B, the four trays 80*y* to 80*k* are attached to the rotary body 90. The trays 80*y* to 80*k* hold the respective toner cartridges 70*y* to 70*k*. FIGS. 4A and 4B illustrate a state in which the trays 80*y* to 80*k* are accommodated in the rotary body 90, which may be regarded as a state in which the toner cartridges 70*y* to 70*k* are attached to the developing units 50*y*, 50*m*, 50*c*, and 50*k*.

As described above, each toner cartridge 70 is movable relative to the developing frame 53 of the corresponding developing unit 50 between the attachment position and the displaced position that is displaced from the attachment position. In other words, the first toner cartridge (toner cartridge 70*k*) is movable relative to the first storage frame (developing frame 53*k*) between a first attachment position and a first displaced position. The second toner cartridge (toner cartridge 70*m*) is movable relative to the second storage frame (developing frame 53*m*) between a second attachment position and a second displaced position.

Referring to FIG. 3, when the toner cartridge 70 is at the attachment position relative to the developing frame 53, the discharge opening 71*b* and the receiving opening 53*b* face each other. In this state, the toner cartridge 70 supplies toner to the developing-device storage unit 53*a* through the receiving opening 53*b* (opening in the storage frame).

The apparatus body 1A includes moving devices 85 configured to move the respective toner cartridges 70 relative to the rotary body 90 (more specifically, relative to the developing frames 53 of the developing units 50) from the attachment position to the displaced position. The moving devices 85 will be described below with reference to FIG. 8 and other figures. In the present embodiment, the rotary body 90 is provided with moving devices 85*y* to 85*k* corresponding to the toner cartridges 70*y* to 70*k*. The trays 80*y* to 80*k* may be regarded as portions of the moving devices 85*y* to 85*k*.

In the present embodiment, the toner cartridge 70*k* storing black toner is larger in size and capable of storing a larger amount of toner than the toner cartridges 70*y* to 70*c* storing yellow toner, magenta toner, and cyan toner. In other words, the first toner cartridge is capable of storing a first amount of toner, the second toner cartridge is capable of storing a second amount of toner, and the first amount is greater than the second amount.

More specifically, the length of the black toner cartridge 70*k* in a first radial direction relative to the rotational axis 90C of the rotary body 90 is greater than the length of the magenta toner cartridge 70*m* in a second radial direction. Here, the first radial direction is a radial direction of the rotary body 90 (radial direction of an imaginary circle having the rotational axis 90C at the center) in which the toner cartridge 70*k* extends relative to the rotational axis 90C when viewed in the direction of the rotational axis 90C. The second radial direction is a radial direction of the rotary body 90 in which the toner cartridge 70*m* extends relative to the rotational axis 90C when viewed in the direction of the rotational axis 90C. Similarly, the length of the black toner cartridge 70*k* in the first radial direction is greater than the lengths of the toner cartridges 70*y* and 70*c* in radial directions corresponding to the toner cartridges 70*y* and 70*c*.

Therefore, the tray 80*k* that holds the black toner cartridge 70*k* is larger in size than the trays 80*y* to 80*c* that hold the other toner cartridges 70*y*, 70*m*, and 70*c*. In other words, the four toner cartridges 70*y* to 70*k* and the four trays 80*y* to 80*k* having different sizes are disposed in the rotary body 90. In other words, the toner cartridge 70*k*, which is an example of a first toner cartridge, and the toner cartridge 70*y*, which is an example of a second toner cartridge that is smaller in size than the first toner cartridge, are removably attachable to the rotary body 90. Accordingly, the tray 80*k*, which is an example of a first support member that supports the first toner cartridge, and the tray 80*y*, which is an example of a second support member that is smaller in size than the first support member, are provided in the rotary body 90. In addition, the toner cartridges 70*m* and 70*c*, which are examples of third and fourth toner cartridges that are smaller in size than the first toner cartridge, are removably attachable to the rotary body 90. Accordingly, the trays 80*m* and 80*c*, which are examples of third and fourth support members that are smaller in size than the first support member, are provided in the rotary body 90.

The operation of rotationally driving the rotary body 90 will be described with reference to FIG. 5. As illustrated in FIG. 5, disc gears 92L and 92R are formed at both ends of the rotary body 90. In addition, rotary drive gears 93L and 93R are connected to both ends of a swing shaft 91 to enable transmission of driving force. The driving force of the motor M1 is transmitted to the rotary drive gear 93R by a driving-force transmission mechanism. Then, the driving force is transmitted to the disc gears 92L and 92R by the rotary drive gears 93L and 93R to rotationally drive the rotary body 90. The rotary body 90 rotates clockwise around the rotational axis 90C in FIG. 1.

The rotary body 90 is supported such that the rotary body 90 is swingable about the swing shaft 91. The rotary body 90 is urged by an urging member (not illustrated) counterclockwise around the swing shaft 91 in FIGS. 4A and 4B. This direction may be regarded as a direction in which each of the developing rollers 51*y* to 51*k* approaches the photosensitive drum 2. As a result, when the rotary body 90 is in a developing position, one of the developing rollers 51*y* to 51*k* is in contact with the photosensitive drum 2.

As illustrated in FIG. 5, rotary cams 90*e*L and 90*e*R are provided at both ends of the rotary body 90. When the rotary body 90 rotates clockwise around the rotational axis 90C in FIGS. 4A and 4B, the rotary cams 90*e*L and 90*e*R come into contact with rollers 96 (FIGS. 4A and 4B) supported by the frame 16. Accordingly, the rotary body 90 swings clockwise about the swing shaft 91 in FIGS. 4A and 4B. This direction may be regarded as a direction in which each of the developing rollers 51*y* to 51*k* moves away from the photosensitive drum 2. In addition, this direction may also be regarded as a direction in which the rotary body 90 approaches the door 14 and the opening 16*a* in the frame 16.

Thus, when the rotary body 90 rotates from a developing position to a replacement position, the rotary body 90 swings about the swing shaft 91. When the rotary body 90 is in a replacement position, the developing roller 51 is separated from the photosensitive drum 2.

Referring to FIG. 4B, in the black replacement position, the toner cartridge 70*k* is stopped at a position at which the toner cartridge 70*k* faces the door 14 and the opening 16*a* formed in the side surface 16*b* of the apparatus body 1A. When the tray 80*k* in this state slides from the attachment position relative to the developing unit 50*k* to the outside of the rotary body 90, the user can replace the toner cartridge 70*k*.

Operation of Replacing Toner Cartridge

Figure 6A:
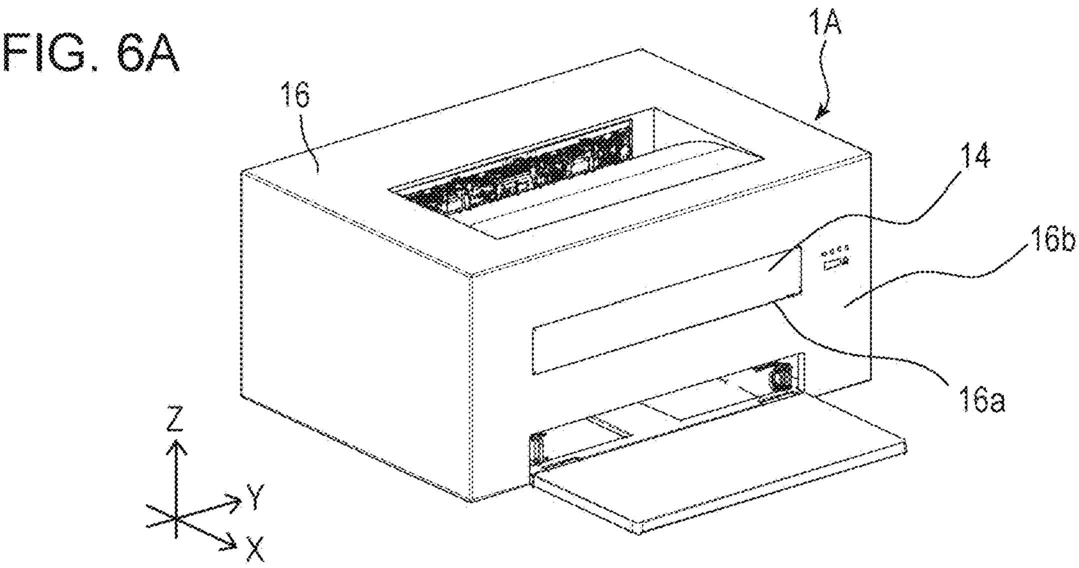
FIGS. 6A to 6C are perspective views of the image forming apparatus according to the first embodiment.
Figure 6B:
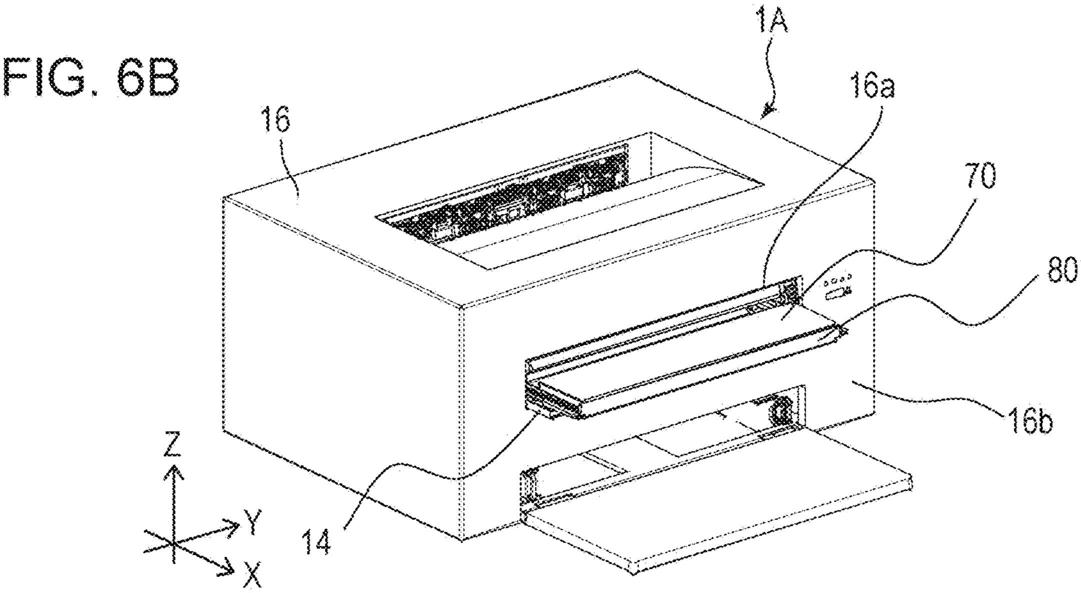
Figure 6C:
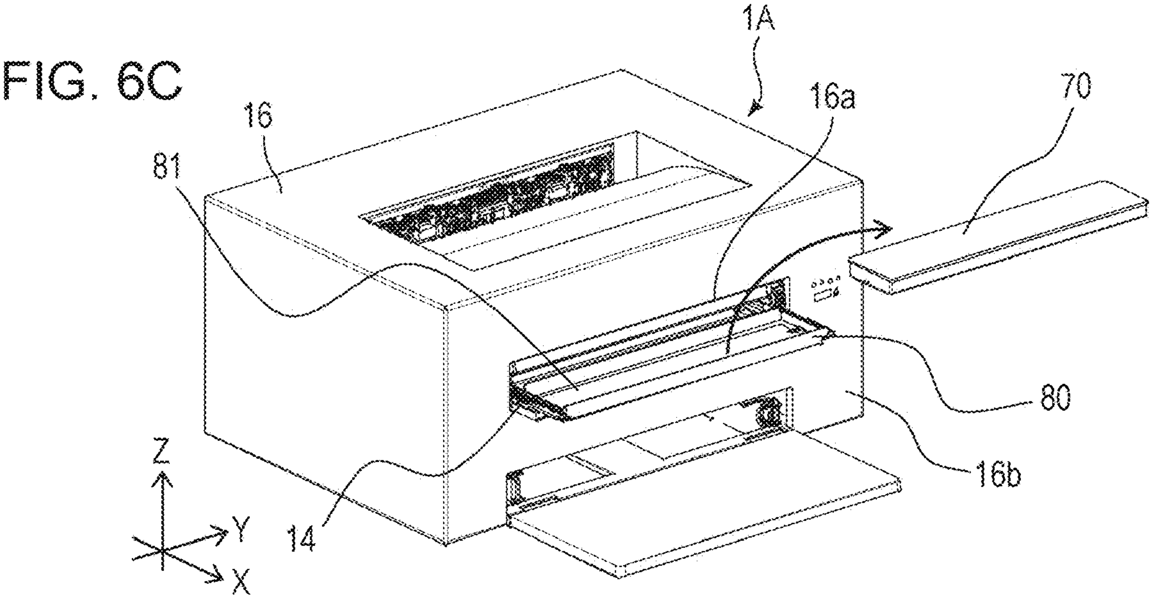
Figure 7A:
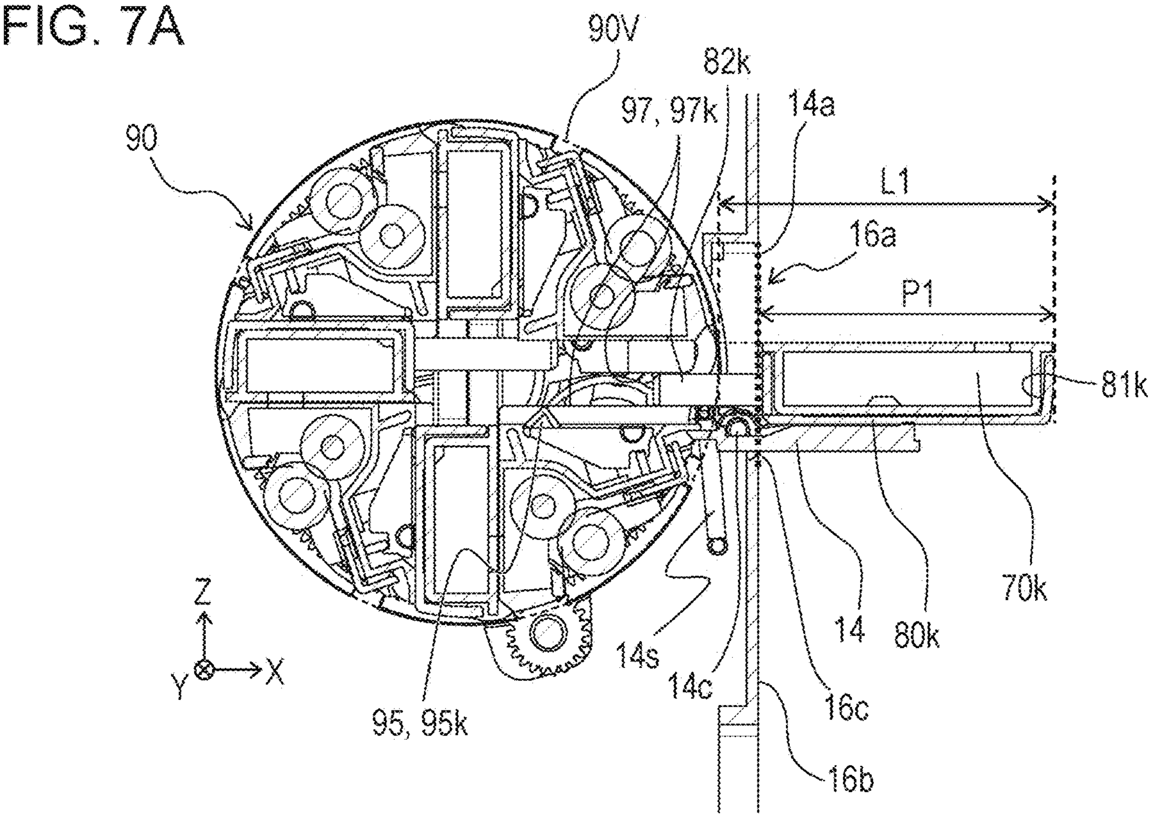
FIGS. 7A and 7B are sectional views of the image forming apparatus according to the first embodiment.
Figure 7B:
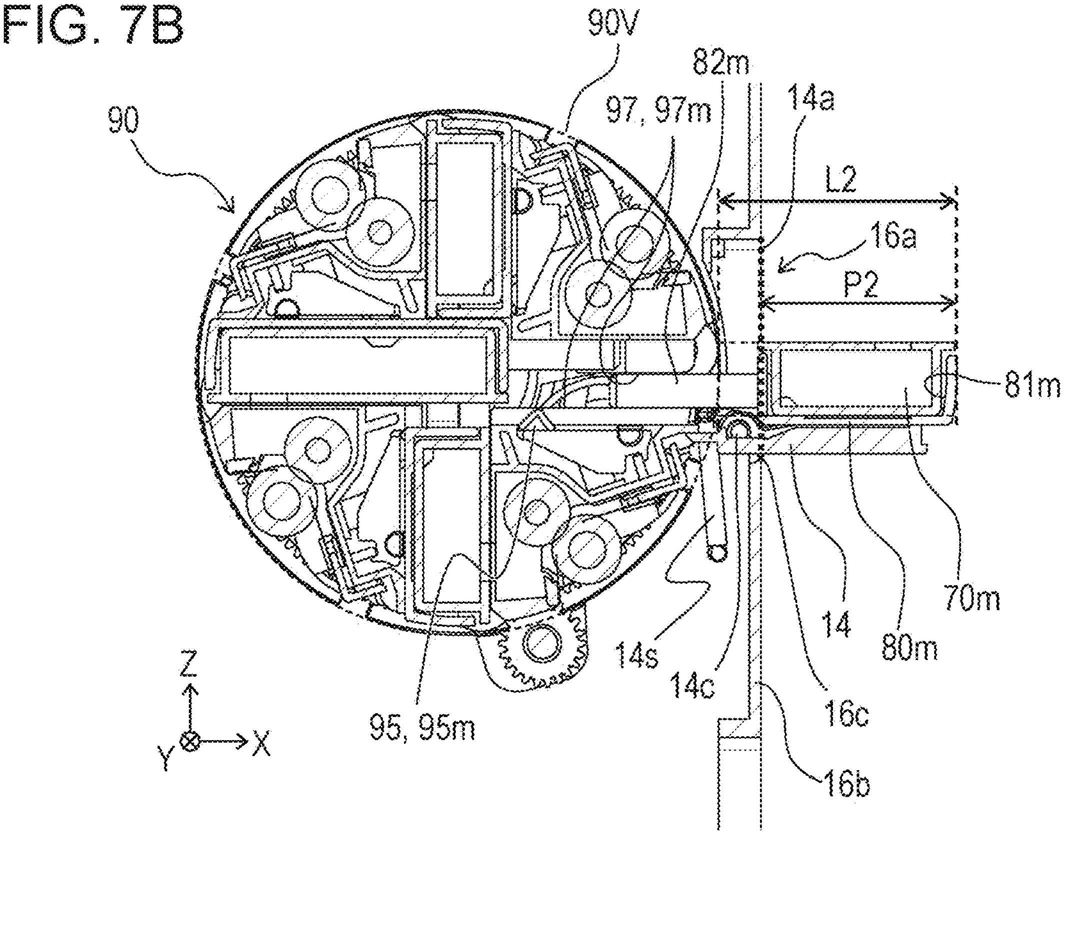

A toner-cartridge replacement operation will be described with reference to FIGS. 4A, FIGS. 6A to 6C, and FIGS. 7A and 7B. FIGS. 6A to 6C are external views of the apparatus body 1A. FIGS. 7A and 7B are sectional views of a region around the rotary body 90 when a toner cartridge is replaced. FIGS. 7A and 7B are sectional views of the apparatus taken along an imaginary plane perpendicular to the rotational axis 90C of the rotary body 90.

FIG. 6A illustrates the appearance of the apparatus body 1A during the image forming operation and in a standby state. Here, "during the image forming operation" means during a period in which the image forming apparatus 1 feeds a sheet S, forms an image on the sheet S, and then outputs the sheet S as a product. The standby state is a state in which the image forming apparatus 1 is capable of starting the image forming operation in response to an image forming instruction (print instruction) and waits for the image forming instruction from the user. As illustrated in FIG. 6A, the door 14 is closed during the image forming operation and in the standby state.

FIG. 6B illustrates the appearance of the apparatus body 1A when a toner cartridge is being replaced. When a toner cartridge is being replaced, the door 14 is opened, and the tray 80 and the toner cartridge 70 are moved to the outside to the apparatus body 1A.

Each toner cartridge 70 is movable relative to the developing frame 53 of the corresponding developing unit 50 between the attachment position and the displaced position that is displaced from the attachment position. As illustrated in FIG. 3, when the toner cartridge 70 is at the attachment position relative to the developing frame 53, the discharge opening 71*b* and the receiving opening 53*b* face each other. As illustrated in FIGS. 4A and 4B, each toner cartridge 70 is at the attachment position while the rotary body 90 rotates around the rotational axis 90C to a developing position or a replacement position.

The operation of replacing a toner cartridge will now be described. First, the user instructs the controller of the apparatus body 1A to perform the toner-cartridge replacement operation. The instruction to perform the toner-cartridge replacement operation is, for example, input through an operation panel (operation member) provided on the apparatus body 1A.

When the controller receives the instruction to perform the toner-cartridge replacement operation, the rotary body 90 rotates to and stops at the replacement position for the toner cartridge 70 to be replaced (toner cartridge 70 in which the toner has run out). More specifically, the controller rotates the rotary body 90 to the replacement position for the toner cartridge specified in the instruction to perform the toner-cartridge replacement operation (in FIG. 4B, to the black replacement position for replacing the black toner cartridge 70*k*). When the rotary body 90 is in the replacement position, the tray 80 supporting the toner cartridge 70 specified to be replaced faces the opening 16*a* in the frame 16 of the apparatus body 1A.

For example, in FIG. 4A, the rotary body 90 is in the yellow developing position in which the yellow developing roller 51*y* faces the photosensitive drum 2. In this state, the black toner cartridge 70*k* and the tray 80*k* do not need to face the opening 16*a* and the door 14. In other words, each toner cartridge 70 and the corresponding tray 80 do not need to face the opening 16*a* and the door 14 when the rotary body 90 is in a replacement position other than the replacement position for the toner cartridge 70 or a developing position. Therefore, the size of the opening 16*a* may be such that each toner cartridge 70 can individually pass through the opening 16*a*. When the rotary body 90 rotates clockwise in FIG. 4A by a predetermined angle from the yellow developing position, as illustrated in FIG. 4B, the black toner cartridge 70*k* and the tray 80*k* face the opening 16*a* and the door 14.

Here, the state in which "the tray 80 faces the opening 16*a*" means that the tray 80 is positioned to be movable to the outside of the apparatus body 1A through the opening 16*a*. In other words, when the tray 80 faces the opening 16*a*, a moving mechanism described below is capable of moving the tray 80 outward in a radial direction of the rotary body 90 so that the tray 80 and the toner cartridge 70 supported by the tray 80 project outward from the apparatus body 1A. In FIG. 4A, none of the trays 80*y* to 80*k* face the opening 16*a*. In FIG. 4B, only the black tray 80*k* faces the opening 16*a*, and the other trays 80*y* to 80*c* do not face the opening 16*a*.

When the rotary body 90 is in the replacement position, the motor M2 moves the tray 80 supporting the toner cartridge 70 to be replaced toward the outside of the apparatus body 1A.

Thus, the toner cartridge 70 to be replaced is moved relative to the rotary body 90 from the attachment position to the displaced position. As illustrated in FIGS. 6B and 6C and FIGS. 7A and 7B, the tray 80 and the toner cartridge 70 to be replaced that is supported by the tray 80 project to the outside of the apparatus body 1A through the opening 16*a*.

More specifically, the tray 80 is movable relative to the rotary body 90 between an accommodation position and a removal position. The accommodation position is a position at which the tray 80 is accommodated in the rotary body 90. The removal position is a position at which the tray 80 projects to the outside of the rotary body 90 and allows the toner cartridge 70 to be removed from the tray 80 (detachment position, replacement-enabled position). Examples of the accommodation position include the positions of the trays 80*y* to 80*k* in FIGS. 4A and 4B. Examples of the removal position include the positions of the tray 80 in FIGS. 6B and 6C, the tray 80*k* in FIG. 7A, and the tray 80*m* in FIG. 7B. Thus, each tray 80 moves between the accommodation position at which the toner cartridge 70 is positioned inside the frame 16 and the removal position at which the toner cartridge 70 is positioned outside the frame 16.

When each tray 80 is at the accommodation position, the toner cartridge 70 attached to the tray 80 is at the attachment position. When each tray 80 is at the removal position, the toner cartridge 70 attached to the tray 80 is at the displaced position.

Figure 8:
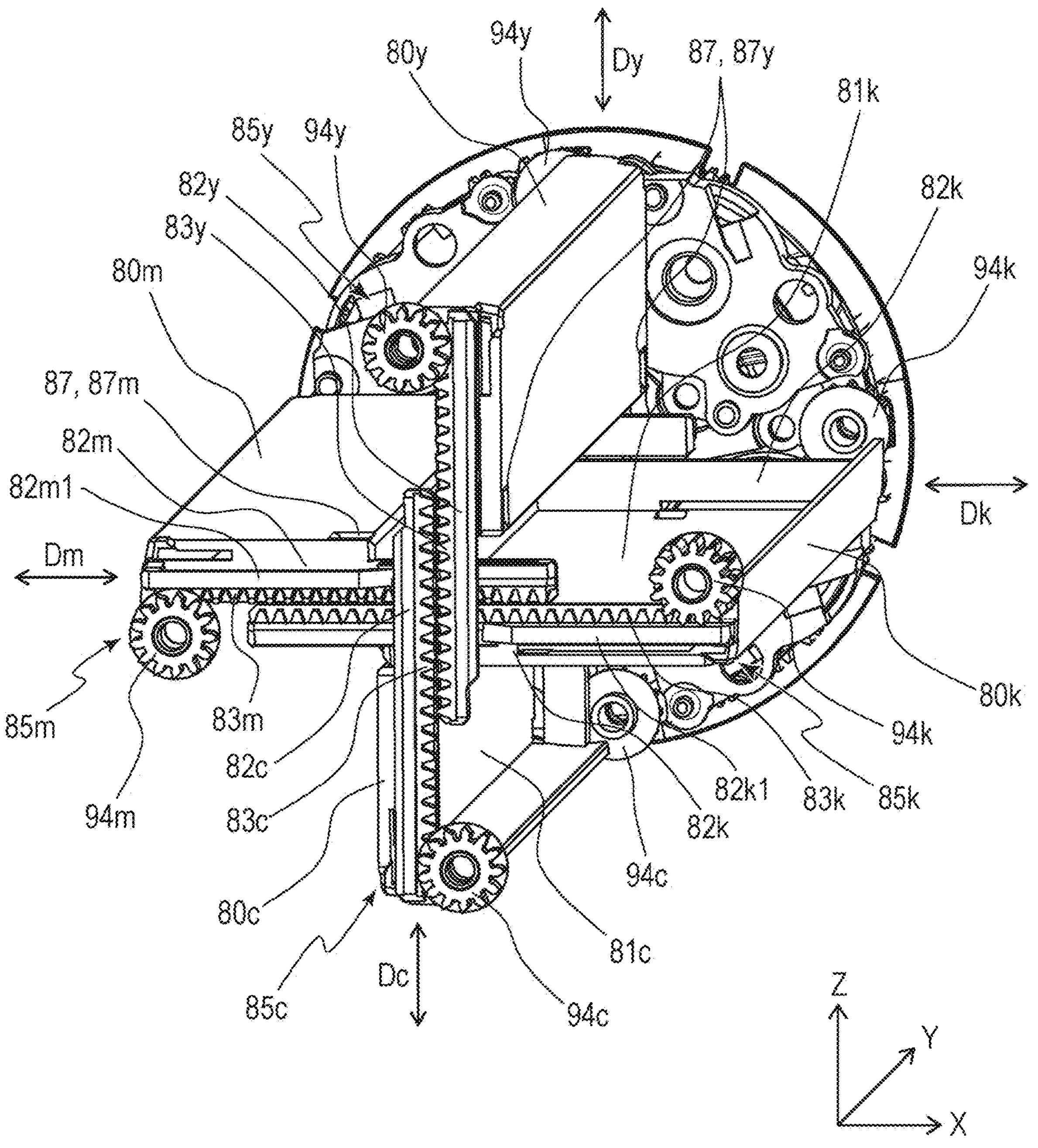
FIG. 8 illustrates the rotary body according to the first embodiment.

As illustrated in FIGS. 7A and 7B, the rotary body 90 includes projections 95 for holding the trays 80 at the accommodation position and holding the toner cartridges 70 at the attachment position. As illustrated in FIG. 8, the trays 80 have recesses 87 to which the projections 95 are fitted. FIGS. 7A and 7B illustrate projections 95*k* and 95*m* corresponding to the trays 80*k* and 80*m*, and FIG. 8 illustrates recesses 87*y* and 87*m* in the trays 80*y* and 80*m*. However, the projections 95 and the recesses 87 are provided for each of the trays 80*y* to 80*k*. The projections 95 may be urged in a direction in which the projections 95 engage with the recesses 87.

When the projections 95 are fitted to the recesses 87 in the trays 80, the trays 80 are restrained relative to the rotary frame 90*f*. Accordingly, when the rotary body 90 rotates, each tray 80 remains at the accommodation position, and the corresponding toner cartridge 70 is prevented from moving from the attachment position. When the tray 80 is moved between the accommodation position and the removal position by the moving device described below, the tray 80 moves the projections 95 so that the projections 95 are released from the recesses 87.

In the present embodiment, the door 14 is supported such that the door 14 is rotatable relative to the apparatus body 1A. As illustrated in FIG. 7A, the door 14 is urged in a direction from the open position toward the closed position by a spring 14*s*. The spring 14*s* is, for example, a tension spring and urges the door 14 to generate a counterclockwise moment around a support shaft 14*c* of the door 14 in FIGS. 7A and 7B.

The tray 80 pushes the door 14 to open the door 14 (state illustrated in FIG. 6B). This state may be regarded as a state in which the door 14 supports the tray 80. The door 14 supports at least a portion of the tray 80 that projects to the outside of the apparatus body 1A, so that the toner cartridge 70 can be reliably supported. In other words, when the first toner cartridge (toner cartridge 70*k*) is at the first displaced position, the opening-closing member (door 14) at the open position supports the first support member (tray 80*k*). When the second toner cartridge (toner cartridges 70*y* to 70*c*) is at the second displaced position, the opening-closing member (door 14) at the open position supports the second support member (trays 80*y* to 80*c*).

When the door 14 is at the open position, the door 14 is in contact with a portion of the frame 16 (for example, a lower edge 16*c* of the opening 16*a*) of the apparatus body 1A so that the door 14 does not rotate downward beyond the open position. When the tray 80 is pulled into the apparatus body 1A from the outside, the door 14 is caused to return to the closed position by the urging force of the spring 14*s*.

Each toner cartridge 70 is removably held by the corresponding tray 80. Therefore, as illustrated in FIG. 6C, the user can perform an operation of removing the toner cartridge 70 from the tray 80 and attaching a new toner cartridge 70 (replacing operation). When multiple toner cartridges 70 are to be replaced, the replacing operation may be performed by repeating the above-described process.

FIGS. 7A and 7B are sectional views of a region around the rotary body 90 when a toner cartridge is replaced.

FIG. 7A illustrates a case in which the black toner cartridge 70*k* is replaced. FIG. 7B illustrates a case in which the magenta toner cartridge 70*m* is replaced.

The image forming apparatus 1 includes the moving devices 85 (FIG. 8), each of which moves the corresponding toner cartridge 70 from the attachment position to the displaced position. In the present embodiment, each moving device 85 may be regarded as including the corresponding tray 80. The moving device 85*k* including the tray 80*k* may be regarded an example of a first moving device including the first support member. The moving device 85*m* including tray 80*m* may be regarded as an example of a second moving device including the second support member.

Each tray 80 is connected to the rotary body 90 (supported by the rotary body 90) even when the corresponding toner cartridge 70 is at the displaced position. To allow the toner cartridge 70 to be easily removed from the rotary body 90, the toner cartridge 70 at the displaced position may project a long distance from the rotary body 90. Since the toner cartridge 70 is removably attachable to the rotary body 90 with the tray 80 provided therebetween, even when the toner cartridge 70 projects a long distance from the rotary body 90, the toner cartridge 70 may be reliably supported by the tray 80.

The direction in which each toner cartridge 70 moves from the attachment position to the displaced position is referred to as a displacement direction. In the present embodiment, the displacement direction of the toner cartridge 70 is a direction that crosses the direction of the rotational axis 90C (Y direction). Therefore, as illustrated in FIGS. 7A and 7B, when viewed in the direction of the rotational axis 90C (Y direction), the displacement direction of the toner cartridge 70 is a direction orthogonal to the direction of the rotational axis 90C (Y direction). The displacement direction of the toner cartridge 70 may also be regarded as a radially outward direction of the rotary body 90 (direction away from the rotational axis 90C).

Referring to FIGS. 7A and 7B, since the user removes the toner cartridge 70 from the rotary body 90, at least a portion of the toner cartridge 70 may project from the rotary body 90 when the toner cartridge 70 is removed. In the present embodiment, when the toner cartridge 70 is at the displaced position, the entire body of the toner cartridge 70 projects from the rotary body 90.

When the rotary body 90 rotates around the rotational axis 90C, the rotational trajectory of the rotary body 90 may be regarded as coinciding with a circumcircle of the rotary body 90 having the rotational axis 90C at the center (imaginary circle 90V shown by the dashed line in FIGS. 7A and 7B). When each toner cartridge 70 is at the displaced position, one-half or more of the length of the toner cartridge 70 in the displacement direction may be disposed outside the rotational trajectory of the rotary body 90. In other words, when the toner cartridge is at the displaced position as viewed in the rotational axis direction of the rotary, one-half or more of the overall length of the toner cartridge in the direction in which the toner cartridge moves from the attachment position to the displaced position may be disposed outside the rotational trajectory of the rotary. This applies to all of the toner cartridges 70 including the toner cartridge 70*k*, which is an example of the first cartridge, and the toner cartridge 70*m*, which is an example of the second cartridge. In addition, in the present embodiment, as illustrated in FIGS. 7A and 7B, when each toner cartridge 70 is at the displaced position, the entire body of the toner cartridge 70 may be outside the rotational trajectory (imaginary circle 90V) of the rotary body 90.

In addition, to allow the user to easily hold each toner cartridge 70, when the toner cartridge 70 is at the displaced position, at least a portion of the toner cartridge 70 is in an outside space of the image forming apparatus 1 (outside space of the apparatus body 1A). Here, the outside space is, for example, a space outside the image forming apparatus 1 (outside the apparatus body 1A) when the image forming apparatus 1 is used in, for example, the operation of forming an image on the sheet S.

In the present embodiment, an outer surface of the apparatus body 1A is formed of an outer surface of the frame 16. In other words, the outside space may also be regarded as a space outside the frame 16. Therefore, the state in which at least a portion of the toner cartridge 70 is in the outside space may also be regarded as a state in which at least a portion of the toner cartridge 70 projects outward from the frame 16 through the opening 16*a* in the frame 16 of the apparatus body 1A.

In the present embodiment, when the door 14 is at the closed position, the opening 16*a* in the frame 16 of the apparatus body 1A is covered by the door 14. An outer surface 14*a* of the door 14 in the closed position forms a portion of the outer surface of the apparatus body 1A. In this case, the outside space refers to a space outside the outer surface 14*a* of the door 14 at the closed position. In other words, assuming that the position of the outer surface 14*a* of the door 14 in the closed position is an exterior position, when the toner cartridge 70 is at the displaced position, at least a portion of the toner cartridge 70 projects outward from the apparatus body 1A beyond the exterior position.

In other words, at least a portion of the toner cartridge 70 is positioned in the space outside the apparatus body 1A defined when the door 14 is at the closed position. In addition, at least a portion of the toner cartridge 70 is positioned downstream of the exterior position in the displacement direction of the toner cartridge 70.

Assuming that the side surface 16*b* in which the opening 16*a* is formed is the front surface of the apparatus body 1A, when the toner cartridge 70 is at the displaced position, at least a portion of the toner cartridge 70 may be regarded as projecting forward from the front outer surface of the apparatus body 1A. In this case, the user can access the toner cartridge 70 from the front of the image forming apparatus and easily replace the toner cartridge 70.

When the toner cartridge 70 is at the displaced position, one-half or more of the length of the toner cartridge 70 in the displacement direction may be in the outside space. In other words, when the toner cartridge 70 is at the displaced position as viewed in the rotational axis direction of the rotary, one-half or more of the overall length of the toner cartridge in the direction in which the toner cartridge moves from the attachment position to the displaced position may be disposed outside the main frame. This applies to all of the toner cartridges 70 including the toner cartridge 70*k*, which as an example of the first cartridge, and the toner cartridge 70*m*, which as an example of the second cartridge. In addition, when the toner cartridge 70 is at the displaced position, the entire body of the toner cartridge 70 may be in the outside space. In the present embodiment, the outer surface 14*a* of the door 14 and the side surface 16*b* form the front outer surface of the apparatus body 1A. However, the structure of the door 14 is not limited to this. For example, the size of the door 14 may be such that the door 14 covers the entire side surface 16*b*. In this case, the outer surface 14*a* of the door 14 forms the front outer surface of the apparatus body 1A.

Each tray 80 includes a cartridge holder 81 that holds the corresponding toner cartridge 70 (see FIGS. 3 and 6C). The cartridge holder 81 is an attachment part to which the toner cartridge 70 is attached. When the tray 80 is at the removal position, the entire body of the cartridge holder 81 may be outside the rotational trajectory of the rotary body 90 in the displacement direction. When the tray 80 is at the removal position, one-half or more of the length of the cartridge holder 81 in the displacement direction may be in the outside space.

As described above, the toner cartridge 70*k* and the tray 80*k* are larger in size than the other toner cartridges 70*y* to 70*c* and the other trays 80*y* to 80*c*. Therefore, as FIGS. 7A and 7B, in the present embodiment, the amount by which each tray 80 is moved to replace the corresponding toner cartridge is changed in accordance with the size of the toner cartridge 70.

More specifically, as illustrated in FIG. 7A, the distance by which the tray 80*k* (first support member) moves from the accommodation position (first accommodation position) to the removal position (first removal position) is L1. The distance by which the tray 80*m* (second support member) moves from the accommodation position to the removal position (third removal position) is L2. Although FIG. 7B illustrates the movement of the toner cartridge 70*m* and the tray 80*m*, the distances by which the trays 80*y* and 80*c* are moved from the accommodation position to the removal position are also L2. Here, L1 is greater than L2. In other words, the distance by which the first support member moves to move the first toner cartridge from the first attachment position to the first displaced position is greater than the distance by which the second support member moves to move the second toner cartridge from the second attachment position to the second displaced position.

As illustrated in FIG. 7A, when the tray 80*k* is at the removal position and the toner cartridge 70*k* is at the displaced position, the toner cartridge 70*k* projects into the outside space from the outer surface of the apparatus body 1A by a distance P1. In the present embodiment, the tray 80*k* also projects into the outside space from the outer surface of the apparatus body 1A by the distance P1.

As illustrated in FIG. 7B, when the tray 80*m* is at the removal position and the toner cartridge 70*m* is at the displaced position, the toner cartridge 70*m* projects into the outside space from the outer surface of the apparatus body 1A by a distance P2. In the present embodiment, the tray 80*m* also projects into the outside space from the outer surface of the apparatus body 1A by the distance P2. The toner cartridges 70*y* and 70*c* also project into the outside space from the outer surface of the apparatus body 1A by the distance P2.

The above-described distance P1 is greater than the distance P2. More specifically, assume that the distance by which the first toner cartridge at the first displaced position projects from the opening 16*a* in the apparatus body 1A is a first distance (P1), and that the distance by which the second toner cartridge at the second displaced position projects from the opening 16*a* is a second distance (P2). In this case, the first distance is greater than the second distance.

The distance P2 by which the toner cartridges 70*y* to 70*c*, which are smaller in size than the toner cartridge 70*k*, project into the outside space at the displaced position may be less than the distance P1 by which the toner cartridge 70*k* projects into the outside space at the displaced position in consideration of strength. This is because of the following reasons. That is, when each toner cartridge 70 is at the displaced position, at least a portion of the toner cartridge 70 projects outward from the rotational trajectory of the rotary body 90, or into the outside space from the outer surface of the apparatus body 1A. At this time, the weight of the toner cartridge 70 is supported by the tray 80, which is supported by the rotary body 90 in a cantilever manner. Therefore, as the distance P2 by which the toner cartridges 70*y* to 70*c* project into the outside space at the displaced position is reduced, the load applied to the trays 80*y* to 80*k* and guiding portions 97 of the rotary body 90 that support the trays 80*y* to 80*c* is reduced. In addition, since the toner cartridges 70*y* to 70*c* are smaller in size than the toner cartridge 70*k*, even when the distance P2 is less than the distance P1, the cartridges on the trays 80*y* to 80*c* can still be easily replaced.

Arrangement of Trays in Rotary

Figure 9:
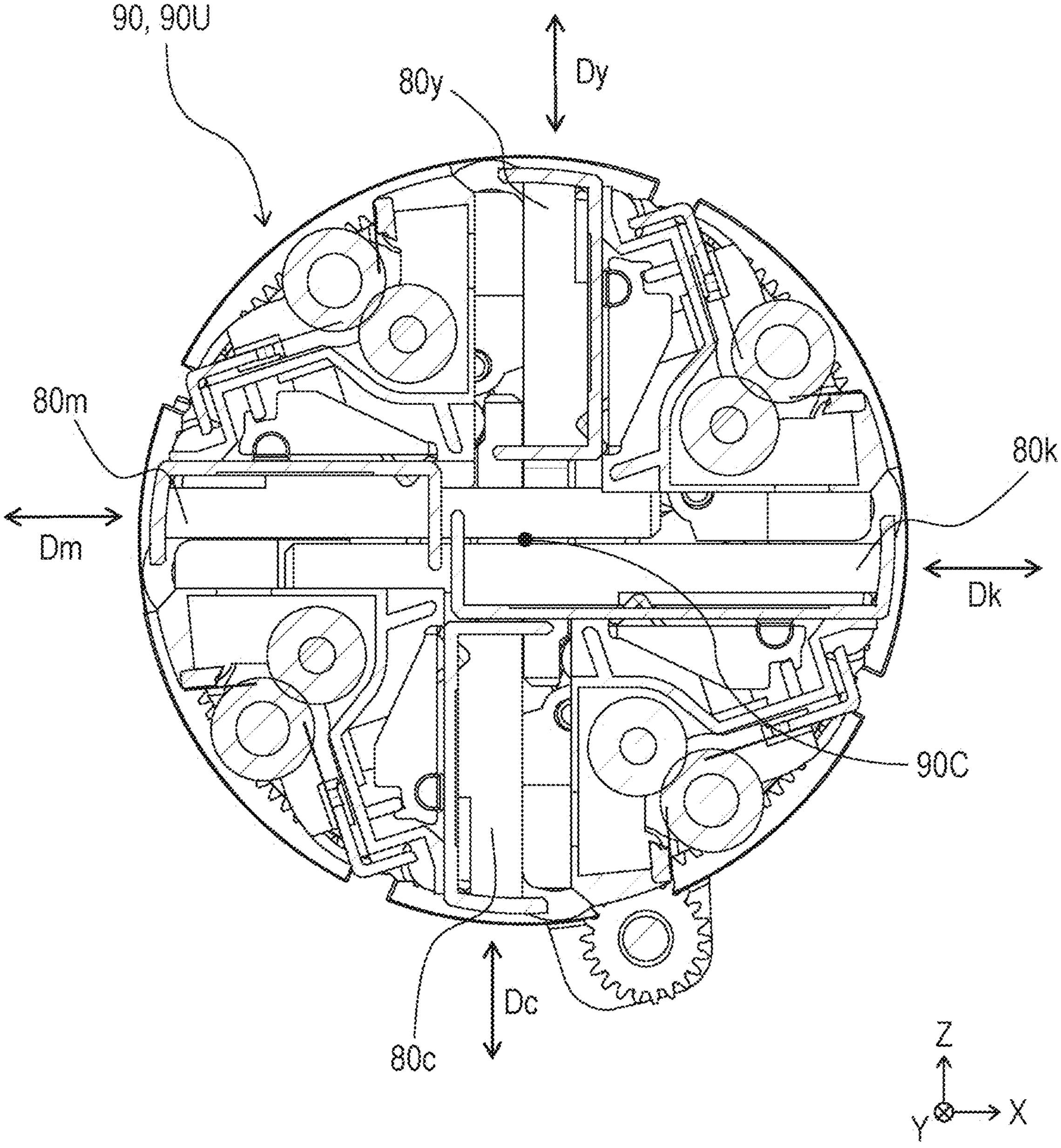
FIG. 9 illustrates the rotary body according to the first embodiment.
Figure 10:
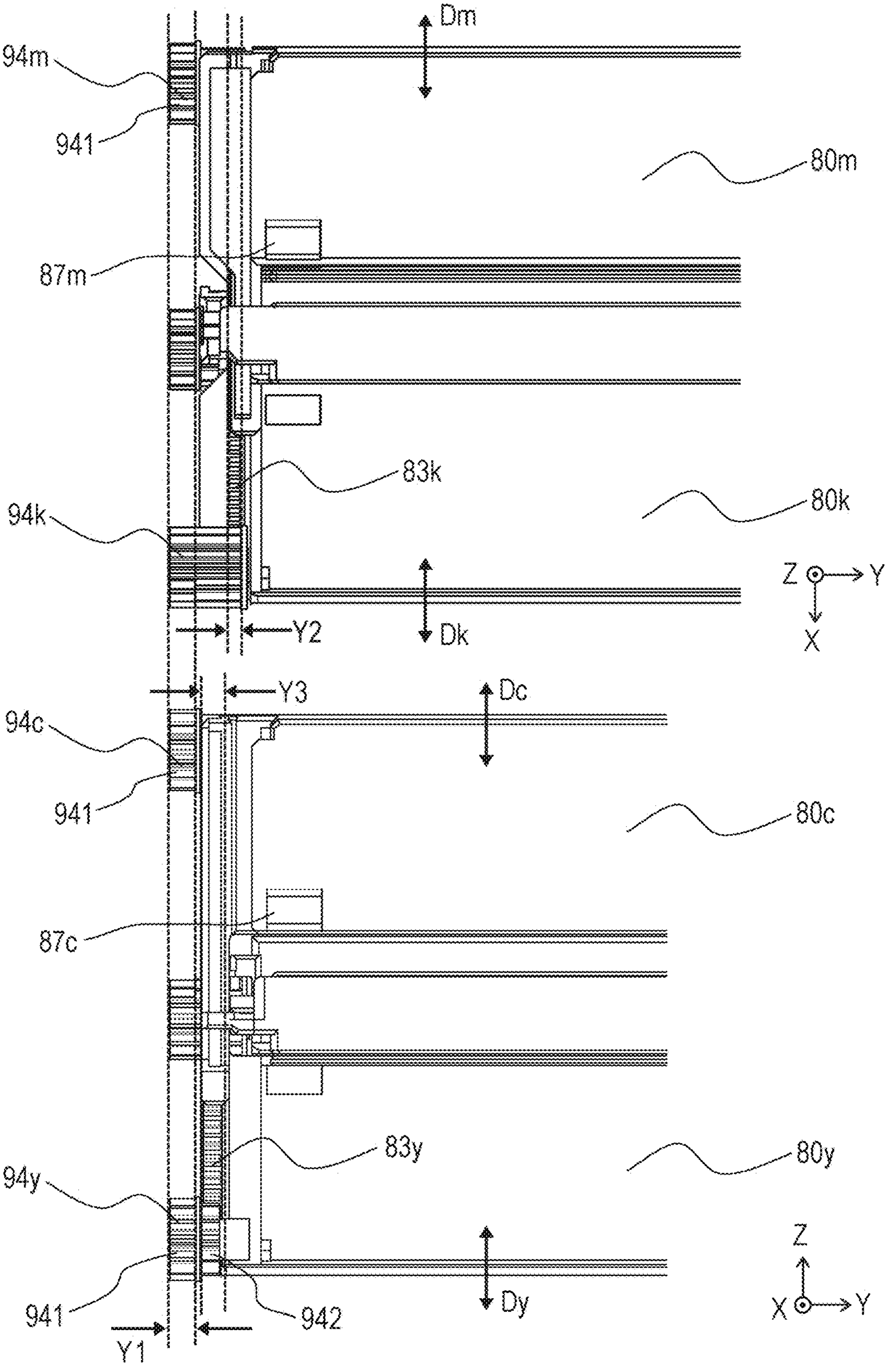
FIG. 10 illustrates the rotary body according to the first embodiment.

The arrangement of the trays 80*y* to 80*k* in the rotary body 90 will be described with reference to FIGS. 8, 9, and 10. FIG. 8 is a perspective view illustrating the arrangement of the trays 80*y* to 80*k* in the rotary body 90. FIG. 9 is a sectional view illustrating the arrangement of the trays 80*y* to 80*k* in the rotary body 90. FIG. 10 illustrates the arrangement of members of the trays 80*y* to 80*k* at one end in the Y direction. FIG. 9 is a sectional view of the rotary body 90 taken along an imaginary plane perpendicular to the rotational axis 90C of the rotary body 90. The upper half of FIG. 10 illustrates the rotary body 90 and the trays 80*m* and 80*k* in FIG. 8 viewed from the upper right (+Z side) in FIG. 8, and the lower half of FIG. 10 illustrates the rotary body 90 and the trays 80*c* and 80*y* in FIG. 8 viewed from the left (−X side) in FIG. 8.

As illustrated in FIG. 8, the trays 80*y* to 80*k* include the respective cartridge holders 81*y* to 81*k* and guided portions 82*y* to 82*k*.

The toner cartridges 70*y* to 70*k* are attached to the respective cartridge holders 81*y* to 81*k*. Each of the cartridge holders 81*y* to 81*k* accommodates at least a portion of one of the toner cartridges 70*y* to 70*k* that is attached thereto.

The guided portions 82*y* to 82*k* are provided at both ends of the respective trays 80*y* to 80*k* in the Y direction with the cartridge holders 81*y* to 81*k* disposed therebetween. The guided portions 82*y* to 82*k* are elongated members that extend in a direction orthogonal to the rotational axis of the rotary body 90.

Figure 11A:
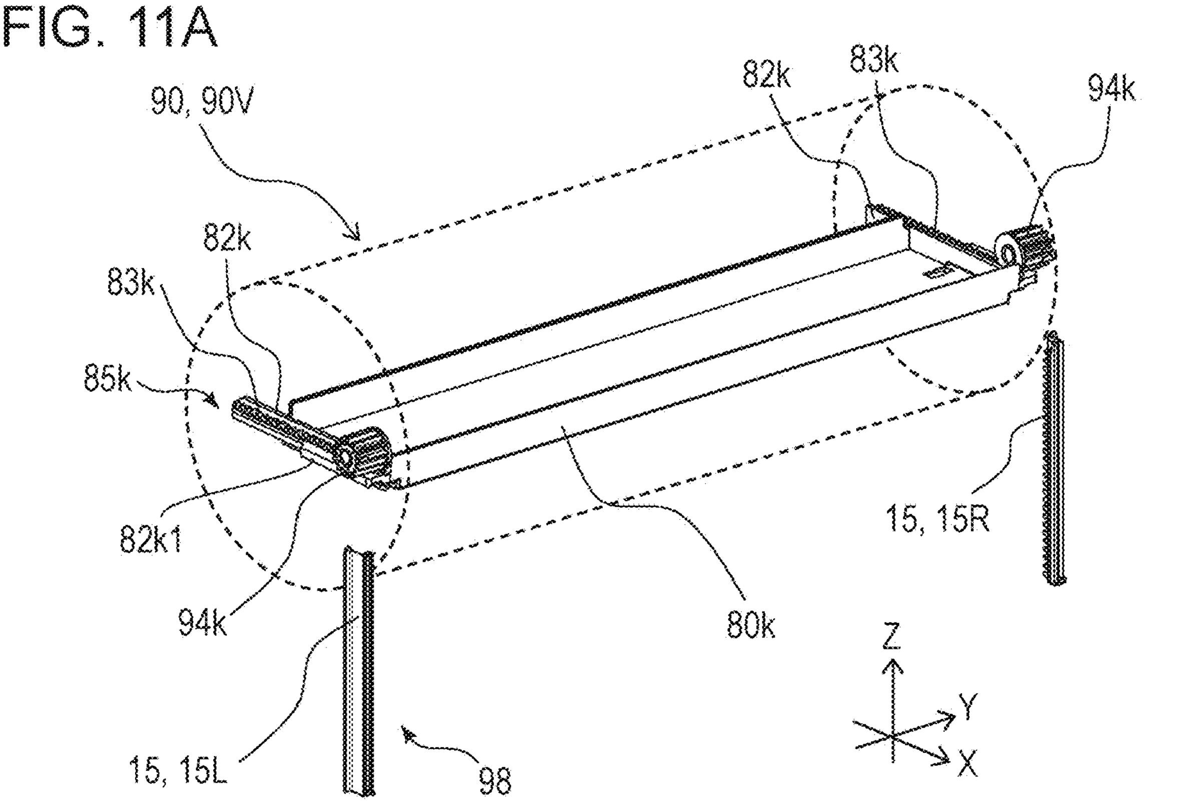
FIGS. 11A and 11B illustrate a structure related to a movement of the tray according to the first embodiment.
Figure 11B:
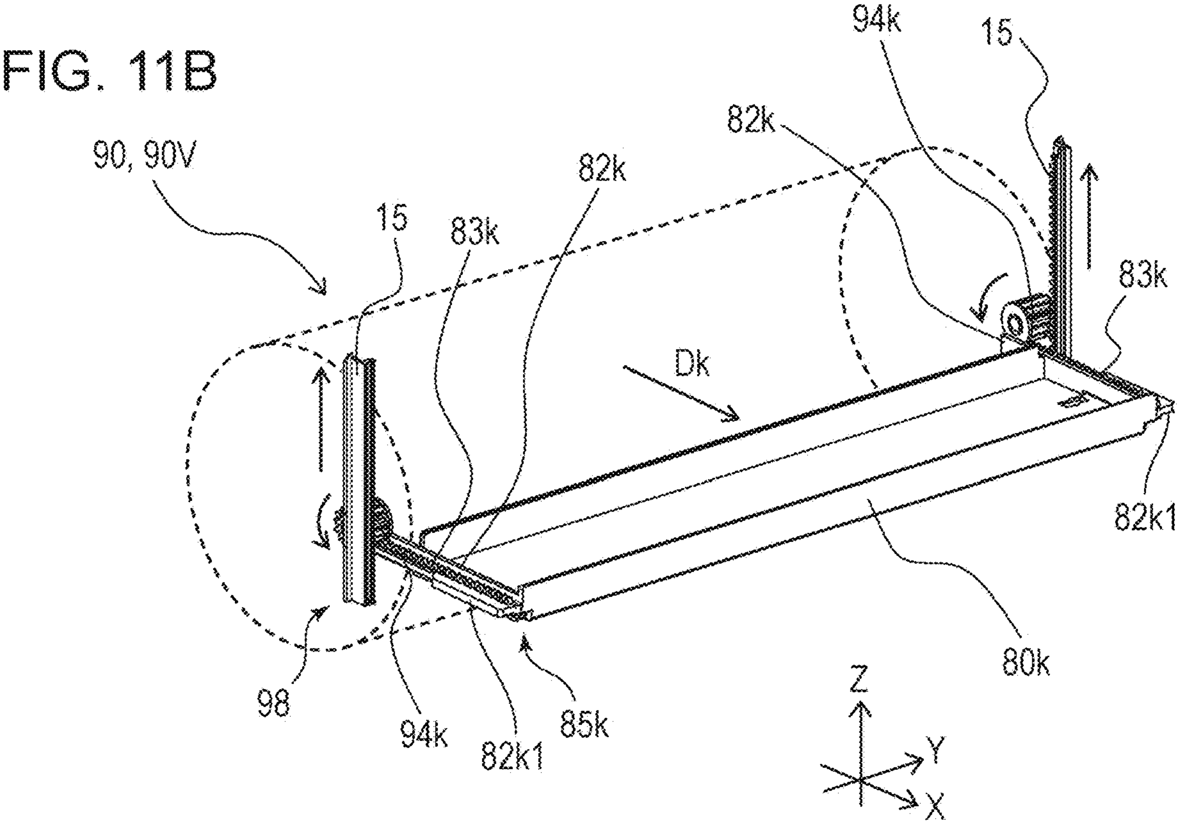

In the present embodiment, a reinforcing rib 82*kl* is formed on a portion of each guided portion 82*k* in a movement direction Dk of the tray 80*k*, and a reinforcing rib 82*m*1 is formed on a portion of each guided portion 82*m* in a movement direction Dm of the tray 80*m* (see also FIGS. 11A and 11B). The reinforcing ribs 82*k*1 and 82*m*1 project outward in the Y direction from the guided portions 82*k* and 82*m* at both ends of the trays 80*k* and 80*m* in the Y direction, and have the shape of elongated ribs that extend in the movement directions Dk and Dm of the trays 80*k* and 80*m*. The reinforcing ribs 82*k*1 and 82*m*1 serve to increase the rigidity of the guided portions 82*k* and 82*m*.

In the present embodiment, the lengths of the reinforcing ribs 82*m*1 and 82*kl* are limited to avoid interference with the guided portions 82*y* and 82*c*. However, when the reinforcing ribs 82*m*1 and 82*k*1 do not interfere with the guided portions 82*y* and 82*c*, the reinforcing ribs 82*m*1 and 82*k*1 may be formed to extend over the entire lengths of the guided portions 82*m* and 82*k*. The guided portions 82*y* and 82*c* may also be provided with reinforcing ribs. When the guided portions 82*m* and 82*k* are sufficiently rigid, the reinforcing ribs 82*m*1 and 82*k*1 may be omitted.

Rack parts 83*y* to 83*k* (rack gears) are formed on the guided portions 82*y* to 82*k*. In addition, pinion gears 94*y* to 94*k* are rotatably held in the rotary body 90. The pinion gears 94*y* to 94*k* mesh with the respective rack parts 83*y* to 83*k* to enable transmission of driving force.

The rack parts 83*y* to 83*k* and the pinion gears 94*y* to 94*k* are parts of the moving devices 85*y* to 85*k* configured to move the toner cartridges 70*y* to 70*k* from the attachment position to the displaced position. The rack parts 83*y* to 83*k* and the pinion gears 94*y* to 94*k* may be regarded as parts of driven devices driven by the driving device 98 of the apparatus body 1A.

The pinion gears 94*y* to 94*k* may be regarded as rotating bodies (rotating members) that rotate to move the trays 80*y* to 80*k* relative to the rotary body 90.

The pinion gears 94*y* to 94*k* and the rack parts 83*y* to 83*k* serve as driven units that allow the moving devices 85*y* to 85*k* of the rotary body 90 to receive driving force from the driving device 98 of the apparatus body 1A. The pinion gear 94*k* and the rack part 83*k* are examples of a first pinion gear and a first rack gear, respectively, that constitute at least a portion of a first driven unit included in the first moving device. The pinion gear 94*m* and the rack part 83*m* are examples of a second pinion gear and a second rack gear, respectively, that constitute at least a portion of a second driven unit included in the second moving device.

The rotary body 90 includes the guiding portions 97 (see FIGS. 7A and 7B) that engage with the respective guided portions 82*y* to 82*k*. FIG. 7A illustrates the guiding portion 97 (97*k*) that engages with the guided portion 82*k* of the tray 80*k*, and FIG. 7B illustrates the guiding portion 97 (97*m*) that engages with the guided portion 82*m* of the tray 80*m*. The rotary body 90 also includes similar guiding portions that engage with the guided portions 82*y* and 82*c* of the trays 80*y* and 80*c*. Although FIGS. 7A and 7B illustrate the guiding portions 97 provided at one side (+Y side) of the rotary body 90 in the Y direction, similar guiding portions 97 are provided at the other side (−Y side) of the rotary body 90 in the Y direction.

When each tray 80 moves between the accommodation position and the removal position, the guiding portions 97 remain engaged with the guided portions 82 in at least a portion of the range of movement to guide the movement direction of the tray 80. In the present embodiment, the guiding portions 97 remain engaged with the guided portions 82*k* over the entire range of movement of the tray 80*k* between the accommodation position and the removal position. In addition, in the present embodiment, the guiding portions 97 remain engaged with the guided portions 82*m* over the entire range of movement of the tray 80*m* between the accommodation position and the removal position.

Referring to FIGS. 8 and 9, the four trays 80*y* to 80*k* are disposed to overlap each other in the rotary body 90 as described in detail below.

When the pinion gears 94*y* to 94*k* rotate, the rack parts 83*y* to 83*k* and the trays 80*y* to 80*k* move relative to the rotary body 90. As illustrated in FIG. 9, the four trays 80*y* to 80*k* are arranged such that the movement directions thereof relative to the rotary body 90 are 90 degrees apart from each other. Therefore, the tray 80*y* and the tray 80*c* are slidable in substantially the same direction (parallel directions), and the tray 80*m* and the tray 80*k* are slidable in substantially the same direction (parallel directions). The movement directions in which the trays 80*y* to 80*k* slide are regulated by the above-described engagements between the guided portions 82*y* to 82*k* and the guiding portions 97.

The trays 80*y* to 80*k* move to the outside space through the opening 16*a*. When each of the trays 80*y* to 80*k* moves to the outside space through the opening 16*a*, each tray moves in substantially the same (parallel) direction.

As illustrated in FIG. 9, the region in which the tray 80*k* is disposed overlaps the region in which the tray 80*y* is disposed and the region in which the tray 80*c* is disposed in the movement direction Dk of the tray 80*k*. In addition, the region in which the tray 80*k* is disposed overlaps the rotational axis 90C of the rotary body 90 in the movement direction Dk of the tray 80*k*. In other words, the toner cartridge 70*k* held by the cartridge holder 81*k* of the tray 80*k* may be regarded as overlapping the rotational axis 90C of the rotary body 90 (FIG. 4B).

The region in which the tray 80*m* is disposed is shifted so as not to overlap the region in which the tray 80*y* is disposed and the region in which the tray 80*c* is disposed in the movement direction Dm of the tray 80*m*. In addition, the region in which the tray 80*y* is disposed is shifted so as not to overlap the region in which the tray 80*m* is disposed and the region in which the tray 80*k* is disposed in the movement direction Dy of the tray 80*y*. Similarly, the region in which the tray 80*c* is disposed is shifted so as not to overlap the region in which the tray 80*m* is disposed and the region in which the tray 80*k* is disposed in the movement direction Dc of the tray 80*c*.

The positional relationship between the trays 80 may be described as follows. That is, when viewed in the movement direction Dy of the tray 80*y*, the tray 80*y* overlaps the tray 80*k*, but does not overlap the tray 80*m*. When viewed in the movement direction Dm of the tray 80*m*, the tray 80*m* overlaps the tray 80*k*, but does not overlap the trays 80*y* and

80*c*. When viewed in the movement direction Dc of the tray 80*c*, the tray 80*c* overlaps the tray 80*k*, but does not overlap the tray 80*m*.

Here, the state in which two elements (members, components, units, or the like) overlap when viewed in a specific direction means that when the elements are projected onto an imaginary plane perpendicular to the specific direction, the projection region of one element and the projection region of the other element at least partially overlap.

As illustrated in FIGS. 8 and 10, the region in which the rack part 83*m* and the guided portion 82*m* are disposed and the region in which the rack part 83*k* and the guided portion 82*k* are disposed at least partially overlap in the direction of the rotational axis 90C (Y direction). In other words, in the present embodiment, the region in which the first rack gear (rack part 83*k*) is disposed and the region in which the second rack gear (rack part 83*m*) is disposed at least partially overlap in the rotational axis direction of the rotary (Y direction). Therefore, compared to when the rack part 83*m* and the guided portion 82*m* do not overlap the rack part 83*k* and the guided portion 82*k*, the rack parts 83*m* and 83*k* and the guided portions 82*m* and 82*k* may be disposed in a smaller space in the Y direction.

The region in which the rack part 83*y* and the guided portion 82*y* are disposed and the region in which the rack part 83*c* and the guided portion 82*c* are disposed at least partially overlap in the direction of the rotational axis 90C (Y direction). In other words, in the present embodiment, the region in which the third rack gear (rack part 83*y*) is disposed and the region in which the fourth rack gear (rack part 83*c*) is disposed at least partially overlap in the rotational axis direction of the rotary (Y direction). Therefore, compared to when the rack part 83*y* and the guided portion 82*y* do not overlap the rack part 83*c* and the guided portion 82*c*, the rack parts 83*y* and 83*c* and the guided portions 82*y* and 82*c* may be disposed in a smaller space in the Y direction.

The positions at which the rack parts 83 mesh with the respective pinion gears 94 will be described with reference to FIG. 10. The upper half of FIG. 10 illustrates the position at which the rack part 83*k* and the pinion gear 94*k* mesh with each other. The lower half of FIG. 10 illustrates the position at which the rack part 83*y* and the pinion gear 94*y* mesh with each other.

In a region Y1 illustrated in FIG. 10 along the direction of the rotational axis 90C of the rotary body 90 (Y direction), the driving force transmitted from the motor M2 (FIG. 2) serving as the drive source is transmitted to the pinion gears 94*y* to 94*k* through a transmission device described below. In a region Y2 along the Y direction in FIG. 10, the pinion gear 94*k* meshes with the rack part 83*k* to enable transmission of the driving force. In a region Y3 along the Y direction in FIG. 10, the pinion gear 94*y* meshes with the rack part 83*y* to enable transmission of the driving force. Similarly to the rack part 83*k*, the rack part 83*m* also meshes with the pinion gear 94*m* (FIG. 8) in the region Y2 to enable transmission of the driving force. Similarly to the rack part 83*y*, the rack part 83*c* also meshes with the pinion gear 94*c* (FIG. 8) in the region Y3 to enable transmission of the driving force.

The regions Y2 and Y3 are at different positions in the Y direction (shifted from each other in the Y direction). The region Y1 is at a position different from each of the regions Y2 and Y3 in the Y direction. In other words, the region Y1 is shifted from the regions Y2 and Y3 in the Y direction.

When the toner cartridges 70*y* and 70*c* are at the attachment position, the region in which the rack part 83*y* is disposed and the region in which the rack part 83*c* is disposed at least partially overlap in the movement direction of the rack part 83*y* (movement direction Dy of the tray 80*y*). In the present embodiment, the movement directions Dy and Dc of the trays 80*y* and 80*c* are substantially the same (parallel). Therefore, also in the movement direction Dc of the tray 80*c*, the region in which the rack part 83*y* is disposed and the region in which the rack part 83*c* is disposed at least partially overlap. Accordingly, when the toner cartridges 70*y* and 70*c* are at the attachment position, a tooth surface of the rack part 83*y* and a tooth surface of the rack part 83*c* face each other in the direction orthogonal to the movement directions Dy and Dc of the rack parts 83*y* and 83*c* (in the left-right direction in FIG. 8).

When the toner cartridges 70*m* and 70*k* are at the attachment position, the region in which the rack part 83*m* is disposed and the region in which the rack part 83*k* is disposed at least partially overlap in the movement direction of the rack part 83*m* (movement direction Dm of the tray 80*m*). In the present embodiment, the movement directions Dm and Dk of the trays 80*m* and 80*k* are substantially the same (parallel). Therefore, also in the movement direction Dk of the tray 80*k*, the region in which the rack part 83*m* is disposed and the region in which the rack part 83*k* is disposed at least partially overlap. Accordingly, when the toner cartridges 70*m* and 70*k* are at the attachment position, a tooth surface of the rack part 83*m* and a tooth surface of the rack part 83*k* face each other in the direction orthogonal to the movement directions Dm and Dk of the rack parts 83*m* and 83*k* (in the up-down direction in FIG. 8).

Figure 12A:
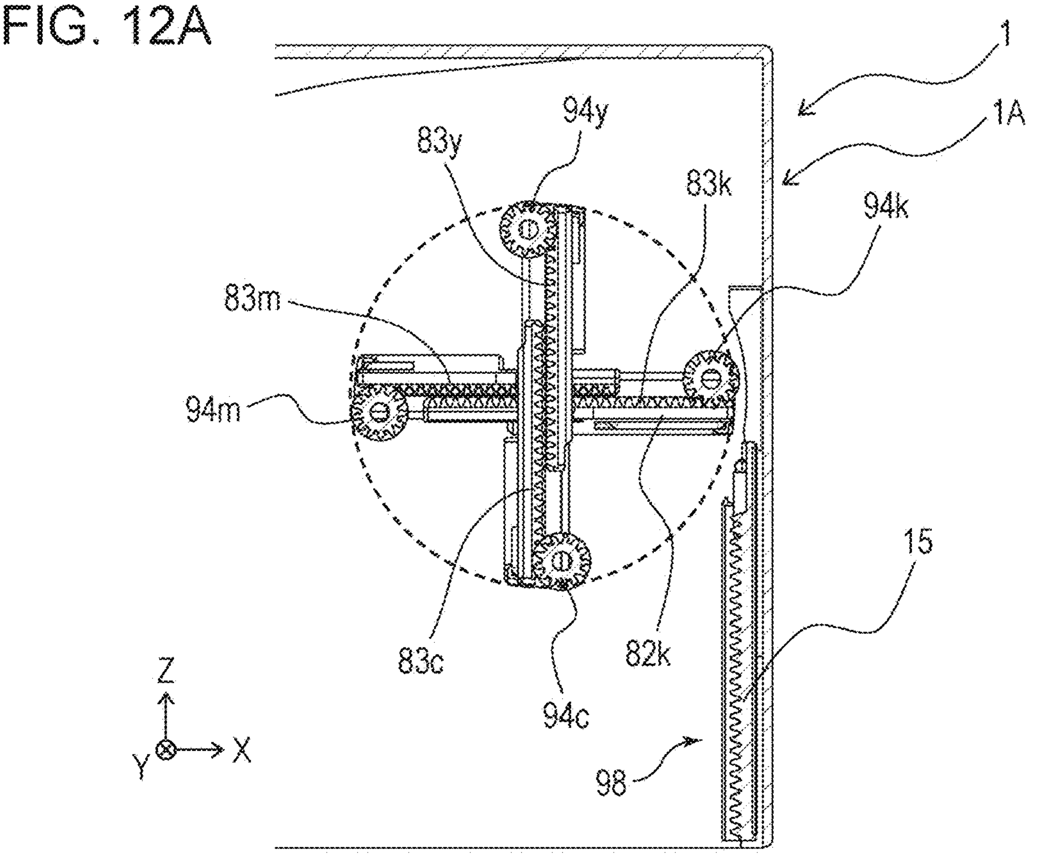
FIGS. 12A and 12B illustrate the structure related to the movement of the tray according to the first embodiment.

As illustrated in FIG. 12A described below, when viewed in the direction of the rotational axis 90C (Y direction), the rack part 83*y* overlaps the rack parts 83*m* and 83*k*. When viewed in the direction of the rotational axis 90C (Y direction), the rack part 83*m* overlaps the rack parts 83*y* and 83*c*. When viewed in the direction of the rotational axis 90C (Y direction), the rack part 83*c* overlaps the rack parts 83*m* and 83*k*. When viewed in the direction of the rotational axis 90C (Y direction), the rack part 83*k* overlaps the rack parts 83*y* and 83*c*. In other words, the region in which the first rack gear (rack part 83*k*) is disposed and the region in which the second rack gear (rack part 83*y*) is disposed do not overlap in the rotational axis direction of the rotary (Y direction). When viewed in the rotational axis direction of the rotary (Y direction), assuming that the first toner cartridge 70*k* is at the first attachment position and the second toner cartridge 70*y* is at the second attachment position, the first rack gear (rack part 83*k*) and the second rack gear (rack part 83*y*) overlap.

Thus, the position at which the rack parts 83*k* and 83*m* are disposed in the Y direction differs from the position at which the rack parts 83*y* and 83*c* are disposed. Therefore, when viewed in the Y direction, the rack parts 83*y* and 83*c* may be disposed to overlap the rack parts 83*m* and 83*k*.

Accordingly, the four trays may be arranged in a small space in the rotary body 90, and the radial size of the rotary body 90 can be reduced. If the rack parts 83 are disposed so as not to overlap when viewed in the Y direction while the moving distances of the trays 80*y* to 80*k* remain equivalent to those in the present embodiment, the area required to arrange the four rack parts is increased when viewed in the Y direction. In contrast to such a structure, when the rack parts 83 are shifted from each other in the Y direction so that the rack parts 83 overlap each other when viewed in the Y direction, the area of the region in which the rack parts 83 are disposed can be reduced when viewed in the Y direction.

In addition, in the present embodiment, the four rack parts 83*y* to 83*k* are grouped into two pairs that are shifted from each other in the Y direction. More specifically, in the rotational axis direction of the rotary (Y direction), the regions in which the first and second rack gears are disposed overlap, and the regions in which the third and fourth rack gears are disposed overlap. In addition, in the Y direction, the region in which the first and second rack gears are disposed and the region in which the third and fourth rack gears are disposed do not overlap. Thus, compared to when the four rack parts 83*y* to 83*k* are shifted from each other in the Y direction, the size of the rotary body 90 in the Y direction can be reduced.

Structures for Moving Trays

Figure 12B:
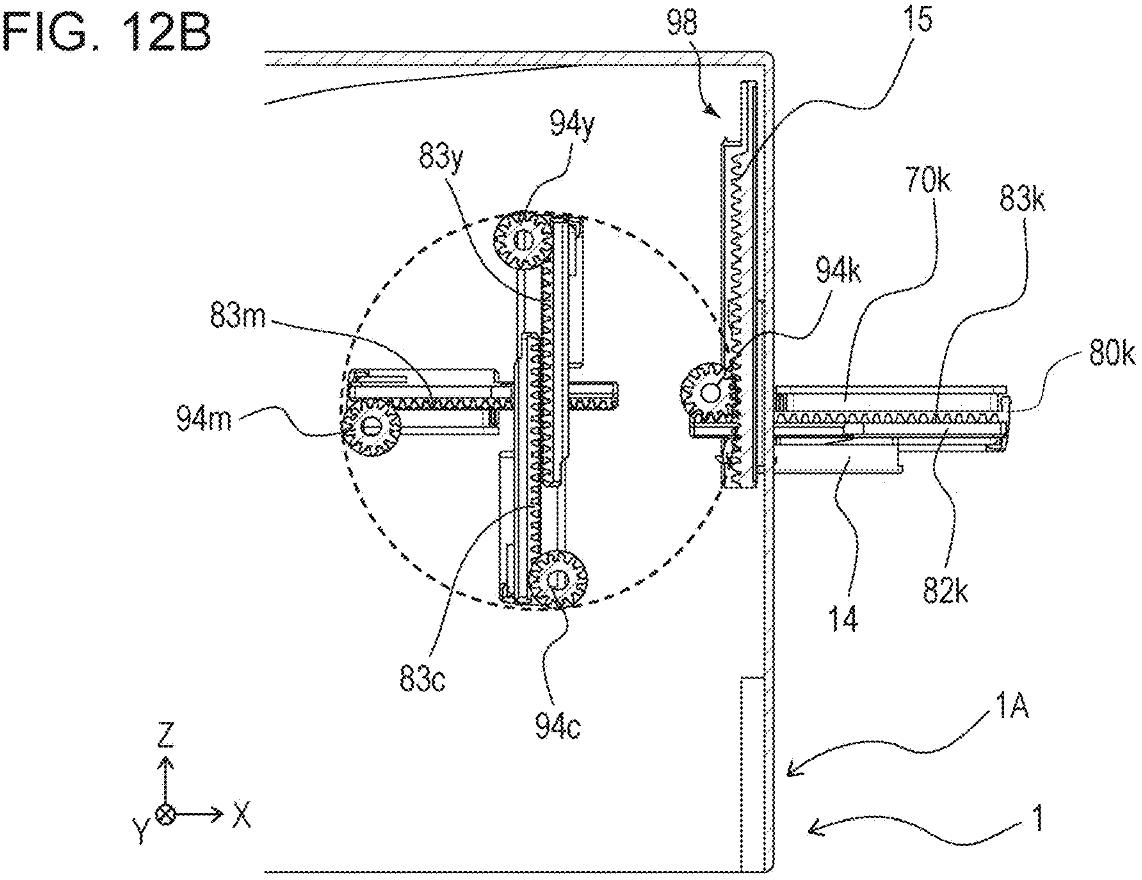

The structures for moving the trays 80*y* to 80*k* arranged in the rotary body 90 will be described with reference to FIGS. 11A and 11B and FIGS. 12A and 12B. FIGS. 11A and 11B are perspective views illustrating the structure for moving the tray 80*k*. FIGS. 12A and 12B are sectional views illustrating the structure for moving the tray 80*k*.

In the present embodiment, the trays 80*y* to 80*k* are driven when the driving force of the motor M2 is transmitted to the pinion gears 94*y* to 94*k* by the drive racks 15L and 15R that serve as a transmission device. Here, the structure for moving the tray 80*k* relative to the rotary body 90 will be described. The structures for moving the trays 80*y* to 80*c* relative to the rotary body 90 are substantially similar to the structure for moving the tray 80*k*, and description thereof is thus omitted.

FIG. 11A illustrates a state in which the tray 80*k* is inside the rotary body 90 (that is, a state in which the toner cartridge 70*k* is attached to the developing unit 50*k*). In other words, FIG. 11A illustrates a state in which the tray 80*k* is at the accommodation position and in which the toner cartridge 70*k* is at the attachment position relative to the developing frame 53*k* (FIG. 4A). FIG. 11B illustrates a state in which the tray 80*k* has been slid out of the rotary body 90. In other words, FIG. 11B illustrates a state in which the tray 80*k* is at the removal position and in which the toner cartridge 70*k* is at the displaced position relative to the developing frame 53*k* (FIG. 4B).

The apparatus body 1A of the present embodiment includes the drive racks 15L and 15R as drive gears that drive the pinion gears 94. Each drive rack 15 is driven by the motor M2 through a driving-force transmission mechanism (not illustrated).

As described above, two rack parts 83*k* are formed at the respective ends of the tray 80*k* in the Y direction. Two pinion gears 94*k* and two drive racks 15L and 15R are provided at positions corresponding to the rack parts 83*k* at the respective ends. More specifically, the apparatus body 1A of the present embodiment includes the drive racks 15L and 15R as first and second drive gears. The drive rack 15L is an example of a first drive gear, and the drive rack 15R is an example of a second drive gear.

These ordinal numbers are used for convenience of description, and are interchangeable in principle. The drive racks 15L and 15R are referred to as "drive racks 15" when it is not necessary to distinguish between the drive racks 15L and 15R.

The rack parts 83 of the present embodiment constitute a pair of rack gears, and the pinion gears 94 of the present embodiment constitute a pair of pinion gears. The rack gears and the pinion gears are disposed at one and the other ends of the support member (tray 80) in the Y direction in the present embodiment, but may be disposed at other positions. The rack parts 83*k* and the pinion gears 94*k* of the moving device 85*k* corresponding to the tray 80*k* may be regarded as examples of a first pair of rack gears and a first pair of pinion gears, respectively.

The rack parts 83*y* to 83*c* and the pinion gears 94*y* to 94*c* of the moving devices 85*y* to 85*c* corresponding to the outer trays 80*y* to 80*c* may be regarded as examples of a second pair of rack gears and a second pair of pinion gears.

One of the pair of rack gears meshes with one of the pair of pinion gears, and the other of the pair of rack gears meshes with the other of the pair of pinion gears. At least one of the pair of pinion gears is driven by the drive rack 15L that serves as the first drive rack. In the present embodiment, the pair of pinion gears are simultaneously driven by the drive racks 15L and 15R that serve as the first drive rack and the second drive rack, respectively. Thus, the tray 80 does not tend to rotate, and the toner cartridge 70 can be reliably moved.

Alternatively, the tray 80 may be structured to include one rack part 83 and moved by one drive rack 15 through one pinion gear 94.

The tray 80*k* is held such that the tray 80*k* is slidable relative to the rotary body 90 in a direction parallel to the guided portions 82*k* (that is, in the movement direction Dk). The drive racks 15 are held such that the drive racks 15 are slidable relative to the apparatus body 1A in a direction crossing the movement direction Dk of the tray 80*k*. The drive racks 15 are configured to slide (reciprocate) relative to the apparatus body 1A in a first direction (vertically upward in the present embodiment) and in a second direction opposite to the first direction (vertically downward in the present embodiment). In other words, the movement direction of the drive racks 15 of the present embodiment is a direction crossing (or orthogonal to) both the movement direction Dk of the tray 80*k* and the direction of the rotational axis 90C of the rotary body 90 (Y direction).

A tray-moving operation in which the tray 80*k* is caused to slide between the accommodation position and the removal position will be described with reference to FIGS. 11A and 11B. The tray-moving operation of the tray 80*k* is carried out by the motor M2 (FIG. 2), the driving-force transmission mechanism (not illustrated), the drive racks 15, the pinion gears 94*k*, and the rack parts 83*k*.

The tray-moving operation for removing the toner cartridge 70*k* from the rotary body 90 (tray-drawing operation) will now be described. Before the tray-drawing operation is started, the drive racks 15 are positioned below the position at which the drive racks 15 mesh with the pinion gears 94*k* (FIG. 11A). In addition, as described above, the rotary body 90 is in the replacement position for the toner cartridge 70*k* (FIG. 4B) when the toner cartridge 70*k* is to be replaced.

When the tray-drawing operation is started, the drive racks 15 are caused to slide upward relative to the apparatus body 1A by the driving force of the motor M2.

As illustrated in FIG. 11B, the pinion gears 94*k* are rotationally driven in the direction shown by the arrows, so that the driving force is applied to the rack parts 83*k* that mesh with the pinion gears 94*k*. Accordingly, the tray 80*k* is pushed to the outside space and moves relative to the rotary body 90 from the accommodation position to the removal position. At this time, the tray 80*k* is guided to move in the predetermined movement direction Dk due to the engagement between the guided portions 82*k* and the guiding portions 97*k* (FIG. 7A) of the rotary body 90. As a result of the tray 80*k* moving from the accommodation position to the removal position, the toner cartridge 70*k* is moved relative to the developing unit 50*k* from the attachment position to the displaced position.

When the tray 80*k* is at the removal position and the toner cartridge 70*k* is at the displaced position, the user can attach and remove the toner cartridge 70*k* to/from the tray 80*k*.

The procedure of the tray-moving operation for attaching the toner cartridge 70 to the rotary body 90 (tray-retracting operation, tray insertion operation) is the reverse of that of the tray-drawing operation. For example, the user operates a predetermined operation member to start the tray-retracting operation. When the tray-retracting operation is started, the drive racks 15 are caused to slide downward relative to the apparatus body 1A by the driving force of the motor M2. Here, the rotation direction of the motor M2 in the tray-retracting operation is opposite to that in the tray-drawing operation.

When the pinion gears 94*k* are rotationally driven in the direction opposite to the direction shown by the arrows in FIG. 11B, the driving force is applied to the rack parts 83*k* that mesh with the pinion gears 94*k*. Accordingly, the tray 80*k* is retracted and moves relative to the rotary body 90 from the removal position to the accommodation position.

The tray 80*k* is guided to move in the movement direction Dk (direction opposite to the direction shown by the arrow in FIG. 11B) due to the engagement between the guided portions 82*k* and the guiding portions 97*k* (FIG. 7A) of the rotary body 90. As a result of the tray 80*k* moving from the removal position to the accommodation position, the toner cartridge 70*k* is moved relative to the developing unit 50*k* from the displaced position to the attachment position.

Although the movement of the black tray 80*k* and the toner cartridge 70*k* has been described, the other trays 80*y* to 80*c* and the other toner cartridges 70*y* to 70*c* are also moved by similar structures. More specifically, the drive racks 15 transmit the driving force to the pinion gears 94*y* to 94*c* at the replacement position for each toner cartridge.

The motor M2 provided in the apparatus body 1A and the transmission device including the drive racks 15 (15L and 15R) and the driving-force transmission mechanism constitute the driving device 98 for driving the moving devices 85 provided in the rotary body 90.

As described above, in the present embodiment, the rotary body 90 is provided with the moving devices 85*k* to 85*y* corresponding to the toner cartridges 70*y* to 70*k*. The driving device 98 of the apparatus body 1A is a shared driving device that drives the moving devices 85*k* to 85*y* (a plurality of driven devices) of the rotary body 90.

In addition, in the present embodiment, the rotary body 90 rotates to change the object to be driven by the driving device 98. In other words, the driving device of the present embodiment includes the drive racks 15 that serve as the transmission members that transmit the driving force of the drive source. The driving device may be set to a state in which the transmission members engage with the first driven unit (pinion gears 94*k*) to enable transmission of the driving force and a state in which the transmission members engage with the second driven unit (pinion gears 94*m*) to enable transmission of the driving force. In addition, the driving device may also be set to the state in which the transmission members are separated from the first driven unit and the second driven unit.

As described above, the pinion gears 94*y* to 94*k* are held by the rotary body 90. Therefore, when the rotary body 90 rotates, the pinion gears 94*y* to 94*k* may be disengaged from the drive racks 15.

FIG. 12A illustrates a state in which the tray 80*k* is inside the rotary body 90 (at the accommodation position). FIG. 12B illustrates a state in which the tray 80*k* has been moved out of the rotary body 90 (moved to the removal position).

As illustrated in FIG. 12A, when the tray 80*k* is inside the rotary body 90, each drive rack 15 is positioned in a lower section of the apparatus body 1A. In this state, each drive rack 15 is separated from the corresponding pinion gear 94*k*. Therefore, the rotary body 90 can be rotated without being impeded by the drive rack 15. More specifically, the drive rack 15 can be disposed outside the rotational trajectory of the rotary body 90 shown by the dotted line in FIGS. 12A and 12B.

As described above, each tray 80 attached to the rotary body 90 is movable relative to the rotary body 90 from the accommodation position to the removal position and from the removal position to the accommodation position by rotationally driving the motor M2 in forward and reverse directions. In other words, the driving device of the present embodiment is capable of driving each moving device of the rotary not only to move the corresponding toner cartridge from the attachment position to the displaced position but also to move the corresponding toner cartridge from the displaced position to the attachment position.

As described above, in the present embodiment, the amount by which each tray 80 is moved when the corresponding toner cartridge 70 is to be replaced is changed depending on the size of the toner cartridge 70. More specifically, as illustrated in FIGS. 7A and 7B, the distance L1 by which the black tray 80*k* is moved from the accommodation position to the removal position is greater than the distance L2 by which the other trays 80*y* to 80*c* are moved from the accommodation position to the removal position.

Therefore, in the present embodiment, when the toner cartridges 70*y* to 70*k* are moved from the attachment position to the displaced position, the value obtained by dividing the velocity of the rack parts 83*k* by the velocity of the drive racks 15 is greater than the value obtained by dividing the velocity of the rack parts 83*y* to 83*c* by the velocity of the drive racks 15.

For example, as illustrated in FIG. 10, each pinion gear 94*y* is composed of a multistage gear formed such that a pitch-circle radius of a small-diameter gear 942 meshing with the corresponding rack part 83*y* is less than a pitch-circle radius of a large-diameter gear 94*l* meshing with the corresponding drive rack 15. The pinion gears 94*m* and 94*c* are composed of similar multistage gears. In contrast, each pinion gear 94*k* is formed such that a portion meshing with the corresponding drive rack 15 and a portion meshing with the corresponding rack part 83*k* have the same pitch-circle radius. In this case, the pitch-circle radius of the pinion gear 94*k* may be equal to the pitch-circle radius of the large-diameter gears 94*l* of the pinion gears 94*y* to 94*c*. According to this structure, even when the movement distance of the drive racks 15 is constant, the rack parts 83*k* may be moved by a distance greater than the distance by which the other rack parts 83*y* to 83*c* are moved. In other words, the black tray 80*k* may be moved from the accommodation position to the removal position by the movement distance L1 greater than the movement distance L2 by which the other trays 80*y* to 80*c* are moved from the accommodation position to the removal position.

In addition, since the pinion gears 94*y* to 94*c* are composed of multistage gears, although the pinion gears 94*y* to 94*k* receive the driving force from the same drive racks 15, the tray 80*k* can be moved by the movement distance L1 greater than the movement distance L2 by which the trays 80*y* to 80*c* are moved.

Instead of (or in addition to) using multistage gears as the pinion gears 94*y* to 94*c*, each pinion gear 94*k* may be composed of a multistage gear. In such a case, a portion of each pinion gear 94_k_ meshing with the corresponding drive rack 15 may be formed as a small-diameter gear, and a portion of the pinion gear 94_k_ meshing with the corresponding rack part 83_k_ may be formed as a large-diameter gear having a pitch-circle radius greater than that of the small-diameter gear. The multistage gear is an example of a speed reduction mechanism, and may be replaced by a known speed reduction mechanism in which an amount of movement of an output-side (tray-80-side) member is less than an amount of movement of an input-side (drive-source-side) member.

Alternatively, the amount by which the drive racks 15 are moved to move the toner cartridge 70_k_ from the attachment position to the displaced position may be greater than the amount by which the drive racks 15 are moved to move toner cartridges 70_y_ to 70_c_ from the attachment position to the displaced position.

As the distance by which each toner cartridge 70 is moved from the attachment position to the displaced position decreases, the toner cartridge 70 can be moved in a shorter time, and the time for which the user needs to wait for the movement of the toner cartridge 70 can be reduced. When the amount of movement of the drive racks 15 for the toner cartridge 70_k_ is greater than the amount of movement of the drive racks 15 for the toner cartridges 70_y_ to 70_c_, the time for which the user needs to wait for the movement of the toner cartridges 70_y_ to 70_c_ can be reduced.

According to the above-described structures, the movement distance L1 can be set to a distance greater than the movement distance L2. These structures may be applied in combination.

Second Embodiment

A second embodiment will be described with respect to FIG. 13. In the first embodiment, the rotary body 90 includes the four developing units 50_y_ to 50_k_, and a color image can be formed using the toners of four colors. In the present embodiment, a toner cartridge is moved relative to a developing device capable of forming a monochrome image. In the following description, elements denoted by the same reference signs as those in the first embodiment have substantially the same structures and functions as those in the first embodiment unless otherwise specified. Differences from the first embodiment will be mainly described.

Figure 13:
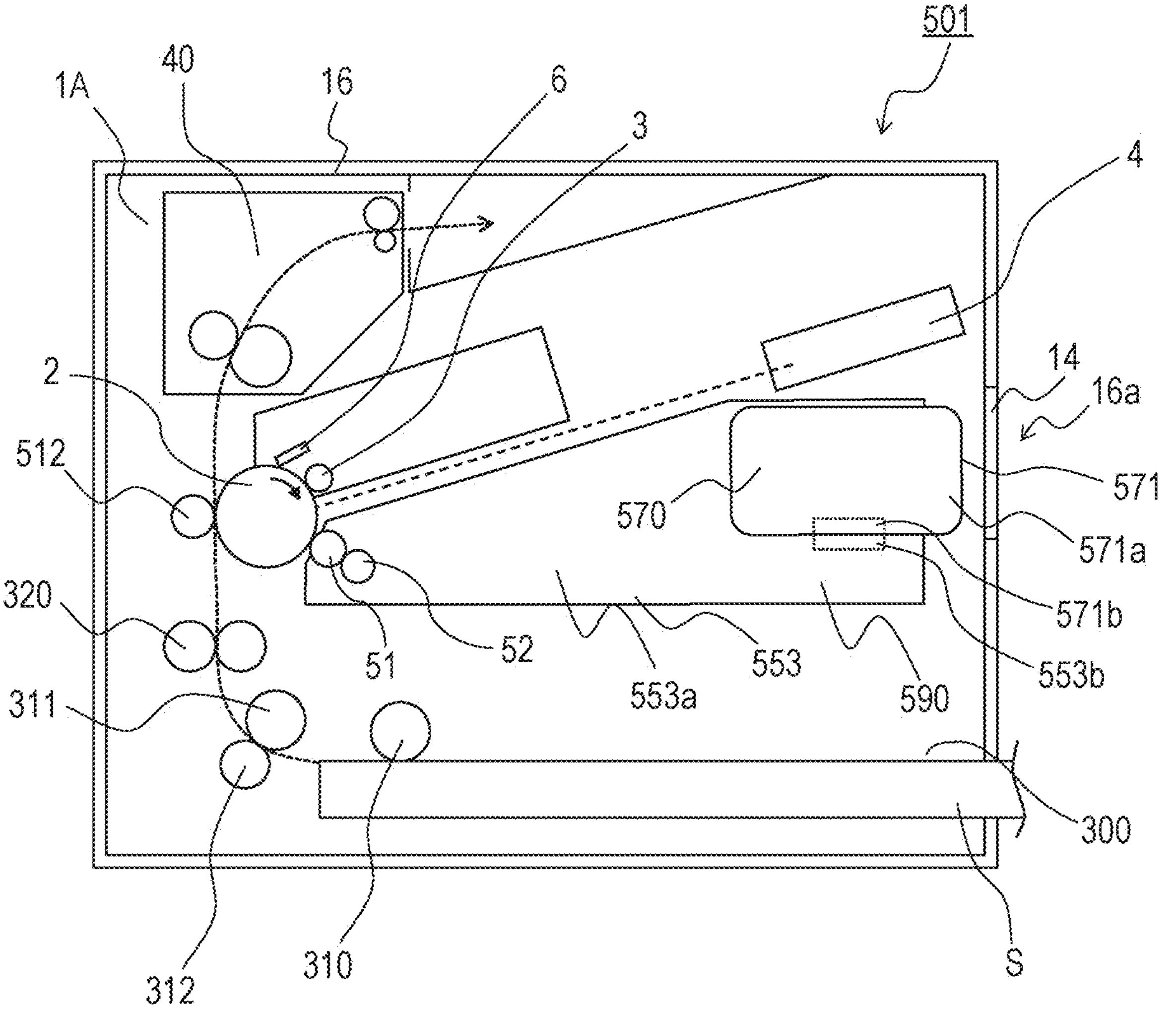
FIG. 13 is a schematic diagram of an image forming apparatus according to a second embodiment.

As illustrated in FIG. 13, an image forming apparatus 501 includes a toner cartridge 570 removably attachable to an apparatus body 1A. The apparatus body 1A includes a developing device (developing unit) 590.

The developing device 590 is an example of a developing part or a developing member that forms a toner image by developing (visualizing) an electrostatic latent image formed on a photosensitive drum 2 using toner. The developing device 590 of the present embodiment develops the electrostatic latent image formed on the photosensitive drum 2 using black toner.

The developing device 590 includes a developing roller 51, a supply roller 52, and a developing blade. The toner cartridge 570 is attached to the developing device 590. The toner cartridge 570 stores black toner to be supplied to the developing device 590.

The toner cartridge 570 includes a toner frame 571. The toner frame 571 has a toner storage unit 571_a_ that stores toner and a discharge opening 571_b_ that communicates with the toner storage unit 571_a_.

The developing device 590 includes a developing frame (storage frame) 553 including a developing-device storage unit 553_a_ that stores the toner. The developing frame 553 has a receiving opening 553_b_ that communicates with the developing-device storage unit (toner supply chamber) 553_a_.

The toner cartridge 570 is removably attachable to the developing device 590 through an opening 16_a_ formed in a frame 16 of the apparatus body 1A. More specifically, the toner cartridge 570 is movable relative to the developing frame 553 through the opening 16_a_ between an attachment position and a displaced position that is displaced from the attachment position. When the toner cartridge 570 is at the attachment position relative to the developing frame 553, the discharge opening 571_b_ faces the receiving opening 553_b_. In other words, the toner storage unit 571_a_ of the toner cartridge 570 and the developing-device storage unit 553_a_ of the developing device 590 communicate with each other through the discharge opening 571_b_ and the receiving opening 553_b_. When the toner is supplied from the toner cartridge 570 to the developing device 590, at least a portion of the receiving opening 553_b_ is positioned below at least a portion of the discharge opening 571_b_.

The toner stored in the toner storage unit 571_a_ is discharged through the discharge opening 571_b_, and the toner discharged through the discharge opening 571_b_ is received by the developing-device storage unit 553_a_ through the receiving opening 553_b_. The toner stored in the developing-device storage unit 553_a_ is supplied to the developing roller 51 by the supply roller 52. The developing-device storage unit 553_a_ may be provided with a toner transport member that transports the toner toward the supply roller 52.

The function of the toner cartridge 570 is substantially the same as the function of the toner cartridge 70 in the first embodiment. The function of the developing device 590 is substantially the same as the function of one of the developing units 50_y_, 50_m_, 50_c_, and 50_k_ in the first embodiment.

The apparatus body 1A includes a transfer roller 512. The transfer roller 512 is an example of a transfer member or a transfer unit that transfers the image on the photosensitive drum 2 to a sheet S. A pair of transport rollers 320 transports the sheet S to a transfer section, which is a nip portion between the photosensitive drum 2 and the transfer roller 512. The image on the photosensitive drum 2 is transferred to a surface of the sheet S that has been transported.

The apparatus body 1A includes a moving device configured to move the toner cartridge 570 relative to the developing device 590 (more specifically, relative to the developing frame 553 of the developing device 590) from the attachment position to the displaced position. This moving device may be the moving device described in the first embodiment.

In this case, the components of the moving device according to the first embodiment provided in the rotary body 90 may be provided in the developing device 590. The replacement position and the developing position of the developing device 590 may be the same position or different positions. For example, the developing device 590 may be movable between a contact position at which the developing roller 51 is in contact with the photosensitive drum 2 and a separated position at which the developing roller 51 is separated from the photosensitive drum 2. The developing device 590 may be at the separated position when the developing device 590 is in the replacement position.

For example, the developing device 590 may include a tray 80 and a structure for moving the tray 80. The structure for moving the tray 80 may be the same as that described in the first embodiment.

Also in the present embodiment, when the toner cartridge 570 is at the displaced position, at least a portion of the toner cartridge 570 may be in a space outside the image forming apparatus 501 (outside the apparatus body 1A). Namely, when the toner cartridge 570 is at the displaced position, at least a portion of the toner cartridge 570 projects outward from the apparatus body 1A beyond the exterior position. In other words, at least a portion of the toner cartridge 570 is positioned in the space outside the apparatus body 1A defined when the door 14 is at the closed position. In addition, at least a portion of the toner cartridge 570 is positioned downstream of the exterior position in the displacement direction of the toner cartridge 570.

Assuming that the side surface 16*b* in which the opening 16*a* is formed is the front surface of the apparatus body 1A, when the toner cartridge 570 is at the displaced position, at least a portion of the toner cartridge 570 projects forward from the front outer surface of the apparatus body 1A.

Also in the present embodiment, when the toner cartridge 570 is at the displaced position, one-half or more of the length of the toner cartridge 570 in the displacement direction may be in the outside space.

Thus, although the toner cartridges 70 are removably attached to the rotary body 90 in the above-described first embodiment, the toner cartridge 570 is removably attached to the developing device 590 in the present embodiment.

Other Embodiments

In the above-described embodiments, the apparatus body 1A includes the driving device, the urging member, or the like that moves each tray 80 from the accommodation position to the removal position without any operation of the tray 80 by the user. Alternatively, the user may hold the tray 80 and pull the tray 80 from the accommodation position to the removal position (in other words, the support member may be manually moved) while the rotary body 90 is in the replacement position. Also in this case, compared to when the toner cartridge is directly inserted into and removed from the apparatus body, the operation can be facilitated because the user can simply attach or remove the toner cartridge 70 to/from the tray 80 pulled out from the apparatus body.

In addition, in the above-described first embodiment, the rotary body 90 includes the four developing units 50*y* to 50*k*, and a color image can be formed using the toners of four colors. However, the rotary body 90 may include three or less developing units, or five or more developing units. In these cases, the number and arrangement of trays and toner cartridges may be changed in accordance with the number of developing units. For example, in the above-described first embodiment, the four toner cartridges 70*y* to 70*k* are removably attachable to the rotary body 90. However, the rotary body 90 may include only one developing unit 50*k*, and one toner cartridge 70*k* may be attached to the rotary body 90. In this case, the rotary body 90 may rotate clockwise around the rotational axis 90C in FIG. 1 to alternately reach the black replacement position and the black developing position.

In addition, in the above-described first embodiment, the rotary body 90 includes the four developing units 50*y* to 50*k*, and a color image can be formed using the toners of four colors. However, the rotary body 90 may include a plurality of developing units capable of forming an image using toner of one color. For example, the rotary body 90 may include four black developing units 50*k*, and four toner cartridges 70*k* may be attached to the rotary body 90.

Third Embodiment

The features of an image forming apparatus 100 according to a third embodiment will now be described. The image forming apparatus 100 is obtained by adding a reading unit, which reads an image on a document sheet (recording material), to the image forming apparatus 1 according to the first embodiment. Elements denoted by the same reference signs as those in the first embodiment have the same or substantially the same structures as those in the first embodiment, and description thereof is omitted. In the following description, the above-described displacement direction of the toner cartridge 70 may be referred to simply as a displacement direction. In the present embodiment, the displacement direction extends along a horizontal direction, and may be parallel to a horizontal direction.

Figure 14:
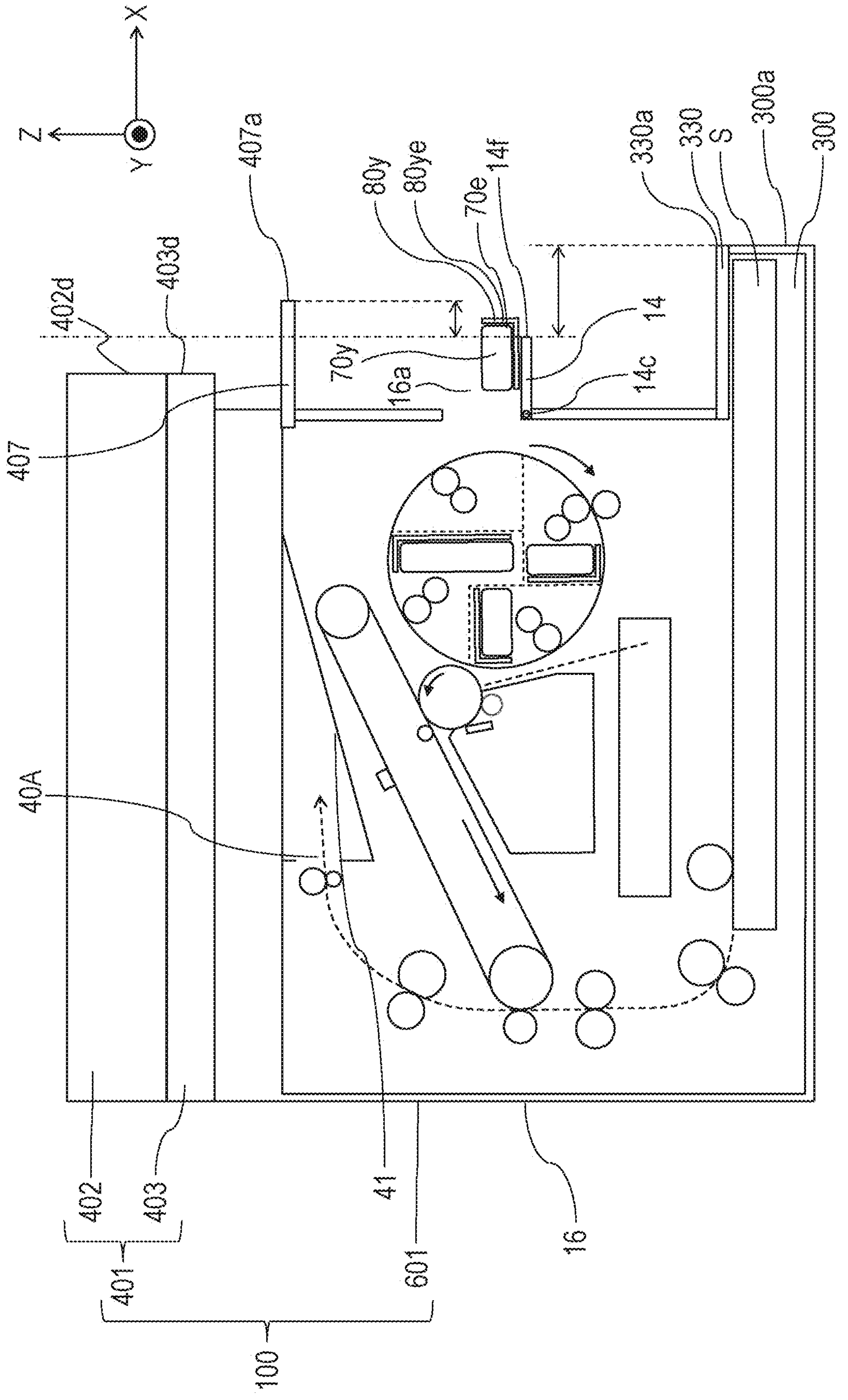
FIG. 14 is a plan view of an image forming apparatus according to a third embodiment.

The image forming apparatus 100 will be described with reference to FIG. 14. FIG. 14 is a plan view of the image forming apparatus 100. The image forming apparatus 100 includes an image forming unit 601 and a reading unit 401. The image forming unit 601 corresponds to the apparatus body 1*a* of the image forming apparatus 1 according to the first embodiment.

The reading unit 401 is disposed above the image forming unit 601. More specifically, the reading unit 401 is positioned above a frame 16. The reading unit 401 reads an image formed on the document sheet (recording material) and outputs the obtained image data to a controller of the image forming apparatus 100. The image forming unit 601 is capable of printing an image on a recording material based on the output image data.

The reading unit 401 includes a document transporter 402 and a reader 403. The reader 403 is disposed above the image forming unit 601, and the document transporter 402 is disposed above the reader 403. The reader 403 is connected to the image forming unit 601, and the document transporter 402 is connected to the reader 403. The connections between the image forming unit 601, the document transporter 402, and the reader 403 will be described below.

Figure 15:
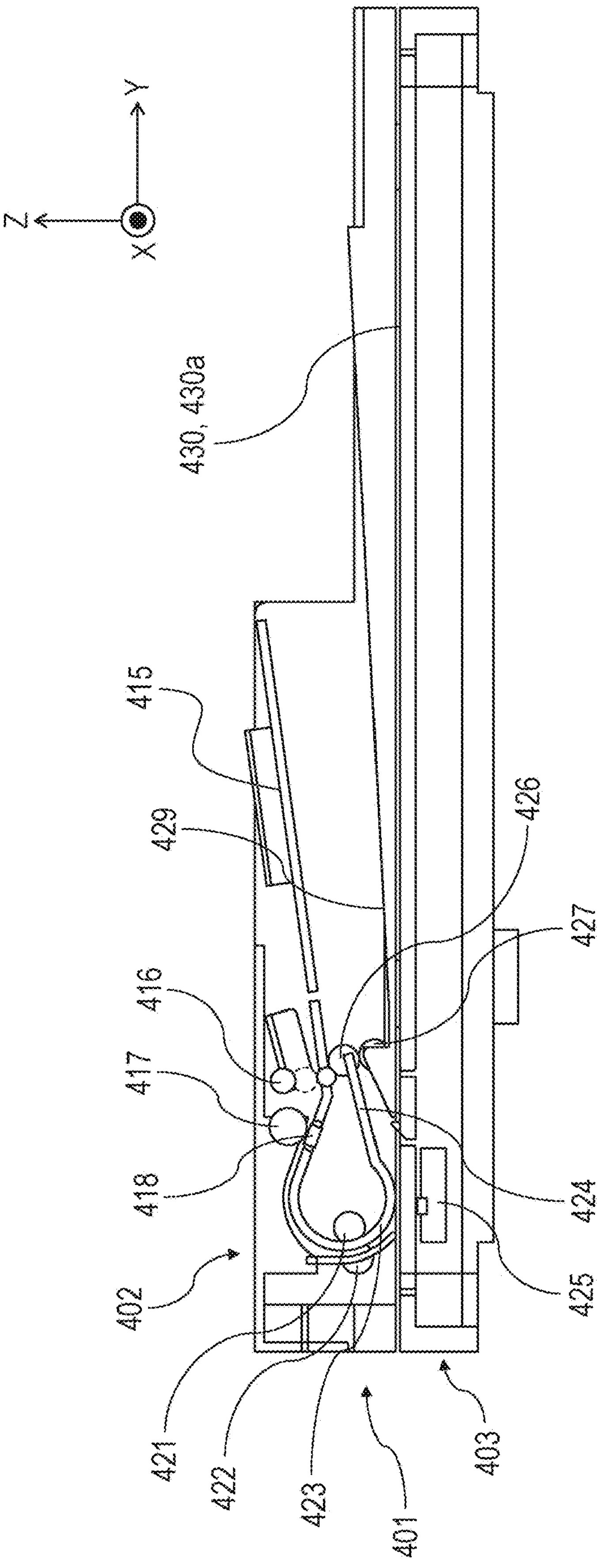
FIG. 15 is a plan view of a reading unit according to the third embodiment.

The structure of the reading unit 401 will be described with reference to FIG. 15. FIG. 15 is a plan view of the reading unit 401. The document transporter 402 includes a document tray 415, a document feed roller 416, a separation transport roller 417, and a separation pad 418. The document transporter 402 also includes a lead roller 421, a lead driven roller 422, an upstream transport guide 423, a downstream transport guide 424, a lead output roller 426, a lead discharge driven roller 427, and a document paper output tray 429. The reader 403 includes an optical table 425 and a document table 430.

The procedure of reading an image using the document transporter 402 will now be described. The document tray 415 is a tray that supports document sheets. The document feed roller 416 is normally in a standby state at a home position shown by the solid line in FIG. 15. When the document feed roller 416 is at the home position, document sheets can be easily placed on the document tray 415. When a sheet feeding operation is started, the document feed roller 416 is lowered to the position shown by the dotted line in FIG. 15 and comes into contact with the uppermost surface of the document sheets supported by the document tray 415. The document feed roller 416 feeds the document sheets supported by the document tray 415 toward the separation transport roller 417. The separation pad 418 is disposed to face the separation transport roller 417 and applies a pressure against the separation transport roller 417. The separation pad 418 is made of a rubber material or the like with less friction than the separation transport roller 417. The separation pad 418 and the separation transport roller 417 separate the document sheets fed by the document feed roller 416 from each other and transport each document sheet to the lead roller 421.

The document sheet fed by the separation transport roller 417 is transported along the upstream transport guide 423 by the lead roller 421 and the lead driven roller 422. The document sheet transported by the lead roller 421 and the lead driven roller 422 passes through a region above the optical table 425. The optical table 425 is a reading member that reads an image formed on the document sheet that passes above the optical table 425 and outputs the obtained data to the controller of the image forming apparatus 100. The optical table 425 includes a light-emitting unit and a light-receiving unit. The light-emitting unit is, for example, an LED or a fluorescent tube. The light-receiving unit is, for example, a CCD sensor. Light emitted by the light-emitting unit is reflected by the document sheet that passes above the optical table, and the thus-reflected light is read by the light-receiving unit. The optical table 425 converts the reflected light read by the light-receiving unit into an image signal, and transmits the image signal to the controller. The document sheet that has passed above the optical table 425 is transported by the lead output roller 426 and the lead discharge driven roller 427, and output to the document paper output tray 429. As described above, the reading unit 401 is capable of reading the image on the document sheet transported by the document transporter 402.

The reading unit 401 is also capable of reading an image on a document sheet paced on the document table 430. As illustrated in FIG. 15, the document table 430 is capable of supporting a document sheet on the upper surface of the document table 430. The optical table 425 reads the image by irradiating the document sheet supported on the upper surface of the document table 430 by the above-described method. The document transporter 402 may be regarded as a cover member that covers the document sheet supported on the upper surface of the document table 430.

Figure 16:
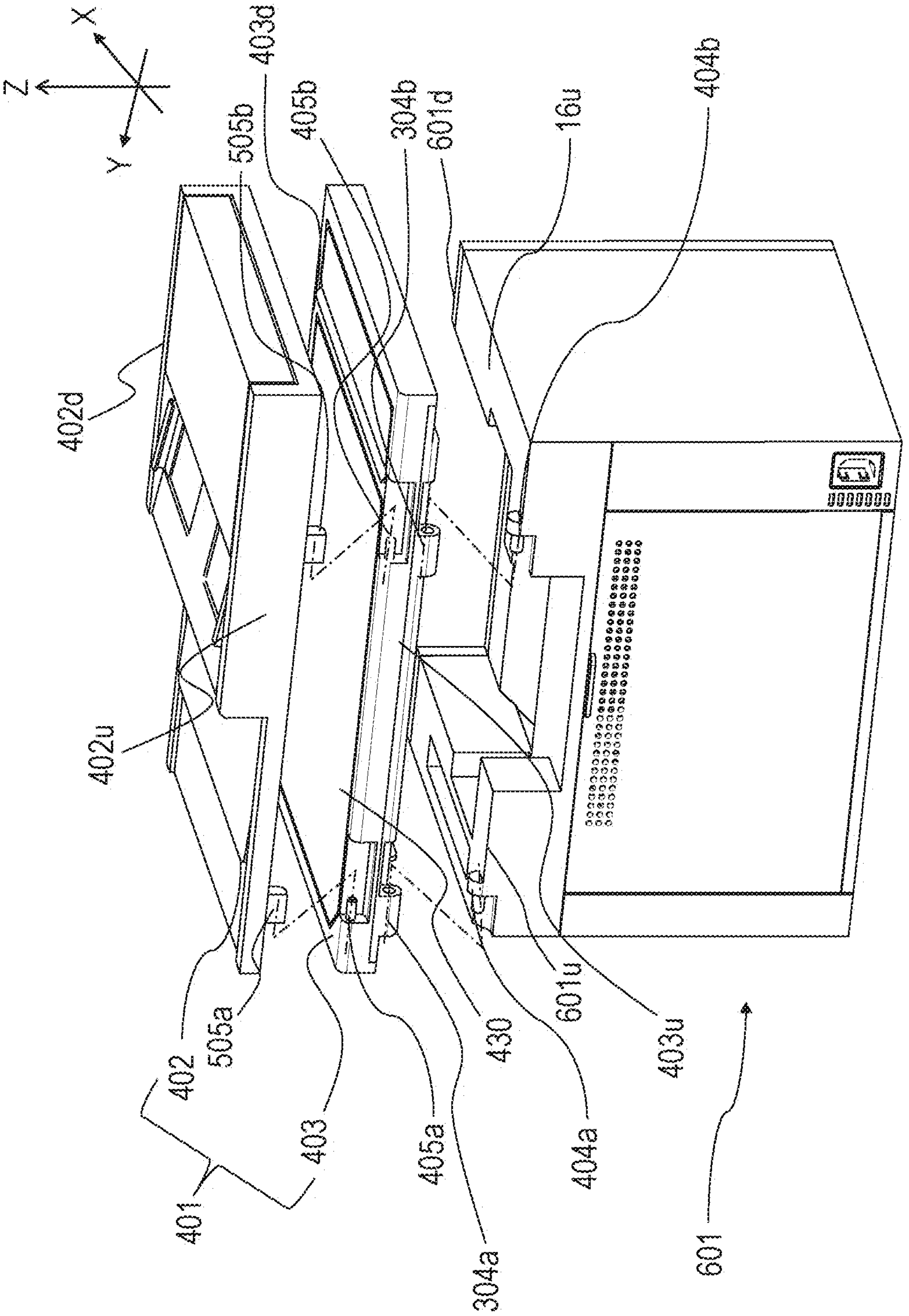
FIG. 16 is a perspective view of the image forming apparatus according to the third embodiment.
Figure 17A:
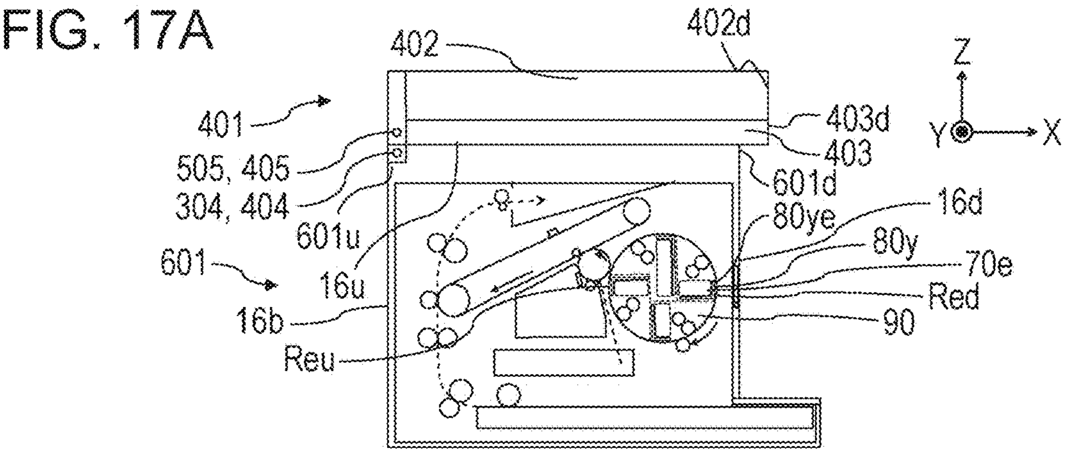
FIGS. 17A to 17C are plan views of the image forming apparatus according to the third embodiment.
Figure 17B:
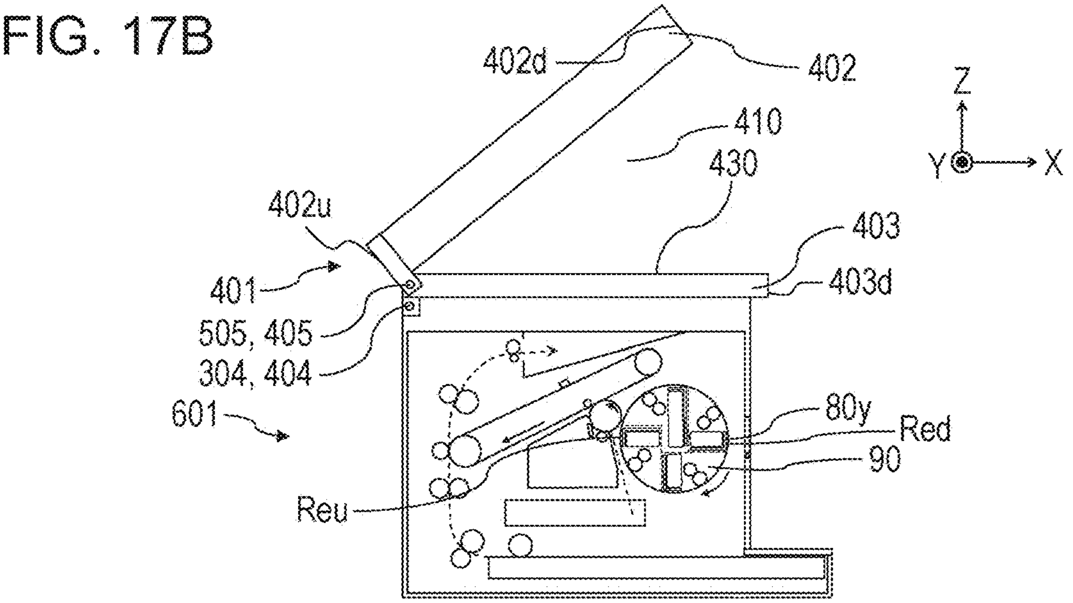
Figure 17C:
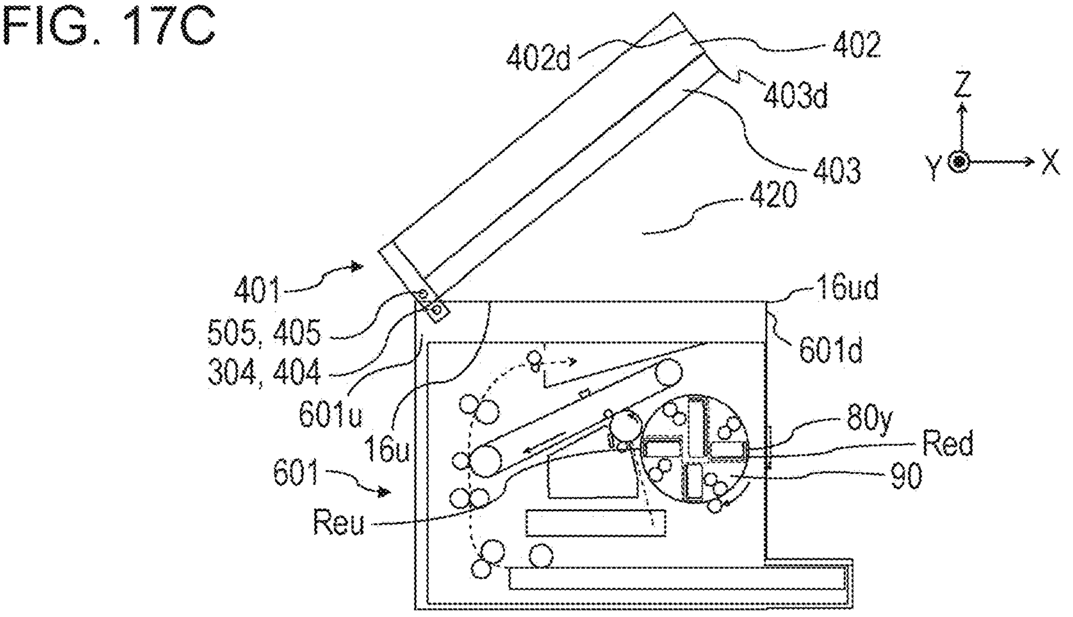

The connections between the image forming unit 601, the document transporter 402, and the reader 403 will now be described with reference to FIG. 16 and FIGS. 17A to 17C. FIG. 16 is an exploded perspective view of the image forming apparatus 100. FIG. 17A illustrates a state in which the document transporter 402 is at a closed position relative to the reader 403. In FIG. 17A, the reader 403 is at a closed position relative to the image forming unit 601. In other words, the reading unit 401 is at a closed position relative to the image forming unit 601. FIG. 17B illustrates a state in which the document transporter 402 is at an open position relative to the reader 403. FIG. 17C illustrates a state in which the reader 403 is at an open position relative to the image forming unit 601. In other words, the reading unit 401 is at an open position relative to the image forming unit 601.

The connection structure between the document transporter 402 and the reader 403 will now be described.

In the following description, an upstream end and a downstream end of the document transporter 402 in the displacement direction are referred to as a first end 402*u* and a second end 402*d*, respectively. The document transporter 402 includes first supported portions 505*a* and 505*b*. The first supported portions 505*a* and 505*b* have rotational axes extending in the Y direction. Each of the first supported portions 505*a* and 505*b* has a recess. The function of the first supported portions 505*a* and 505*b* will be described below.

As illustrated in FIG. 16, the distance between the first supported portion 505*a* and the first end 402*u* is less than the distance between the first supported portion 505*a* and the second end 402*d* in the displacement direction. In other words, the distance between the first supported portion 505*a* and the first end 402*u* is less than the distance between the first supported portion 505*a* and the second end 402*d* in a direction orthogonal to the rotational axes of the first supported portions 505*a* and 505*b*. In addition, the distance between the first supported portion 505*b* and the first end 402*u* is less than the distance between the first supported portion 505*b* and the second end 402*d* in the displacement direction. In other words, the distance between the first supported portion 505*b* and the first end 402*u* is less than the distance between the first supported portion 505*b* and the second end 402*d* in the direction orthogonal to the rotational axes of the first supported portions 505*a* and 505*b*.

An upstream end and a downstream end of the reader 403 in the displacement direction are referred to as a third end 403*u* and a fourth end 403*d*, respectively. The reader 403 includes first support portions 405*a* and 405*b*. The first support portions 405*a* and 405*b* are support members that support the first supported portions 505*a* and 505*b*, respectively, in a rotatable manner. As shown by the one-dot chain lines in FIG. 16, the first support portions 405*a* and 405*b* are inserted in the recesses in the first supported portions 505*a* and 505*b*, respectively. In other words, the first supported portions 505*a* and 505*b* are respectively supported by the first support portions 405*a* and 405*b* so that the document transporter 402 is rotatably supported by the reader. The document transporter 402 rotates around the first supported portions 505*a* and 505*b*. The rotational axis of the document transporter extends in the Y direction. In other words, the rotational axis of the document transporter 402 extends in the direction of the rotational axis of the rotary body 90.

The distance between the first support portion 405*a* and the third end 403*u* is less than the distance between the first support portion 405*a* and the fourth end 403*d* in the displacement direction. In other words, the distance between the first support portion 405*a* and the third end 403*u* is less than the distance between the first support portion 405*a* and the fourth end 403*d* in the direction orthogonal to the rotational axes of the first supported portions 505*a* and 505*b*. In addition, the distance between the first support portion 405*b* and the third end 403*u* is less than the distance between the first support portion 405*b* and the fourth end 403*d* in the displacement direction. In other words, the distance between the first support portion 405*b* and the third end 403*u* is less than the distance between the first support portion 405*a* and the fourth end 403*d* in the direction orthogonal to the rotational axes of the first supported portions 505*a* and 505*b*.

The rotation of the document transporter 402 will be described with reference to FIG. 17A. As illustrated in FIG. 17A, the document transporter 402 may be disposed at the closed position relative to the reader 403 at which the second end 402*d* and the fourth end 403*d* are in contact with each other. As illustrated in FIG. 17B, the document transporter 402 may also be disposed at the open position relative to the reader 403 at which the second end 402*d* and the fourth end 403*d* are not in contact with each other. As illustrated in FIGS. 17A and 17B, when the document transporter 402 moves from the closed position to the open position relative to the reader 403, the document transporter 402 rotates to increase the vertical distance between the second end 402*d* and the reader 403. When the document transporter 402 is at the open position, the document transporter 402 and the reader 403 define an opening 410 in the vertical direction. When the opening 410 is formed, the user can easily place a document sheet on the document table 430.

Since the first supported portions 505 (505*a* and 505*b*) of the document transporter 402 are disposed adjacent to the upstream end of the document transporter 402 in the displacement direction, the user can hold a downstream portion (holder portion) of the document transporter 402 in the displacement direction and move the document transporter 402 to the open position. Thus, the user can perform both operations of replacing the toner cartridges 70 and moving the document transporter 402 at the downstream side in the displacement direction.

The connection structure between the reader 403 and the image forming unit 601 will now be described with reference to FIG. 16. The reader 403 includes second supported portions 304*a* and 304*b*.

The second supported portions 304*a* and 304*b* have rotational axes extending in the Y direction. Each of the second supported portions 304*a* and 304*b* has a recess. The distance between the second supported portion 304*a* and the third end 403*u* is less than the distance between the second supported portion 304*a* and the fourth end 403*d* In the displacement direction. In other words, the distance between the second supported portion 304*a* and the third end 403*u* is less than the distance between the second supported portion 304*a* and the fourth end 403*d* in a direction orthogonal to the rotational axes of the second supported portions 304*a* and 304*b*. In addition, the distance between the second supported portion 304*b* and the third end 403*u* is less than the distance between the second supported portion 304*b* and the fourth end 403*d* in the displacement direction. In other words, the distance between the second supported portion 304*b* and the third end 403*u* is less than the distance between the second supported portion 304*b* and the fourth end 403*d* in the direction orthogonal to the rotational axes of the second supported portions 304*a* and 304*b*.

In the following description, an upstream end and a downstream end of the image forming unit 601 in the displacement direction are referred to as a fifth end 601*u* and a sixth end 601*d*, respectively. The image forming unit 601 includes second support portions 404*a* and 404*b*. The distance between the second support portion 404*a* and the fifth end 601*u* is less than the distance between the second support portion 404*a* and the sixth end 601*d* in the displacement direction. In other words, the distance between the second support portion 404*a* and the fifth end 601*u* is less than the distance between the second support portion 404*a* and the sixth end 601*d* in the direction orthogonal to the rotational axes of the second supported portions 304*a* and 304*b*. In addition, the distance between the second support portion 404*b* and the fifth end 601*u* is less than the distance between the second support portion 404*b* and the sixth end 601*d* in the displacement direction. In other words, the distance between the second support portion 404*b* and the fifth end 601*u* is less than the distance between the second support portion 404*b* and the sixth end 601*d* in the direction orthogonal to the rotational axes of the second supported portions 304*a* and 304*b*.

As shown by the one-dot chain lines in FIG. 16, the second support portions 404*a* and 404*b* are inserted in the recesses in the second supported portions 304*a* and 304*b*, respectively. The second supported portions 304*a* and 304*b* are respectively supported by the second support portions 404*a* and 404*b* so that the reader 403 is supported by the image forming unit 601. More specifically, the reader 403 may be regarded as being supported by the frame 16. In other words, the reading unit 401 may be regarded as being supported by the frame 16.

The reader 403 rotates around the second supported portions 304*a* and 304*b*. The rotational axis of the reader 403 extends in the Y direction. In other words, the rotational axis of the reader 403 extends in the direction of the rotational axis of the rotary body 90. As described above, the document transporter 402 rotates around the first supported portions 505*a* and 505*b*. Therefore, when the first supported portions 505*a* and 505*b* and the second supported portions 304*a* and 304*b* are referred to as a supported unit, the reading unit 401 may be regarded as being rotatable around the supported unit. The rotational axis of the reading unit 401 may be regarded as extending in the direction of the rotational axis of the rotary body 90.

The rotation of the reader 403 will now be described with reference to FIG. 17A. As illustrated in FIG. 17A, the reader 403 may be disposed at the closed position relative to the image forming unit 601 at which the sixth end 601*d* is in contact with the reader 403. As illustrated in FIG. 17C, the reader 403 may also be disposed at the open position relative to the image forming unit 601 at which the sixth end 601*d* is not in contact with the reader 403.

When the reader 403 moves from the closed position to the open position relative to the image forming unit 601, the reader 403 rotates to increase the vertical distance between the fourth end 403*d* and the image forming unit 601. In addition, when the reader 403 moves from the closed position to the open position relative to the image forming unit 601, the reader 403 pushes the document transporter 402 upward. Since the reader 403 pushes the document transporter 402 upward, the reader 403 and the document transporter 402 rotate together from the closed position to the open position. When the reader 403 is at the open position, the reading unit 401 and the image forming unit 601 define an opening 420 in the vertical direction. When the opening 420 is formed, the user can easily access an outlet 40A described below.

As described above, the reading unit 401 rotates to move between the closed position (FIG. 17A) at which the reading unit 401 covers a portion of the frame 16 and the open position (FIG. 17C) at which the reading unit 401 is opened to expose the frame 16. More specifically, when the reading unit 401 is at the closed position, the reading unit 401 covers a frame upper surface 16*u* that defines an upper surface of the frame 16. When the reading unit 401 is at the open position, the frame upper surface 16*u* is not covered by the reading unit 401 and is exposed.

The positional relationship between each toner cartridge 70 and the reading unit 401 will now be described with reference to FIGS. 14 and FIGS. 17A to 17C. In the following description, when the toner cartridge 70 attached to the corresponding tray 80 is at the displaced position, a downstream end of the toner cartridge 70 in the displacement direction is referred to as a cartridge downstream end 70*e*. When the tray 80 is at the removal position, a downstream end of the tray 80 in the displacement direction is referred to as a tray downstream end 80*ye*. The second end 402*d* and the fourth end 403*d* are regarded as a downstream end of the reading unit 401 in the displacement direction. The downstream end of the reading unit 401 in the displacement direction is referred to as a reading-unit downstream end.

As illustrated in FIG. 14, when the toner cartridge 70 is at the displaced position and when the reading unit 401 is at the closed position, the cartridge downstream end 70*e* is positioned downstream of the reading-unit downstream end (402*d*, 403*d*) in the displacement direction. In addition, when the tray 80 is at the removal position and when the reading unit 401 is at the closed position, the tray downstream end 80*ye* is positioned downstream of the reading-unit downstream end (402*d*, 403*d*) in the displacement direction.

As illustrated in FIG. 17A, when the toner cartridge 70 is at the attachment position and when the reading unit 401 is at the closed position, the cartridge downstream end 70*e* is positioned upstream of the reading-unit downstream end (402*d*, 403*d*) in the displacement direction. In addition, when the tray 80 is at the accommodation position, the tray downstream end 80*ye* is positioned upstream of the reading-unit downstream end (402*d*, 403*d*) in the displacement direction.

As described above, in the present embodiment, when the toner cartridge 70 is at the displaced position, the cartridge downstream end 70*e* is positioned downstream of the reading-unit downstream end (402*d*, 403*d*). Therefore, when the user replaces the toner cartridge 70, the end of the reading unit 401 is unlikely to interfere with the replacement.

The positional relationship between the reading unit 401 and the rotary body 90 will now be described with reference to FIG. 17A. In the following description, an upstream end of the rotary body 90 in the displacement direction is referred to as a rotary upstream end Reu. In addition, a downstream end of the rotary body 90 in the displacement direction is referred to as a rotary downstream end Red.

The first supported portions 505 and the first support portions 405 are positioned upstream of the rotary upstream end Reu in the displacement direction. In addition, the second supported portions 304 and the second support portions 404 are positioned upstream of the rotary upstream end Reu in the displacement direction. When the reading unit 401 moves from the closed position to the open position, the center of gravity of the reading unit 401 moves upstream in the displacement direction. The rotary body 90 is relatively heavy compared to other components of the image forming apparatus 1. In addition, the center of gravity of the rotary body 90 is positioned downstream of the center of the image forming unit 601 in the displacement direction. Therefore, when the reading unit 401 rotates from the closed position to the open position, the image forming apparatus 1 can be prevented from falling. Although the rotary assembly 90A is heavier than the reading unit 401 in the present embodiment, the reading unit 401 may be heavier than the rotary assembly 90A.

An exemplary arrangement of the reading unit 401 and the rotary body 90 will now be described. In the following description, an upstream end of the frame 16 in the displacement direction is referred to as a frame upstream end 16*u*. In addition, a downstream end of the frame 16 in the displacement direction is referred to as a frame downstream end 16*d*. As illustrated in FIG. 17A, the distance between the rotary upstream end Reu and the frame downstream end 16*d* is less than the distance between the rotary upstream end Reu and the frame upstream end 16*u* in the displacement direction. In other words, the rotary body 90 is closer to the frame downstream end 16*d*.

The distance between each first supported portion 505 and the frame upstream end 16*u* is less than the distance between each first supported portion 505 and the frame downstream end 16*d* in the displacement direction. In addition, the distance between each second supported portion 304 and the frame upstream end 16*u* is less than the distance between each second supported portion 304 and the frame downstream end 16*d* in the displacement direction. In other words, the first supported portions 505 and the second supported portions 304 are closer to the frame upstream end 16*u*.

As is clear from FIG. 17A, in the horizontal direction, the rotation center of the rotary body 90 is closer to the frame downstream end 16*d* than to the frame upstream end 16*u*, and the rotary upstream end Reu is also closer to the frame downstream end 16*d* than to the frame upstream end 16*u*. In the horizontal direction, the first supported portions 505 and the second supported portions 304 are closer to the frame upstream end 16*u* than to the frame downstream end 16*d*.

As described above, the rotary body 90 is closer to the frame downstream end 16*d* than to the frame upstream end 16*u* in the displacement direction, and the first supported portions 505 and the second supported portions 304 are closer to the frame upstream end 16*u* than to the frame downstream end 16*d* in the displacement direction. According to this structure, the image forming apparatus 1 can be more effectively prevented from falling.

The structure of the door 14 according to the present embodiment will now be described. In the following description, a direction in which each toner cartridge 70 moves from the displaced position to the attachment position is referred to as an attachment direction. The door 14 is formed of a highly transparent part. Therefore, when the door 14 is viewed in the attachment direction, the user can view the developing-device storage unit 53*a* positioned downstream of the door 14 in the attachment direction. In the present embodiment, the developing frame 53 is also highly transparent. Therefore, when the door 14 is viewed in the attachment direction, the amount of developer remaining in the developing-device storage unit 53*a* can be visually checked.

The structure of the door 14 and the positional relationship between the door 14 and the reading unit 401 will now be described with reference to FIG. 14. In the following description, a downstream end of the door 14 in the displacement direction when the door 14 is at the open position at which the opening 16*a* is exposed is referred to as an end 14*f*. When the door 14 is at the open position, the end 14*f* is positioned downstream of the second end 402*d* and the fourth end 403*d* in the displacement direction. In other words, when the door 14 is at the open position, the end 14*f* is positioned downstream of the downstream end of the reading unit 401 in the displacement direction. Accordingly, when the user holds the toner cartridge 70 at the displaced position, the second end 402*d* and the fourth end 403*d* are unlikely to interfere with the user's operation.

Figure 18:
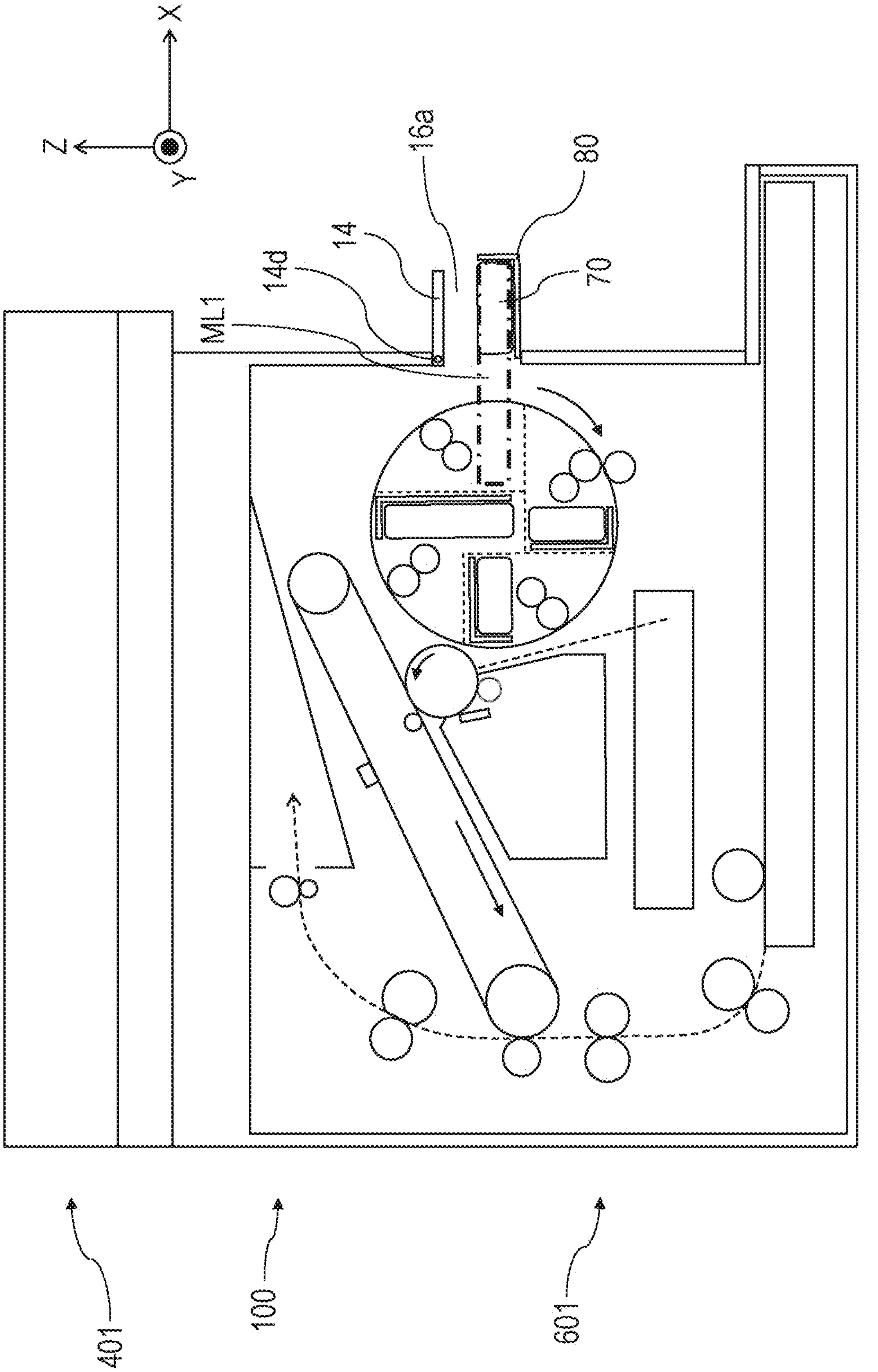
FIG. 18 is a plan view of the image forming apparatus according to the third embodiment.

In the present embodiment and the first embodiment, the door 14 pivots about the support shaft 14*c* to move between the closed position at which the opening 16*a* is covered and the open position at which the opening 16*a* is exposed. Therefore, when the door 14 is at the open position and the tray 80 is at the removal position, the door 14 is disposed below the tray 80. However, as a modification, the door 14 may be structured as illustrated in FIG. 18. FIG. 18 is a plan view of an image forming apparatus 100 according to the present embodiment. In the present embodiment, the door 14 opens and closes by pivoting about a support shaft 14*d* positioned above the tray 80. Therefore, when the door 14 is at the open position and the tray 80 is at the removal position, the door 14 is above the tray 80.

Figure 19:
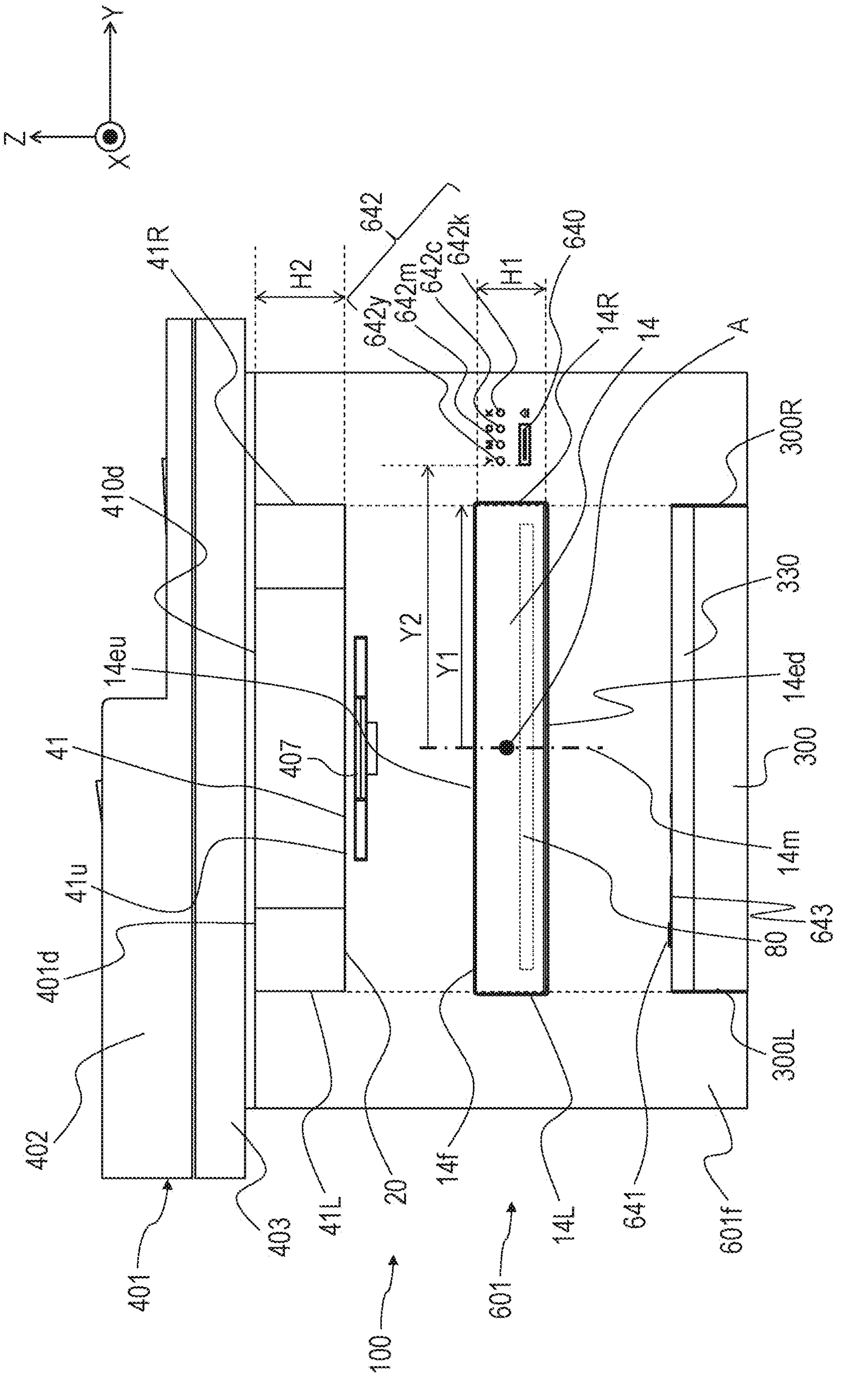
FIG. 19 is a plan view of the image forming apparatus according to the third embodiment.

The positional relationship between the tray 80 and the reading unit 401 will now be described with reference to FIGS. 18, 19, and 24. FIG. 19 is a plan view of the image forming apparatus 100. More specifically, FIG. 19 is a plan view of the image forming apparatus 100 viewed in an accommodation direction in which the tray 80 moves from the removal position to the accommodation position. FIG.

24 is a plan view of the image forming apparatus 100 according to the present embodiment.

In the following description, it is assumed that the door 14 is disposed at an upper position as in the modification illustrated in FIG. 18. However, the same description also applies to the structure illustrated in FIGS. 17A to 17C in which the door 14 is disposed at a lower position.

The region surrounded by the one-dot chain lines in FIG. 18 shows a trajectory ML1 of the toner cartridge 70 when the toner cartridge 70 moves from the attachment position to the displaced position. As illustrated in FIG. 18, the reading unit 401 is positioned such that the reading unit 401 does not overlap the trajectory ML1. In other words, the reading unit 401 is disposed outside the trajectory ML1.

Figure 24:
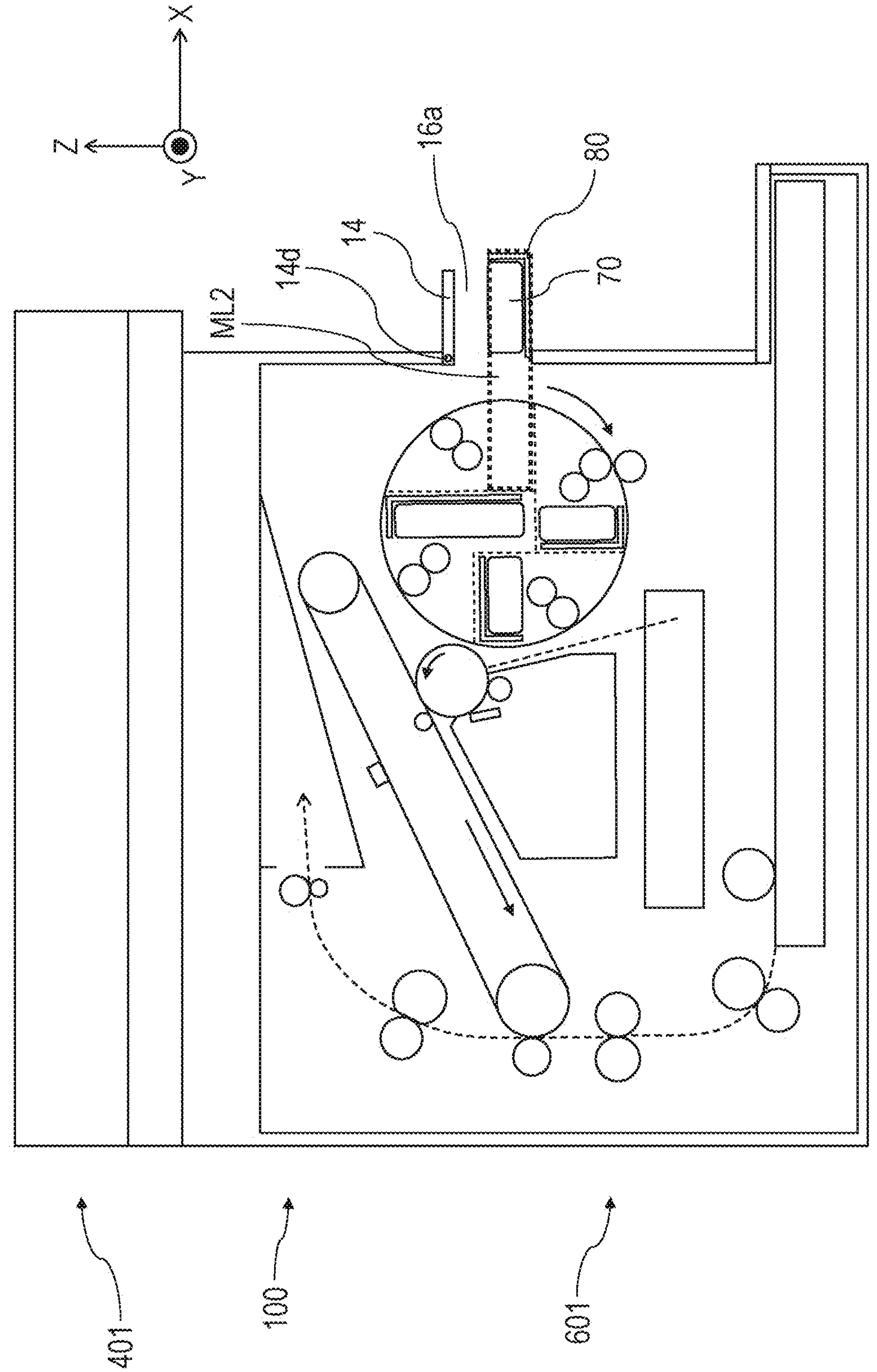
FIG. 24 is a plan view of the image forming apparatus according to the third embodiment.

The region surrounded by the dotted lines in FIG. 24 shows a trajectory ML2 of the tray 80 when the tray 80 moves from the accommodation position to the removal position. The reading unit 401 is positioned such that the reading unit 401 does not overlap the trajectory ML2. In other words, the reading unit 401 is disposed outside the trajectory ML2.

More specifically, the reading unit 401 is disposed above the toner cartridge 70 attached to the image forming apparatus 1. In addition, the reading unit 401 is disposed above the tray 80.

Accordingly, the possibility that the reading unit 401 will interfere with the toner cartridge 70 or the tray 80 when the tray 80 moves between the removal position and the accommodation position can be reduced. In addition, as illustrated in FIG. 19, in the direction in which the rotational axis of the rotary body 90 extends (Y direction), the position of the tray 80 (region in which the tray 80 is present) at least partially overlaps the position of the reading unit 401 (region in which the reading unit 401 is present). This structure enables a reduction in the size of the image forming apparatus 1 in the Y direction.

The structures of the sheet storage unit 300, a sheet-storage-unit cover 330, and an output extension tray 407 will now be described with reference to FIG. 14.

The sheet S that has passed through the fixing device 40 is output through the outlet 40A, and the output tray 41 supports the sheet S output through the outlet 40A. The output tray 41 is provided with the output extension tray 407. The output extension tray 407 is movable between an accommodated position at which the output extension tray 407 is accommodated in the output tray 41 and a pulled-out position to which the output extension tray 407 is pulled out from the accommodated position in the displacement direction. When the output tray 41 is pulled out in the displacement direction, the output sheet S can be prevented from falling.

When the output extension tray 407 is at the pulled-out position and the door 14 is at the open position, an end 407*a* of the output extension tray 407 in the displacement direction is positioned downstream of the end 14*f*. When the output extension tray 407 is at the pulled-out position and the tray 80 is at the removal position, the end 407*a* is positioned downstream of the tray downstream end 80*ye* in the displacement direction. Therefore, even if the sheet S hangs from the output extension tray 407, the movement of the tray 80 is not impeded.

When the output extension tray 407 is at the pulled-out position and the door 14 is at the open position, the vertical distance between the door 14 and the output extension tray 407 is preferably 30 mm or more. More preferably, the vertical distance between the door 14 and the output extension tray 407 is about 90 mm. According to this structure, the space between the door 14 and the output extension tray 407 is increased in the vertical direction, and the user can easily replace the toner cartridge 70.

The sheet storage unit 300 and the sheet-storage-unit cover 330 are disposed below the door 14. The sheet-storage-unit cover 330 is removably attachable to the image forming apparatus 100. The sheet-storage-unit cover 330 is attached to the top of the sheet storage unit 300. The sheet-storage-unit cover 330 covers the sheets S stored in the sheet storage unit 300 to protect the recording materials from dust and dirt.

In the following description, a downstream end of the sheet storage unit 300 in the displacement direction is referred to as an end 300*a*. The downstream end of the output extension tray 407 in the displacement direction is referred to as the end 407*a*. When the door 14 is at the open position, the end 300*a* is disposed downstream of the end 14*f* in the displacement direction.

In the following description, a downstream end of the sheet-storage-unit cover 330 in the displacement direction is referred to as an end 330*a*. When the door 14 is at the open position, the end 330*a* is disposed downstream of the end 14*f* in the displacement direction.

According to the above-described structure, when the toner cartridge 70 falls from the tray 80 while the sheet-storage-unit cover 330 is attached to the image forming apparatus 1, the toner cartridge 70 falls onto the sheet-storage-unit cover 330. When the toner cartridge 70 falls from the tray 80 while the sheet-storage-unit cover 330 is not attached to the image forming apparatus 1, the toner cartridge 70 falls onto the sheet storage unit 300.

Figure 20:
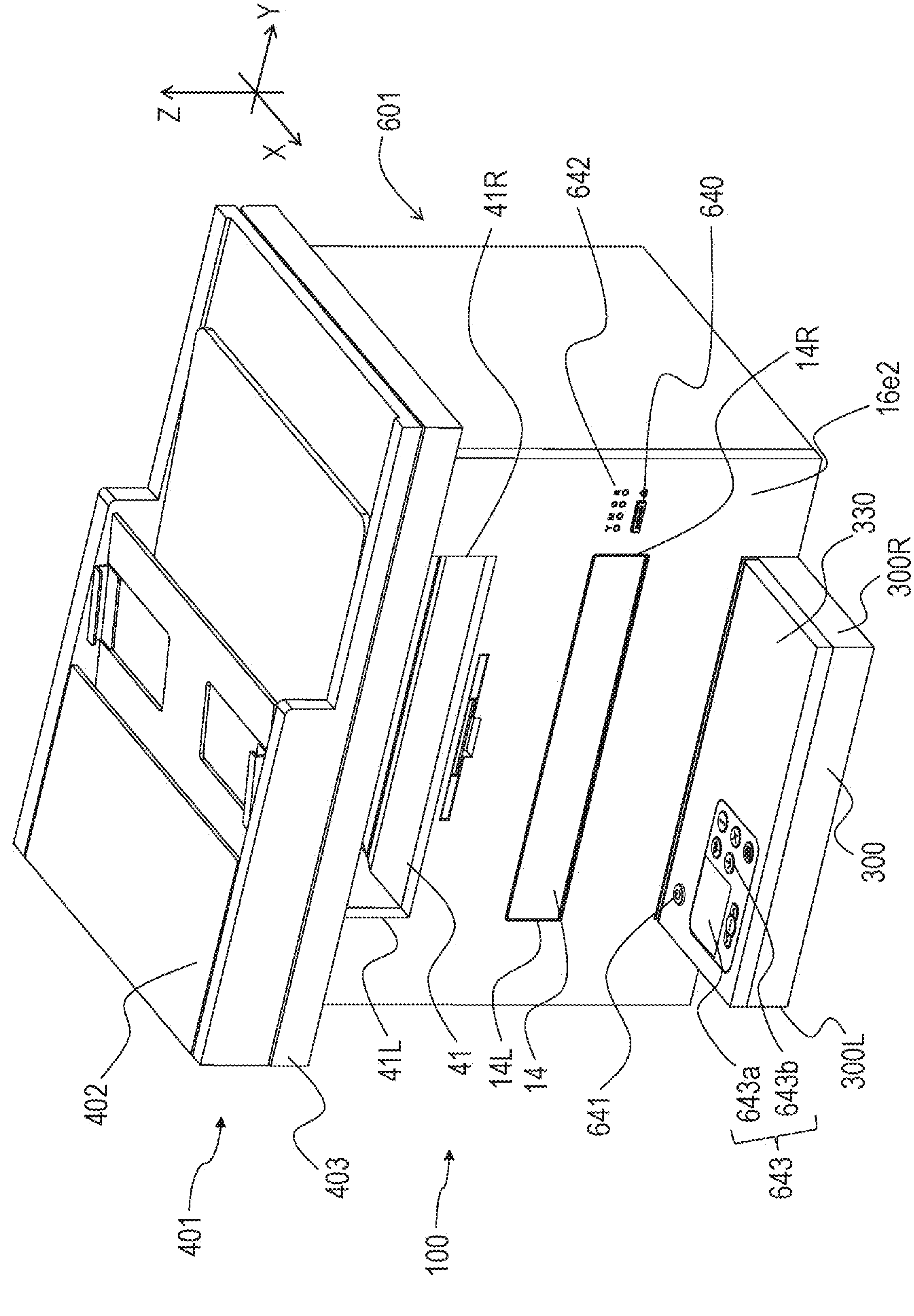
FIG. 20 is a perspective view of the image forming apparatus according to the third embodiment.

The arrangement of operation members used to operate the image forming unit 601 and a display unit will now be described with reference to FIGS. 19 and 20. FIG. 20 is a perspective view of the image forming apparatus. As illustrated in FIG. 20, the image forming unit 601 includes a first operation member 640, a power input unit 641, a remaining-amount display unit 642, and a second operation member 643. In the following description, the combination of the first operation member 640 and the second operation member 643 may be referred to as an operation unit.

The operation unit is electrically connected to a controller (not illustrated) mounted in the image forming unit 601. The controller controls various components of the image forming apparatus 100 based on signals input through the operation unit. For example, the controller is a CPU.

The first operation member 640 is an operation button for performing a movement operation when the toner cartridges 70*y*, 70*m*, 70*c*, and 70*k* are to be placed. To replace each toner cartridge 70, the user presses the first operation member 640 so that an instruction to move the corresponding tray 80 is transmitted from the first operation member 640 to the controller. When the controller receives the instruction to move the tray 80, the controller drives the motor M1 to rotate the rotary body 90 so that the tray 80 moves to the replacement position. After that, the controller drives the motor M2 to drive the moving device 85 so that the tray 80 moves from the accommodation position to the removal position. Namely, the toner cartridge 70 moves from the attachment position to the displaced position. Thus, the controller controls the moving device 85 to move the tray 80 from the accommodation position to the removal position, thereby moving the toner cartridge 70 from the attachment position to the displaced position.

The power input unit 641 is an operation member for turning on and off the power of the image forming apparatus

100. In the present embodiment, as illustrated in FIG. 20, the power input unit 641 is provided on the upper surface of the sheet-storage-unit cover 330.

In the following description, as illustrated in FIG. 19, the center of the door 14 in the direction in which the rotational axis of the photosensitive drum 2 extends is referred to as a center A. The center A may also be regarded as the center of the door 14 in the direction in which the rotational axis of the rotary body 90 extends. An imaginary line passing through the center A and parallel to the vertical direction is referred to as a centerline 14*m*. As illustrated in FIG. 19, when viewed in the accommodation direction, the first operation member 640 and the second operation member 643 are on opposite sides of the centerline 14*m* in the direction in which the rotational axis of the photosensitive drum 2 extends. Alternatively, when viewed in the accommodation direction, the first operation member 640 and the second operation member 643 may be on the same side of the centerline 14*m* in the direction in which the rotational axis of the photosensitive drum 2 extends.

When viewed in the accommodation direction, the power input unit 641 and the first operation member 640 are disposed on opposite sides of the centerline 14*m* in the direction in which the rotational axis of the photosensitive drum 2 extends. Accordingly, when the user presses the first operation member 640, the user is less likely to press the power input unit 641 by mistake.

The remaining-amount display unit 642 is a display unit that displays the amount of developer stored in the toner cartridge 70 attached to the image forming unit 601. The remaining-amount display unit 642 is provided on the frame 16, and includes remaining-amount display members 642*y*, 642*m*, 642*c*, and 642*k* that display the amounts of developers stored in the toner cartridges 70*y*, 70*m*, 70*c*, and 70*k*, respectively. The remaining-amount display members 642*y*, 642*m*, 642*c*, and 642*k* are, for example, light-emitting units such as LEDs. The remaining-amount display unit 642 emits light in different modes depending on the amount of developer stored in each toner cartridge 70. In the present embodiment, the light-emitting units have three light emission modes: steady, flashing, and off.

Letters (Y, M, C, and K) representing the colors of toners stored in the toner cartridges 70*y*, 70*m*, 70*c*, and 70*k* are displayed above the remaining-amount display members 642*y*, 642*m*, 642*c*, and 642*k* on the frame 16. Accordingly, the user can easily recognize the color of the toner cartridge 70 for which one of the remaining-amount display members 642*y* to 642*k* of the remaining-amount display unit 642 is emitting light. Although the letters are displayed above the remaining-amount display members 642*y*, 642*m*, 642*c*, and 642*k* in the present embodiment, the remaining-amount display members 642*y*, 642*m*, 642*c*, and 642*k* may be configured to emit light in colors similar to the colors of toners stored in the toner cartridges 70*y*, 70*m*, 70*c*, and 70*k*, respectively.

The second operation member 643 is an operation member for inputting instructions for causing the image forming apparatus 601 to perform various operations. Examples of the instructions include an instruction to perform the image forming operation, an instruction to cause the reading unit 401 to read a document, and an instruction to select the color of the toner cartridge 70 to be moved in response to a movement instruction input through the first operation member 640.

The second operation member 643 is provided on the upper surface of the sheet-storage-unit cover 330. The second operation member 643 includes a display 643*a* for displaying the state of the image forming apparatus 601 and the operations selectable by the second operation member 643. The second operation member 643 also includes operation buttons 643*b* for selecting the operations.

The positional relationships between the first operation member 640, the remaining-amount display unit 642, and the door 14 will now be described with reference to FIG. 19. When the door 14 is at the closed position, an upper end and a lower end of the door 14 in the vertical direction are referred to as an end 14*eu* and an end 14*ed*, respectively. The height range between the ends 14*eu* and 14*ed* in the vertical direction is referred to as a range H1. The first operation member 640 and the remaining-amount display unit 642 are positioned within the range H1 in the vertical direction. Accordingly, the user can easily view the remaining-amount display unit 642 and the first operation member 640 simultaneously. In addition, the user can access the toner cartridge 70 at the displaced position in a short time after pressing the first operation member 640.

In addition, as illustrated in FIG. 19, when the image forming apparatus 100 is viewed in the accommodation direction, the first operation member 640 and the remaining-amount display unit 642 are positioned on the same side of the centerline 14*m* in the Y direction.

In the following description, one end and the other end of the door 14 in the Y direction are referred to as an end 14R and an end 14L, respectively. One end and the other end of the output tray 41 in the rotational axis direction of the rotary body 90 are referred to as an end 41R and an end 41L, respectively.

In the Y direction, the end 14R and the end 41R are on one side of the centerline 14*m*, and the end 14L and the end 41L are on the other side of the centerline 14*m*. In the Y direction, the end 14R and the end 41Ra are at the same position. In addition, in the Y direction, the end 14L and the end 41L are at the same position.

In the following description, the distance from the centerline 14*m* to the end 14R in the Y direction is referred to as a distance Y1. The distance from the centerline 14*m* to the first operation member 640 in the Y direction is referred to as a distance Y2. The distance Y2 is greater than the distance Y1. As described above, there is a possibility that the sheet S will protrude from the output tray 41 such that a portion of the sheet S hangs downward. However, according to the above-described structure, when the user presses the first operation member 640, the sheet S output to the output tray 41 is less likely to interfere with the user's operation.

In the following description, a support surface of the output tray 41 that supports the recording materials is referred to as a support surface 41*u*. A lower end of the reading unit 401 in the vertical direction is referred to as an end 410*d*. The distance between the support surface 41*u* and the end 410*d* in the vertical direction is referred to as a distance H2. The distance H2 is greater than the distance H1. The height of each toner cartridge 70 in the vertical direction when the toner cartridge 70 is attached to the corresponding tray 80 is referred to as a cartridge height. The cartridge height is less than the distance H1. Namely, the distance H2 is greater than the cartridge height. Therefore, the toner cartridge 70 can be placed in a space defined by the support surface 41*u* and the end 410*d* in the vertical direction. Accordingly, when the user replaces an old toner cartridge 70 with a new toner cartridge 70, the user can place the new toner cartridge 70 in the space defined by the support surface 41*u* and the end 410*d* in the vertical direction until the old toner cartridge 70 is moved to the displaced position.

Figure 21:
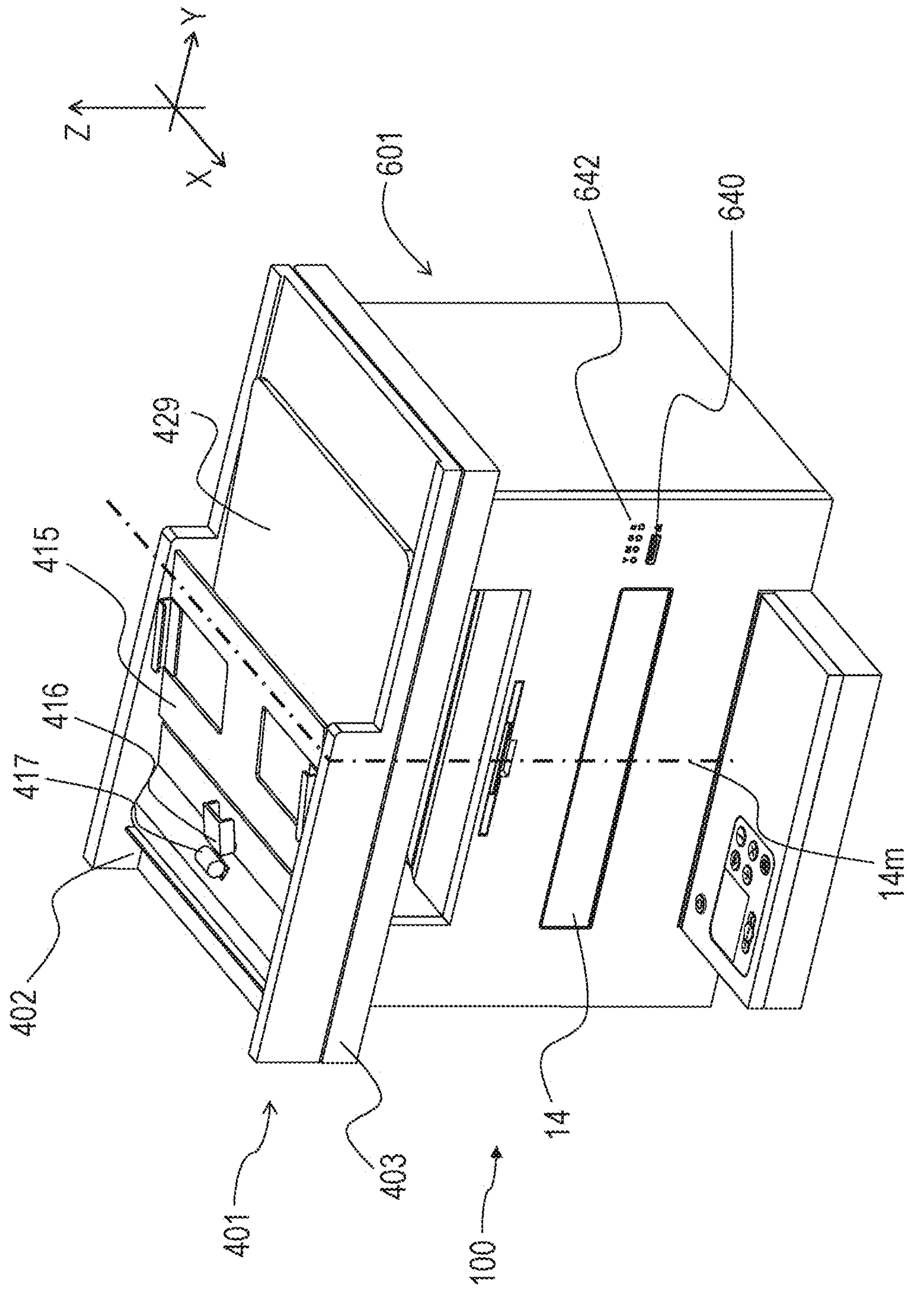
FIG. 21 is a perspective view of the image forming apparatus according to the third embodiment.

The positional relationship between the first operation member 640 and the reading unit 401 will now be described with reference to FIG. 21. FIG. 21 is a perspective view of the image forming apparatus 100. In FIG. 21, a portion of the document transporter 402 is not illustrated for convenience of description. The document transporter 402 transports document sheets in the Y direction. In other words, the document transporter 402 transports the document sheets in a direction in which the rotational axis of the rotary body 90 extends.

The document feed roller 416 and the first operation member 640 are disposed on opposite sides of the centerline 14*m* in the displacement direction. In addition, the document tray 415, the document paper output tray 429, and the first operation member 640 are disposed on the same side of the centerline 14*m* in the displacement direction.

Accordingly, when the user uses the reading unit 401, the user can place document sheets on the document tray 415 and remove the document sheets from the document paper output tray 429 from the same side of the centerline 14*m* as the side on which the first operation member 640 is disposed. Embodiments of the present disclosure are not limited to the above-described example, and the document feed roller 416 and the first operation member 640 may be disposed on the same side of the centerline 14*m*.

Figure 22:
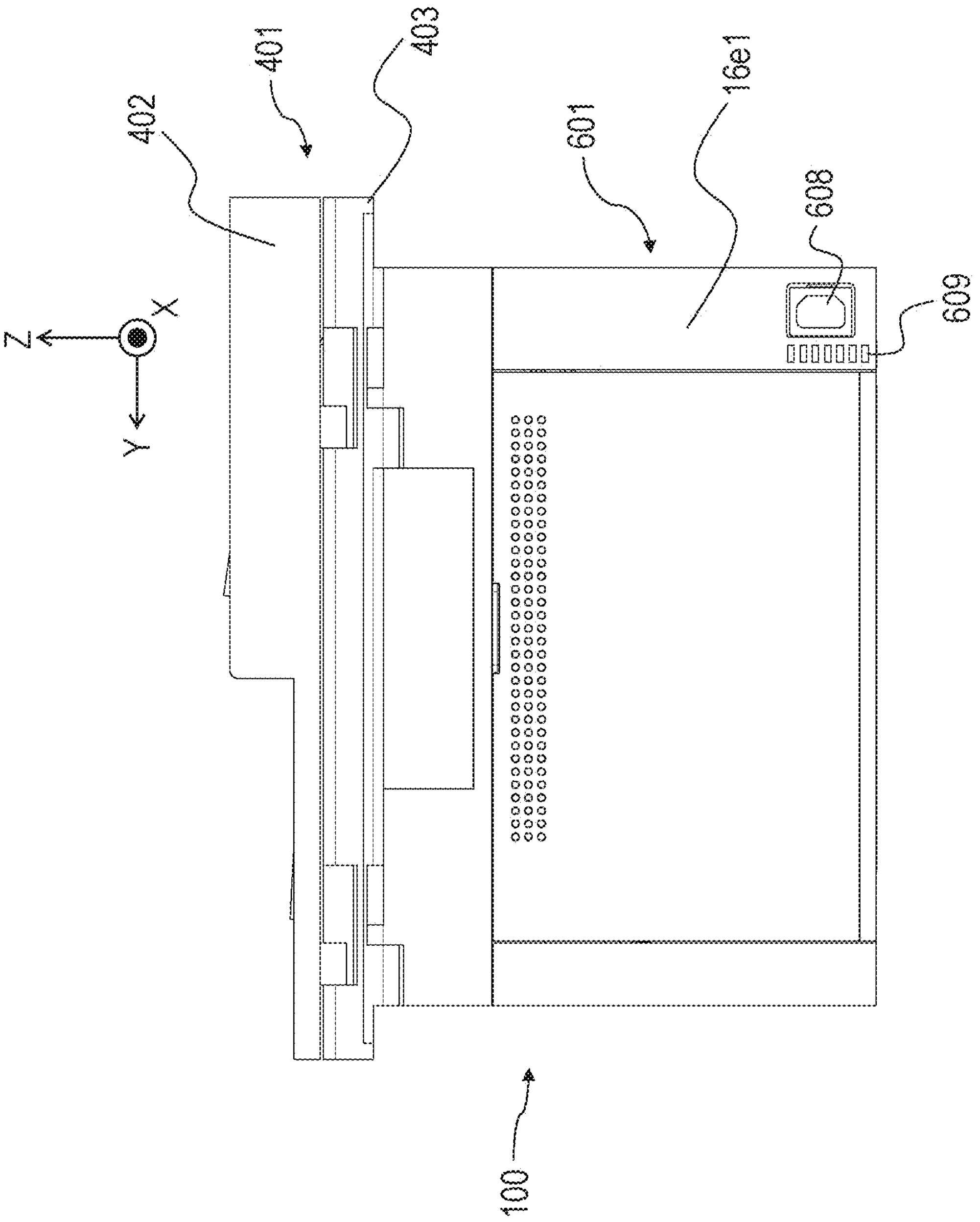
FIG. 22 is a plan view of the image forming apparatus according to the third embodiment.

The structure of a back section of the image forming apparatus 100 will now be described. FIG. 22 is a plan view of the image forming apparatus 100 according to the present embodiment. FIG. 22 illustrates the image forming apparatus 100 viewed in the displacement direction.

An upstream surface of the frame 16 in the displacement direction is referred to as a first surface 16*e*1. The image forming apparatus 100 has an inlet 608 and air holes 609. The inlet 608 and the air holes 609 are formed in the first surface 16*e*1. Electric power can be supplied to the image forming apparatus 100 by connecting a power cable connected to an external power source to the inlet 608.

The air holes 609 are disposed adjacent to the inlet 608. The inside of the image forming apparatus 100 is ventilated through the air holes 609 so that the outside air flows to a power supply unit (not illustrated) connected to the inlet 608 in the image forming apparatus 100. Thus, the power supply unit can be cooled. A rotating fan, which serves as an air blower, is provided in the apparatus body 601 to accelerate the ventilation of the image forming apparatus 100.

Referring to FIG. 20, a downstream surface of the frame 16 in the displacement direction is referred to as a second surface 16*e*2. The door 14 constitutes a portion of the second surface 16*e*2. Since the air holes 609 are formed in the back surface of the image forming apparatus 100, even when the developer is spilled when the toner cartridge 70 is moved to the displaced position, the spilled developer does not easily flow into the image forming apparatus 100 through the air holes 609.

In the present embodiment, the first operation member 640 is disposed adjacent to the door 14, and the remaining-amount display unit 642 is disposed adjacent to and above the first operation member 640. However, the arrangement of the first operation member 640 and the remaining-amount display unit 642 is not limited to this. For example, the remaining-amount display unit 642 may be disposed below the first operation member 640.

In the present embodiment, when the image forming apparatus 100 is viewed in the accommodation direction, the first operation member 640 and the remaining-amount display unit 642 are disposed on the right side of the door 14. However, the first operation member 640 and the remaining-amount display unit 642 may be disposed on the left side of the door 14.

In the present embodiment, when the image forming apparatus 100 is viewed in the accommodation direction, the first operation member 640 and the remaining-amount display unit 642 are positioned on the same side of the centerline 14*m* in the Y direction. However, when the image forming apparatus 100 is viewed in the accommodation direction, the first operation member 640 and the remaining-amount display unit 642 may be positioned on opposite sides of the centerline 14*m* in the Y direction.

In the present embodiment, the power input unit 641 and the first operation member 640 are disposed on opposite sides of the centerline 14*m* when viewed in the accommodation direction. However, the power input unit 641 and the first operation member 640 may be disposed on the same side of the centerline 14*m*.

Figure 23:
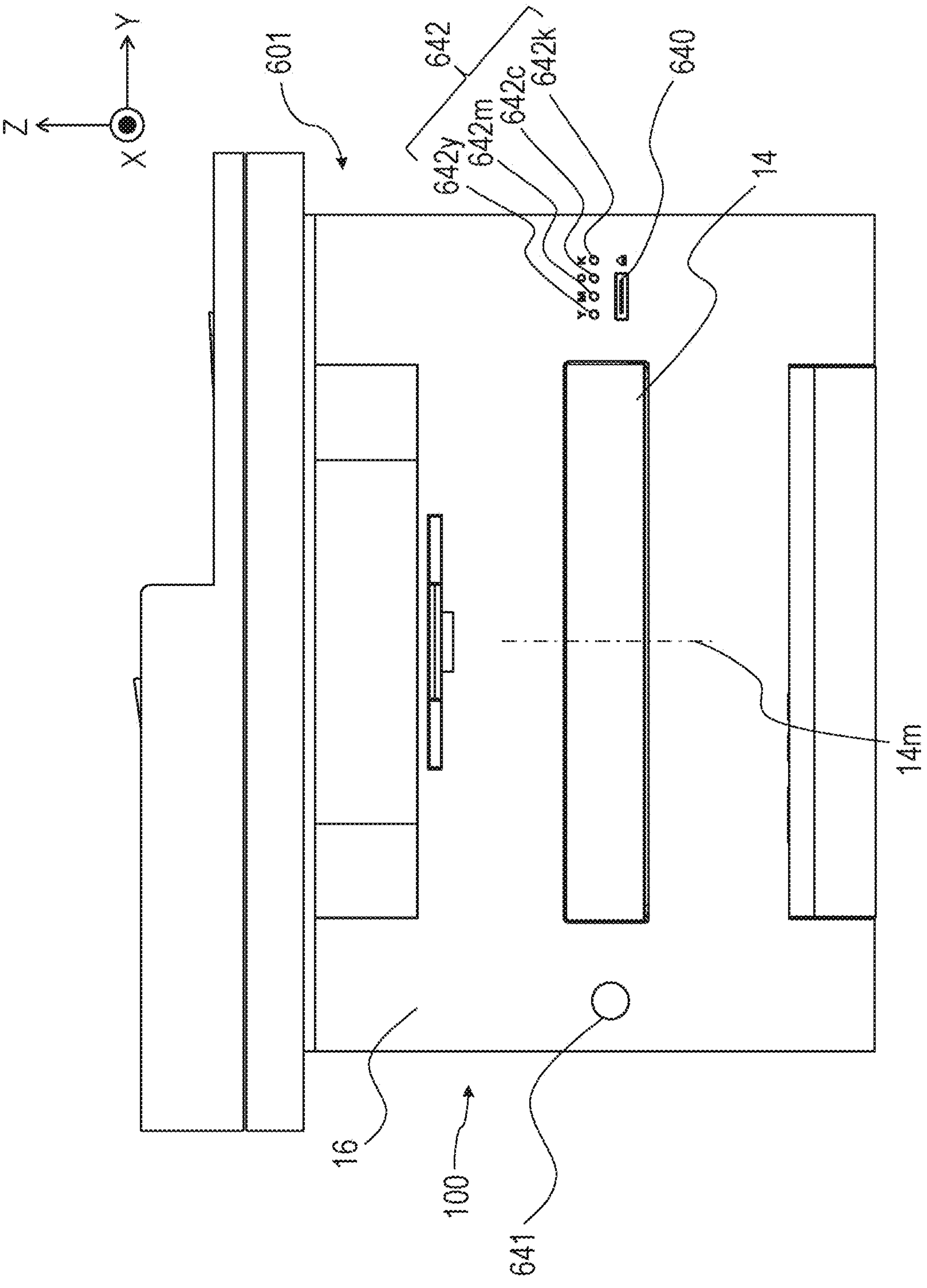
FIG. 23 is a plan view of the image forming apparatus according to the third embodiment.

In addition, in the present embodiment, the power input unit 641 and the second operation member 643 are provided on the upper surface of the sheet-storage-unit cover 330. However, the power input unit 641 and the second operation member 643 may be provided on the frame 16. FIG. 23 is a plan view of an image forming apparatus 100 in which the position of the power input unit 641 differs from that in the present embodiment. The power input unit 641 is disposed on the frame 16.

In the present embodiment, the first operation member 640 and the second operation member 643 are individually provided. However, the functions of the first operation member 640 and the second operation member 643 may be provided by a single operation member. In such a case, the number of components can be reduced, and the cost can be reduced accordingly. In addition, at least one of the first operation member 640 and the second operation member 643 may be a touch panel having an operation screen. The functions of the first operation member 640 and the second operation member 643 may be provided by a single touch panel. In such a case, the touch panel is disposed at substantially the same position as the position of the first operation member 640 or the second operation member 643.

In the present embodiment, the air holes 609 are formed in the back surface at a position adjacent to the inlet 608. However, the arrangement of the inlet 608 and the air holes 609 is not limited to this as long as the inlet 608 and the air holes 609 are provided on a surface other than the surface on which the door 14 is provided. For example, the inlet 608 and the air holes 609 may be disposed on a surface at one side of the frame 16 in the rotational axis direction of the rotary body 90.

The present disclosure provides a new type of image forming apparatus developed from the related art.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-073678 filed Apr. 30, 2024, which is hereby incorporated by reference herein in its entirety.

What is claimed is:

1. An image forming apparatus to which a cartridge that stores developer is removably attachable, the image forming apparatus comprising:

a storage unit that stores the developer supplied from the cartridge;

a photosensitive member on which an electrostatic latent image is formed;

a developing member that forms a developer image by developing the electrostatic latent image on the photosensitive member using the developer stored in the storage unit;

a frame that accommodates the cartridge;

a rotary body accommodating the cartridge and the developing member, the rotary body configured to rotate the cartridge and the developing member about an axis, a moving device that moves the cartridge in a displacement direction from an attachment position at which the cartridge is inside the frame toward a displaced position at which the cartridge is outside the frame;

a controller that controls the moving device; and a reading unit that reads an image formed on a recording material and that rotates to move between a closed position at which the reading unit covers the frame and an open position at which the reading unit is opened to expose the frame, wherein the cartridge includes a cartridge downstream end that is a downstream end of the cartridge in the displacement direction, wherein the reading unit includes a reading-unit downstream end that is a downstream end of the reading unit in the displacement direction when the reading unit is at the closed position, and wherein, when the cartridge is at the displaced position and when the reading unit is at the closed position, the cartridge downstream end is located downstream of the reading-unit downstream end in the displacement direction.

2. The image forming apparatus according to claim 1, wherein, when the cartridge is at the attachment position and when the reading unit is at the closed position, the cartridge downstream end is located upstream of the reading-unit downstream end in the displacement direction.

3. The image forming apparatus according to claim 2, wherein the reading unit is positioned above the frame.

4. The image forming apparatus according to claim 1, wherein the moving device includes a tray that holds the cartridge and that is movable between an accommodation position at which the cartridge is at the attachment position and a removal position at which the cartridge is at the displaced position, wherein the tray includes a tray downstream end that is a downstream end of the tray in the displacement direction, and wherein, when the tray is at the removal position, the tray downstream end is located downstream of the reading-unit downstream end in the displacement direction.

5. The image forming apparatus according to claim 4, wherein, when the tray is at the accommodation position, the tray downstream end is located upstream of the reading-unit downstream end in the displacement direction.

* * * * *